US012605661B2

(12) United States Patent
Adamek et al.

(10) Patent No.: US 12,605,661 B2
(45) Date of Patent: *Apr. 21, 2026

(54) FILTER CARTRIDGES; AIR CLEANER ASSEMBLIES; HOUSINGS; FEATURES; COMPONENTS; AND, METHODS

(71) Applicant: Donaldson Company, Inc., Bloomington, MN (US)

(72) Inventors: Daniel E. Adamek, Minneapolis, MN (US); Scott Brown, Minneapolis, MN (US); Robert D. Johnston, Minneapolis, MN (US); Matthew A. Kalis, Minneapolis, MN (US); Richard P. Manahan, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,384

(22) Filed: Apr. 24, 2023

(65) Prior Publication Data

US 2023/0338883 A1      Oct. 26, 2023

Related U.S. Application Data

(63) Continuation of application No. 17/447,162, filed on Sep. 8, 2021, now Pat. No. 11,660,558, which is a
(Continued)

(51) Int. Cl.
  *B01D 46/00*   (2022.01)
  *B01D 46/52*   (2006.01)

(52) U.S. Cl.
  CPC ....... *B01D 46/0005* (2013.01); *B01D 46/009* (2013.01); *B01D 46/526* (2013.01); *B01D 2265/026* (2013.01); *B01D 2271/022* (2013.01)

(58) Field of Classification Search
  CPC .. B01D 46/10; B01D 46/521; B01D 46/0005; B01D 2271/022; B01D 46/009; B01D 2265/026; B01D 46/525–527
  See application file for complete search history.

(56) References Cited

U.S. PATENT DOCUMENTS

| | | | |
|---|---|---|---|
| 4,925,561 A | 5/1990 | Ishii et al. |
| 5,049,326 A | 9/1991 | Matsumoto et al. |

(Continued)

FOREIGN PATENT DOCUMENTS

| | | |
|---|---|---|
| CN | 103347586 A | 10/2013 |
| CN | 104220142 B | 12/2017 |

(Continued)

OTHER PUBLICATIONS

European Search Report for EP 20203378.3 dated Feb. 2, 2021.

(Continued)

*Primary Examiner* — Robert Clemente
(74) *Attorney, Agent, or Firm* — Merchant & Gould P.C

(57)      ABSTRACT

Air cleaner assemblies, components, and features are described. The features can be used to provide that the air cleaner assembly cannot be fully closed, even if a cartridge is nested therein, and appears to be sealed, unless that cartridge is a proper one for the system of concern. The effect is to prevent an inappropriate cartridge, that does not properly seal, from being inadvertently installed in the assembly.

38 Claims, 56 Drawing Sheets

Related U.S. Application Data continuation of application No. 16/674,760, filed on Nov. 5, 2019, now Pat. No. 11,198,083, which is a continuation of application No. 15/541,122, filed as application No. PCT/US2016/020506 on Mar. 2, 2016, now Pat. No. 10,512,868.

(60) Provisional application No. 62/127,166, filed on Mar. 2, 2015.

(56) References Cited

U.S. PATENT DOCUMENTS

| | | |
|---|---|---|
| 5,562,825 A | 10/1996 | Yamada et al. |
| 5,613,992 A | 3/1997 | Engel |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,843,198 A | 12/1998 | Walker |
| 5,888,442 A | 3/1999 | Kometani et al. |
| 5,895,574 A | 4/1999 | Friedmann et al. |
| 5,902,361 A | 5/1999 | Pomplun et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,293,984 B1 | 9/2001 | Oda et al. |
| 6,350,296 B1 | 2/2002 | Warner |
| 6,540,806 B2 | 4/2003 | Reinhold |
| 6,673,136 B2 | 1/2004 | Gillingham et al. |
| 7,070,641 B1 | 7/2006 | Gunderson et al. |
| 7,625,419 B2 | 12/2009 | Nelson et al. |
| 8,034,145 B2 | 10/2011 | Boehrs et al. |
| 8,038,756 B2 | 10/2011 | Iddings et al. |
| 8,062,399 B2 | 11/2011 | Nelson et al. |
| 8,277,532 B2 | 10/2012 | Reichter et al. |
| 8,292,983 B2 | 10/2012 | Reichter et al. |
| 8,292,984 B2 | 10/2012 | Baseotto et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,518,139 B2 | 8/2013 | Jessberger |
| 8,636,820 B2 | 1/2014 | Reichter et al. |
| 8,709,119 B2 | 4/2014 | Reichter et al. |
| 8,784,522 B2 | 7/2014 | Menssen et al. |
| 8,840,699 B2 | 9/2014 | Bruce et al. |
| 8,906,128 B2 | 12/2014 | Reicheter et al. |
| 9,120,047 B2 | 9/2015 | Boehrs et al. |
| 9,180,399 B2 | 11/2015 | Reichter et al. |
| 9,289,710 B2 | 3/2016 | Hasenfratz et al. |
| 9,399,972 B2 | 7/2016 | Boehrs et al. |
| 9,446,339 B2 | 9/2016 | Rieger et al. |
| 9,463,404 B2 | 10/2016 | Rieger et al. |
| 9,527,023 B2 | 12/2016 | Reichter et al. |
| 9,579,596 B2 | 2/2017 | Rieger et al. |
| 9,795,911 B2 | 10/2017 | Reichter et al. |
| 9,937,455 B2 | 4/2018 | Boehrs et al. |
| 10,065,145 B2 | 9/2018 | Reichter et al. |
| 10,315,144 B2 | 6/2019 | Reichter et al. |
| 10,421,034 B2 | 9/2019 | Reichter et al. |
| 10,427,083 B2 | 10/2019 | Boehrs et al. |
| 10,512,868 B2 | 12/2019 | Adamek et al. |
| 10,532,310 B2 | 1/2020 | Burton et al. |
| 10,556,201 B2 | 2/2020 | Reichter et al. |
| 10,603,618 B2 | 3/2020 | Boehrs et al. |
| 10,864,475 B2 | 12/2020 | Reichter et al. |
| 11,020,699 B2 | 6/2021 | Reichter et al. |
| 11,110,382 B2 | 9/2021 | Burton et al. |
| 11,173,442 B2 | 11/2021 | Boehrs et al. |
| 11,198,083 B2 | 12/2021 | Adamek et al. |
| 11,207,632 B2 | 12/2021 | Reichter et al. |
| 11,291,943 B2 | 4/2022 | Boehrs et al. |
| 11,660,558 B2 * | 5/2023 | Adamek .............. B01D 46/009 55/490 |
| 11,759,744 B2 | 9/2023 | Reichter et al. |
| 11,786,857 B2 | 10/2023 | Boehrs et al. |
| 11,826,689 B2 | 11/2023 | Reichter et al. |
| 2002/0124734 A1 | 9/2002 | Spannbauer et al. |
| 2003/0217534 A1 | 11/2003 | Krisko et al. |
| 2004/0187689 A1 | 9/2004 | Sporre et al. |
| 2004/0194441 A1 | 10/2004 | Kirsch |
| 2005/0001387 A1 | 1/2005 | Matsuki |
| 2005/0130508 A1 | 6/2005 | Yeh |
| 2006/0162305 A1 | 7/2006 | Reid |
| 2007/0261374 A1 | 11/2007 | Nelson et al. |
| 2008/0196368 A1 | 8/2008 | Waibel |
| 2008/0276582 A1 | 11/2008 | Boehrs et al. |
| 2008/0282890 A1 | 11/2008 | Rocklitz et al. |
| 2008/0307759 A1 | 12/2008 | Reichter et al. |
| 2009/0056293 A1 | 3/2009 | Styles |
| 2009/0071111 A1 | 3/2009 | Lundgren et al. |
| 2009/0127211 A1 | 5/2009 | Rocklitz et al. |
| 2009/0151311 A1 | 6/2009 | Reichter et al. |
| 2009/0301046 A1 | 12/2009 | Felber et al. |
| 2010/0032365 A1 | 2/2010 | Moe et al. |
| 2010/0206671 A1 | 8/2010 | Cahill |
| 2010/0258493 A1 | 10/2010 | Kindkeppel et al. |
| 2011/0308214 A1 | 12/2011 | Jessberger et al. |
| 2014/0208705 A1 | 7/2014 | Krull |
| 2014/0251895 A1 | 9/2014 | Wagner |
| 2014/0260143 A1 | 9/2014 | Kaiser |
| 2014/0318090 A1 | 10/2014 | Rieger et al. |
| 2014/0318091 A1 | 10/2014 | Rieger et al. |
| 2014/0318092 A1 | 10/2014 | Rieger et al. |
| 2015/0013289 A1 | 1/2015 | Hasenfratz et al. |
| 2015/0013291 A1 | 1/2015 | Neef et al. |
| 2015/0020489 A1 | 1/2015 | Sudermann et al. |
| 2016/0045848 A1 | 2/2016 | Campbell et al. |
| 2017/0001134 A1 | 1/2017 | Rieger et al. |
| 2017/0175685 A1 | 6/2017 | Metzger |
| 2020/0179862 A1 | 6/2020 | Reichter et al. |
| 2020/0206671 A1 | 7/2020 | Boehrs et al. |
| 2021/0077940 A1 | 3/2021 | Reichter et al. |
| 2021/0394101 A1 | 12/2021 | Reichter et al. |
| 2022/0047984 A1 | 2/2022 | Burton et al. |
| 2022/0054963 A1 | 2/2022 | Adamek et al. |
| 2022/0118394 A1 | 4/2022 | Boehrs et al. |
| 2022/0126227 A1 | 4/2022 | Krull et al. |
| 2022/0176299 A1 | 6/2022 | Reichter et al. |
| 2023/0415082 A1 | 12/2023 | Reichter et al. |
| 2024/0091695 A1 | 3/2024 | Boehrs et al. |

FOREIGN PATENT DOCUMENTS

| | | | |
|---|---|---|---|
| DE | 19 746 804 A1 | 4/1998 |
| DE | 20 2006 020 287 U1 | 4/2008 |
| DE | 20 2008 017 059 U1 | 6/2010 |
| DE | 10 2009 009 066 A1 | 8/2010 |
| EP | 2 535 550 A2 | 12/2012 |
| JP | 2001-289130 A | 10/2001 |
| JP | 2001-341517 A | 12/2001 |
| JP | 2009-95833 A | 5/2009 |
| JP | 2009-541643 A | 11/2009 |
| JP | 2011-88139 A | 5/2011 |
| JP | 2014-523808 A | 9/2014 |
| RU | 2 440 300 C2 | 1/2012 |
| RU | 2 505 339 C2 | 1/2014 |
| RU | 2 528 844 C2 | 9/2014 |
| WO | WO 97/40918 A1 | 11/1997 |
| WO | WO 03/047722 A2 | 6/2003 |
| WO | WO 2004/007054 A1 | 1/2004 |
| WO | WO 2004/071616 A2 | 8/2004 |
| WO | WO 2004/082795 A2 | 9/2004 |
| WO | WO 2005/077487 A2 | 8/2005 |
| WO | WO 2005/094655 A2 | 10/2005 |
| WO | WO 2005/123222 A1 | 12/2005 |
| WO | WO 2006//017790 A1 | 2/2006 |

(56) References Cited

FOREIGN PATENT DOCUMENTS

| | | | |
|---|---|---|---|
| WO | WO 2006/076456 | A1 | 7/2006 |
| WO | WO 2006/076479 | A1 | 7/2006 |
| WO | WO 2007/044677 | A1 | 4/2007 |
| WO | WO 2007/133635 | A2 | 11/2007 |
| WO | WO 2007/149561 | A2 | 12/2007 |
| WO | WO 2010/114906 | A1 | 10/2010 |
| WO | WO 2013/003769 | A2 | 1/2013 |
| WO | WO 2014/210541 | A1 | 12/2014 |
| WO | WO 2016/034657 | A1 | 3/2016 |
| WO | WO 2016/077377 | A1 | 5/2016 |
| WO | WO 2016/105560 | A2 | 6/2016 |

OTHER PUBLICATIONS

International Search Report and Written Opinion for PCT/US2016/020506, dated Oct. 7, 2016.

Office Action with English translation for Russian Application No. 2017121647/05 dated Jul. 7, 2019.

Office Action with English translation for Chinese Application No. 2016800004655.3 dated Jul. 16, 2019.

Office Action for Australia Application No. 2016226223 dated Jun. 2, 2020.

Office Action for Brazil Application No. BR112017014178-7 dated Mar. 24, 2020.

Office Action with English translation for Corresponding Chinese Application No. 202010211700.0 dated May 25, 2021.

Pending Claims of U.S. Appl. No. 17/447,162 dated May 18, 2023.

Pending Claims of U.S. Appl. No. 17/533,796 dated May 18, 2023.

Pending Claims of U.S. Appl. No. 17/303,371 dated May 18, 2023.

Pending Claims of U.S. Appl. No. 17/101,996 dated May 18, 2023.

Pending Claims of U.S. Appl. No. 17/512,933 dated May 18, 2023.

Pending Claims of U.S. Appl. No. 17/443,229 dated May 18, 2023.

Office Action for Chinese Application 202210012273.2 dated Feb. 24, 2023.

Pending claims of U.S. Appl. No. 18/215,382.

Pending claims of U.S. Appl. No. 18/488,129.

Pending claims of U.S. Appl. No. 18/373,001.

Pending claims of U.S. Appl. No. 17/443,229.

Extended Search Report for European Application No. 23191579.4 dated Nov. 15, 2023.

Notice of Grounds of Opposition for European Patent No. EP3799944 dated Aug. 30, 2023.

\* cited by examiner

R1000   R1001   DCI A Flute

R1002
R1003

R1004   R1005   DCI B Flute

R1006
R1007

R1008   R1009   STD E Flute

R1010   R1011

STD X Flute

R1012

R1013

R1014   R1015   STD B Flute

R1016

R1017   STD C Flute

R1018

R1019   STD A Flute

R1020

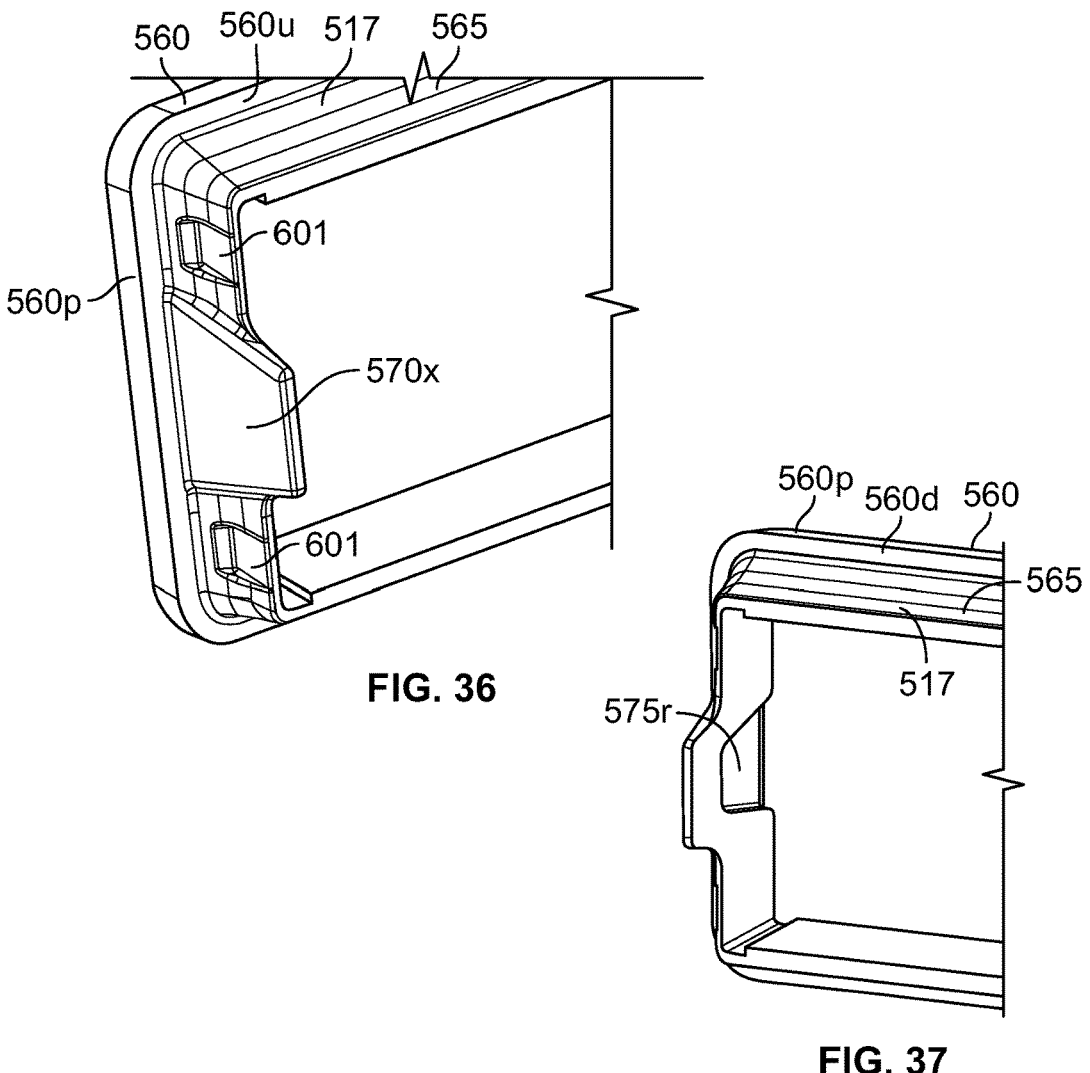
FIG. 36
FIG. 37
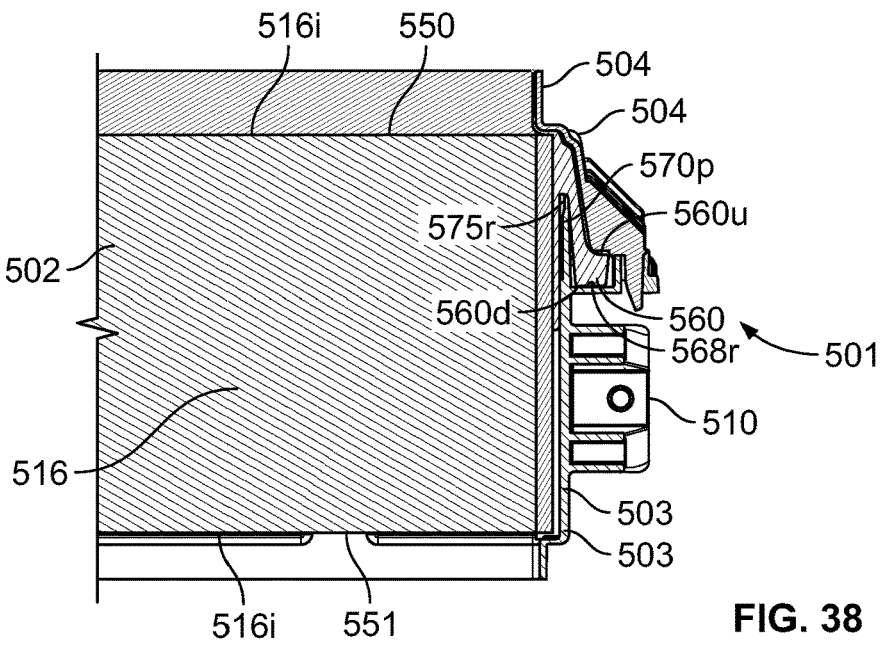
FIG. 38

FILTER CARTRIDGES; AIR CLEANER ASSEMBLIES; HOUSINGS; FEATURES; COMPONENTS; AND, METHODS

CROSS-REFERENCE TO RELATED APPLICATION

This application is a continuation of U.S. application Ser. No. 17/447,162, filed Sep. 8, 2021. U.S. application Ser. No. 17/447,162 is a continuation of Ser. No. 16/674,760, filed Nov. 5, 2019. U.S. application Ser. No. 16/674,760, now U.S. Pat. No. 11,198,083 is a continuation of U.S. application Ser. No. 15/541,122, filed Jun. 30, 2017, now U.S. Pat. No. 10,512,868, which is a National Stage Application of PCT/US2016/020506, filed Mar. 2, 2016, which claims benefit of U.S. provisional application 62/127,166, filed Mar. 2, 2015, and U.S. provisional application 62/188,861, filed Jul. 6, 2015. The complete disclosures of U.S. Ser. No. 17/447,162; U.S. Ser. No. 16/674,760; U.S. Ser. No. 15/541, 122, PCT/US2016/020506, U.S. 62/127,166, and 62/188, 861 are incorporated herein by reference. To the extent appropriate, a claim of priority is made to each of U.S. Ser. No. 17/447,162; U.S. Ser. No. 16/674,760; U.S. Ser. No. 15/541,122, PCT/US2016/020506, U.S. 62/127,166, and U.S. 62/188,861.

FIELD OF THE DISCLOSURE

The present disclosure relates to filter arrangements, typically for use in filtering air; such as intake air for internal combustion engines. The disclosure particularly relates to filter arrangements that use cartridges having opposite flow ends. Air cleaner arrangements and features; and, methods of assembly and use, are also described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

According to the present disclosure, air cleaner assemblies, housings, serviceable filter cartridges and features, components, and methods, relating thereto are disclosed. In general, the features relate to systems that are configured to prevent an improper cartridge from appearing to be properly nested in an air cleaner housing, during servicing. A variety of approaches are described herein, that can be used independently or together to achieve a desired result.

BRIEF DESCRIPTION OF THE DRAWINGS

FIG. 28 being taken generally along line 28-28, FIG. 13.

FIG. 31 being taken generally along line 31-31, FIG. 13.

FIG. 33 being taken generally along line 33-33, FIG. 13.

FIG. 35 being taken along 35-35, FIG. 13.

FIG. 36 is a schematic, enlarged, fragmentary, perspective view of a molded component of a filter cartridge of FIG. 15.

FIG. 37 is a second, enlarged, schematic, fragmentary perspective view of the molded component of FIG. 36.

FIG. 38 is an enlarged, schematic, fragmentary cross-sectional view of a portion of the air cleaner assembly of FIG. 13; FIG. 35 being taken along line 38-38, FIG. 13.

FIG. 40 being taken generally along the place 40-40 indicated in FIG. 39.

FIG. 64 is a schematic depiction of another usable fluted sheet/facing sheet combination in accord with the present disclosure.

FIG. 65 is a perspective view of a portion of the usable fluted sheet/facing sheet combination depicted in FIG. 64.

DETAILED DESCRIPTION

I. Example Media Configurations, Generally

Figure 1:
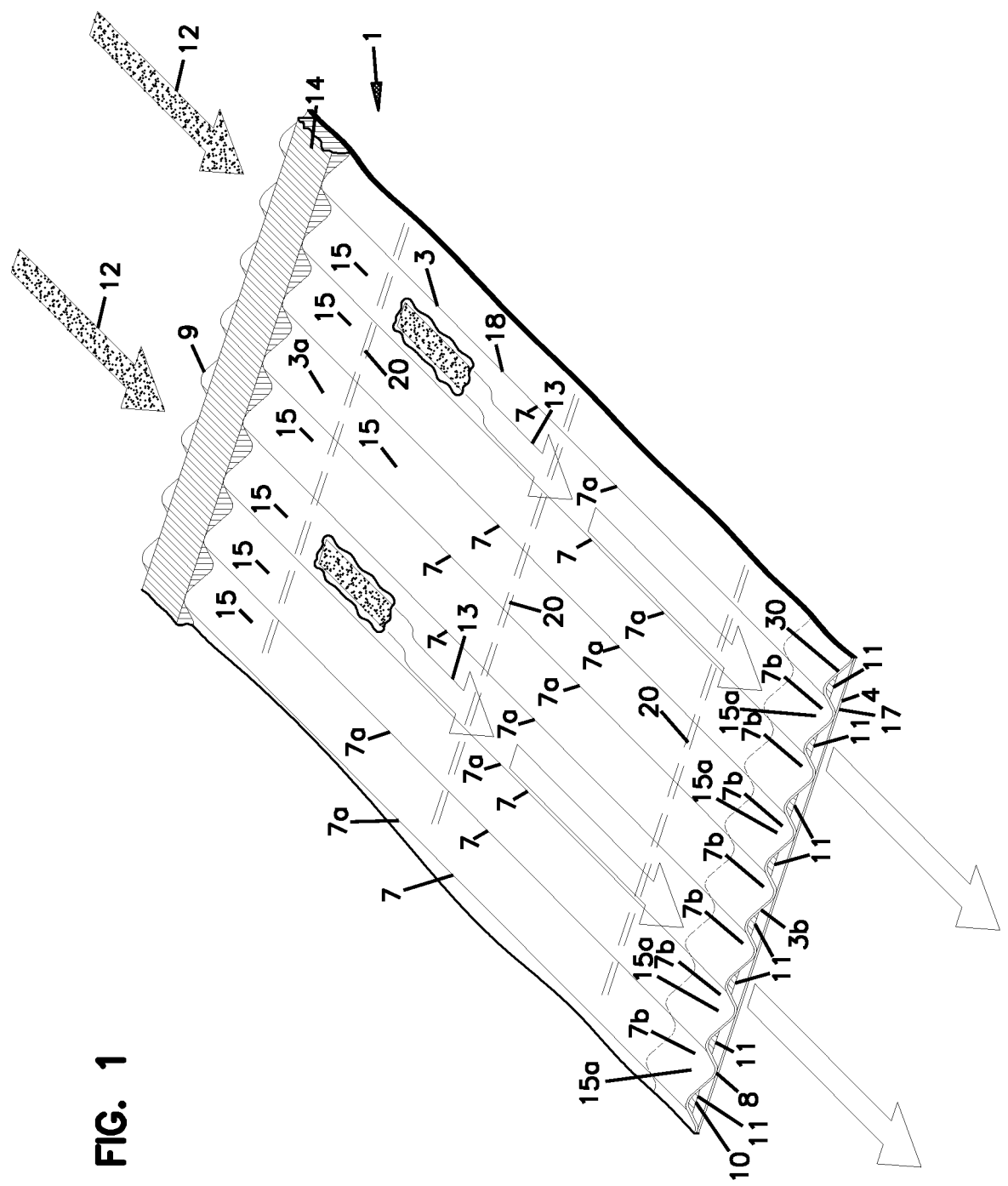
FIG. 1 is a fragmentary, schematic, perspective view of a first example media type useable in arrangements according to the present disclosure.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/ air cleaner interaction features characterized herein.

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428, 128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically noncorrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar.

17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

Sometimes, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, in certain instances the corrugation pattern is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight, although alternatives are possible. By "straight" in this context, it is meant that through at least 70%, typically at least 80% of the length, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

In the example depicted, the various flutes 7 extend completely between the opposite edges 8, 9, but alternatives are possible. For example, they can extend to a location adjacent or near the edges, but not completely therethrough. Also, they can be stopped and started partway through the media, as for example in the media of US 2014/0208705 A1, incorporated herein by reference.

When the media is as depicted in FIG. 1, adjacent edge 8 can provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

In the media depicted in FIG. 1, adjacent edge 9 is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.").

In alternate types of through-flow media, seal material can be located differently, and added sealant or adhesive can even be avoided. For example, in some instances, the media can be folded to form an end or edge seam; or, the media can be sealed closed by alternate techniques such as ultrasound application, etc. Further, even when sealant material is used, it need not be adjacent opposite ends.

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat.

No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
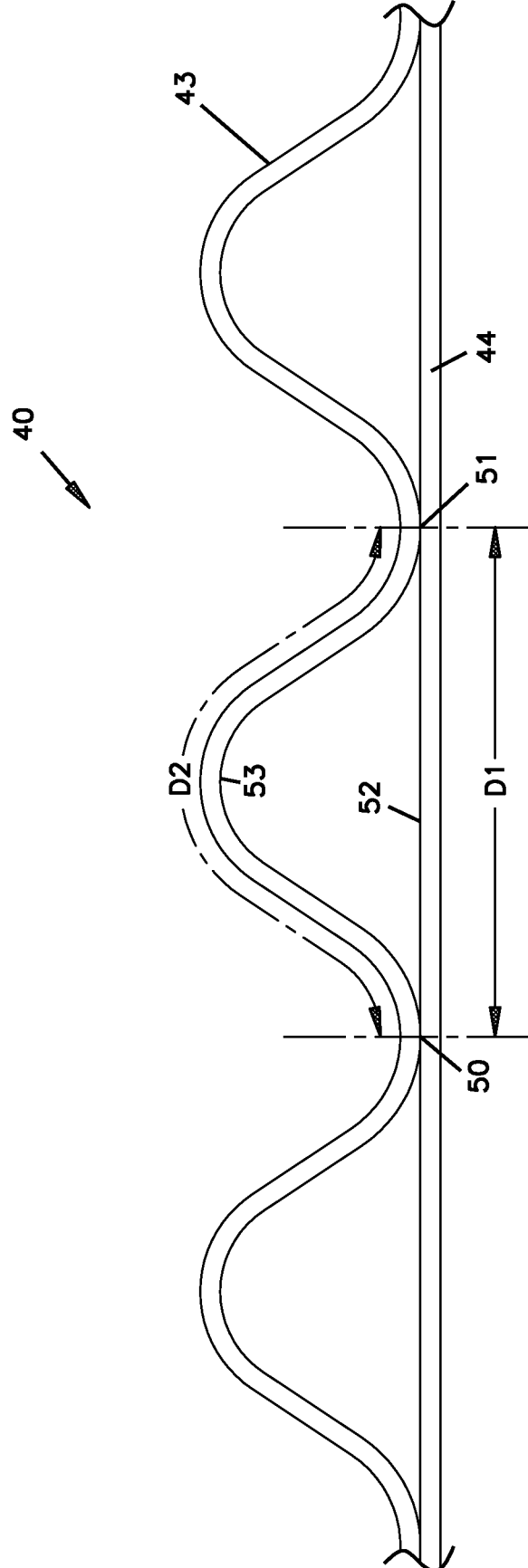
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
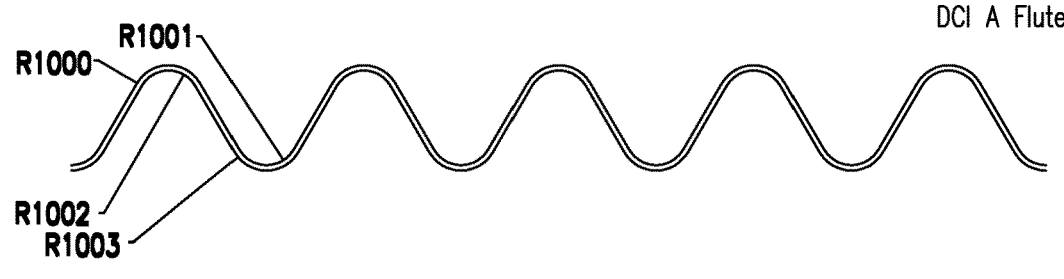
FIG. 3 includes schematic views of examples of various fluted media definitions, for media of the type of FIGS. 1 and 2.
Figure 3:
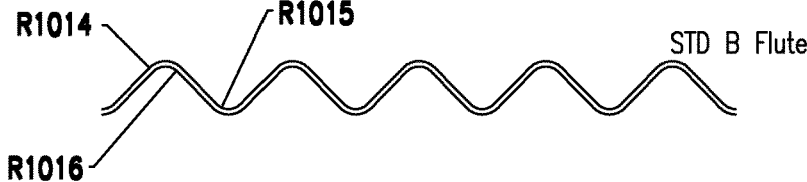
Figure 3:
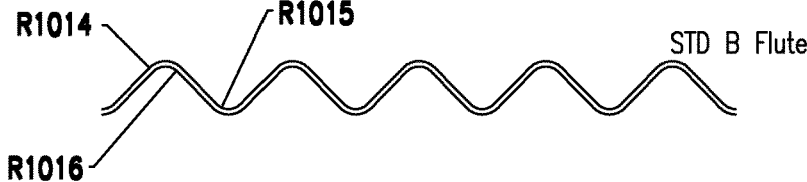
Figure 3:
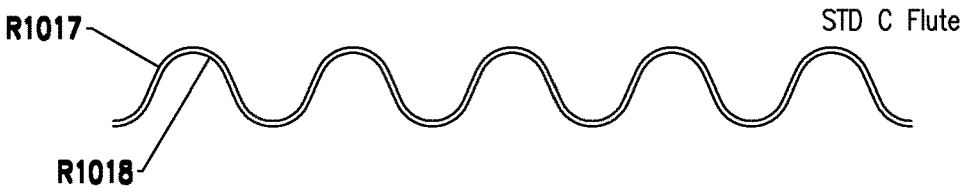
Figure 3:
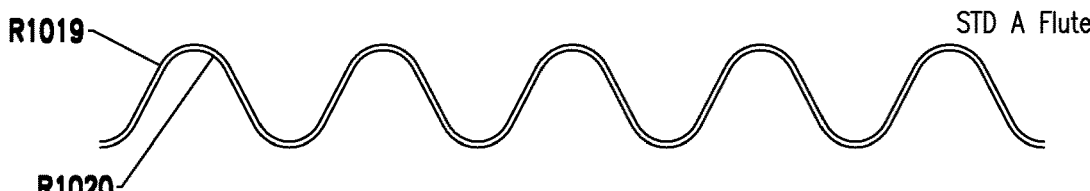

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A

| (Flute definitions for FIG. 3) |
| --- |

| | |
| --- | --- |
| DCI | Flute/flat = 1.52:1; The Radii (R) are as follows: |
| A | R1000 = .0675 inch (1.715 mm); R1001 = .0581 inch (1.476 mm); |
| Flute: | R1002 = .0575 inch (1.461 mm); R1003 = .0681 inch (1.730 mm); |
| DCI | Flute/flat = 1.32:1; The Radii (R) are as follows: |
| B | R1004 = .0600 inch (1.524 mm); R1005 = .0520 inch (1.321 mm); |
| Flute: | R1006 = .0500 inch (1.270 mm); R1007 = .0620 inch (1.575 mm); |
| Std. | Flute/flat = 1.24:1; The Radii (R) are as follows: |
| E | R1008 = .0200 inch (.508 mm); R1009 = .0300 inch (.762 mm); |
| Flute: | R1010 = .0100 inch (.254 mm); R1011 = .0400 inch (1.016 mm); |
| Std. | Flute/flat = 1.29:1; The Radii (R) are as follows: |
| X | R1012 = .0250 inch (.635 mm); R1013 = .0150 inch (.381 mm); |
| Flute: | |
| Std. | Flute/flat = 1.29:1; The Radii (R) are as follows: |
| B | R1014 = .0410 inch (1.041 mm); R1015 = .0310 inch (.7874 mm); |
| Flute: | R1016 = .0310 inch (.7874 mm); |
| Std. | Flute/flat = 1.46:1; The Radii (R) are as follows: |
| C | R1017 = .0720 inch (1.829 mm); R1018 = .0620 inch (1.575 mm); |
| Flute: | |
| Std. | Flute/flat = 1.53:1; The Radii (R) are as follows: |
| A | R1019 = .0720 inch (1.829 mm); R1020 = .0620 inch (1.575 mm). |
| Flute: | |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 1-3, See FIGS. 4-7

Figure 4:
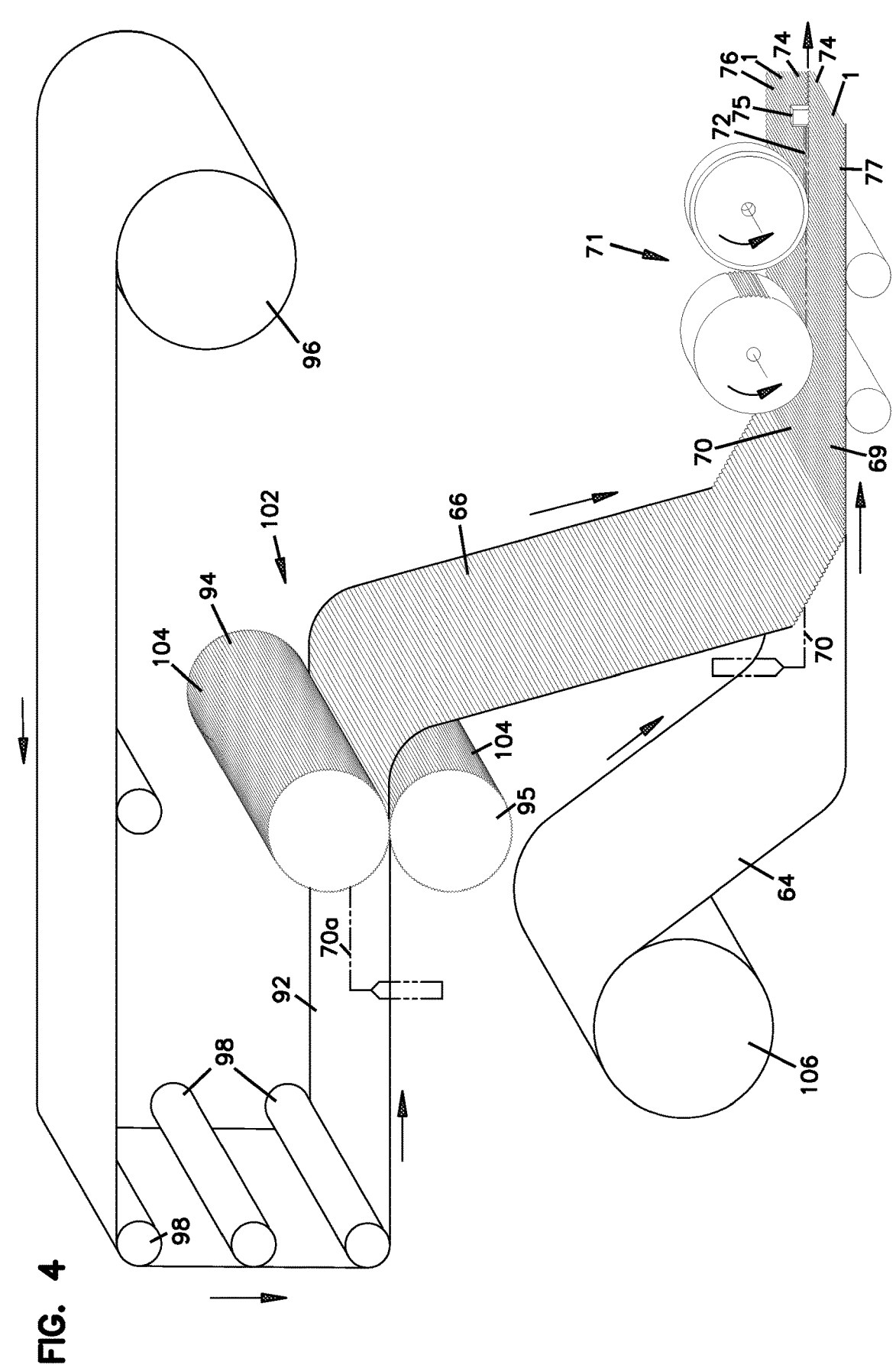
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70*a*. If the sealant is applied at 70*a*, it may be desirable to put a gap in the corrugation roller 95, and possibly in both corrugation rollers 94, 95, to accommodate the bead 70*a*.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
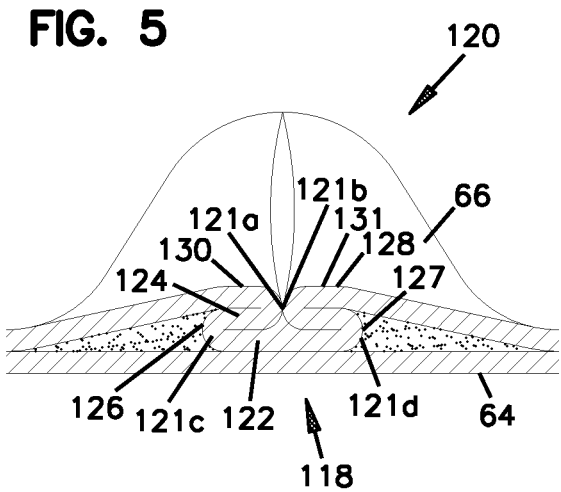
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121*a*, 121*b*, 121*c*, 121*d*. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121*a*, 121*b* will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
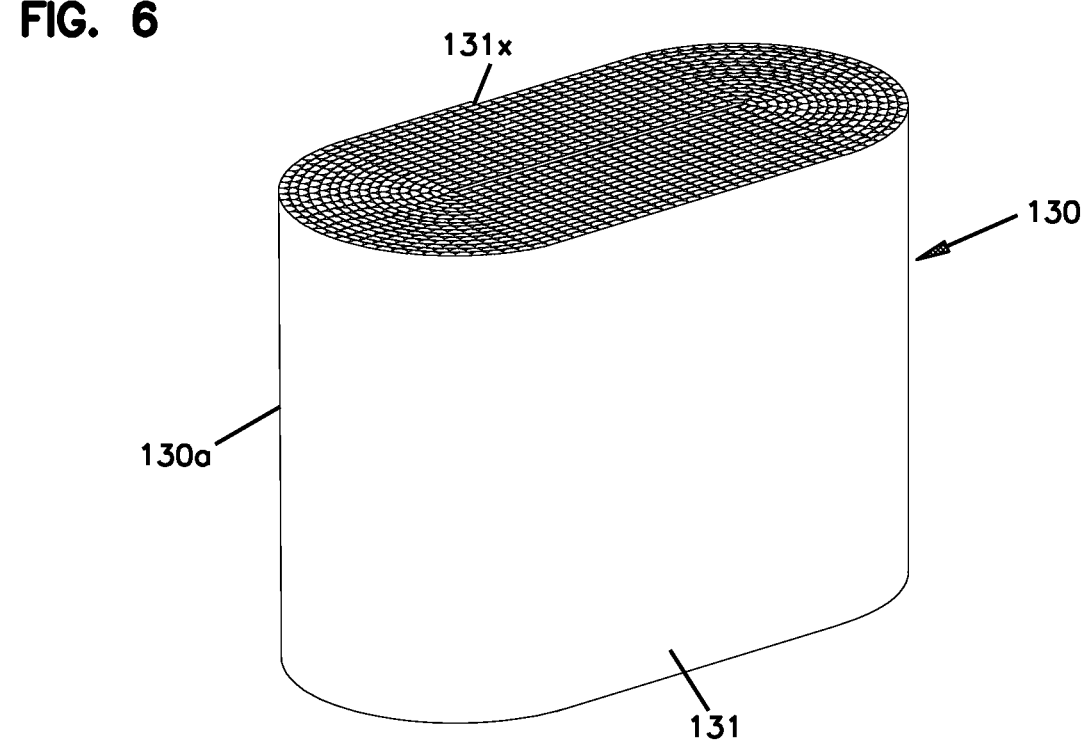
FIG. 6 is a schematic perspective view of a coiled filter arrangement usable in a filter cartridge having features in accord with the present disclosure, and made with a strip of media for example in accord with FIG. 1.

In FIG. 6, a coiled media pack (or coiled media) 130 constructed by coiling a single strip of single faced media is depicted, generally. The particular coiled media pack depicted is an oval media pack 130a, specifically a racetrack shaped media pack 131. The tail end of the media, at the outside of the media pack 130 is shown at 131x. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
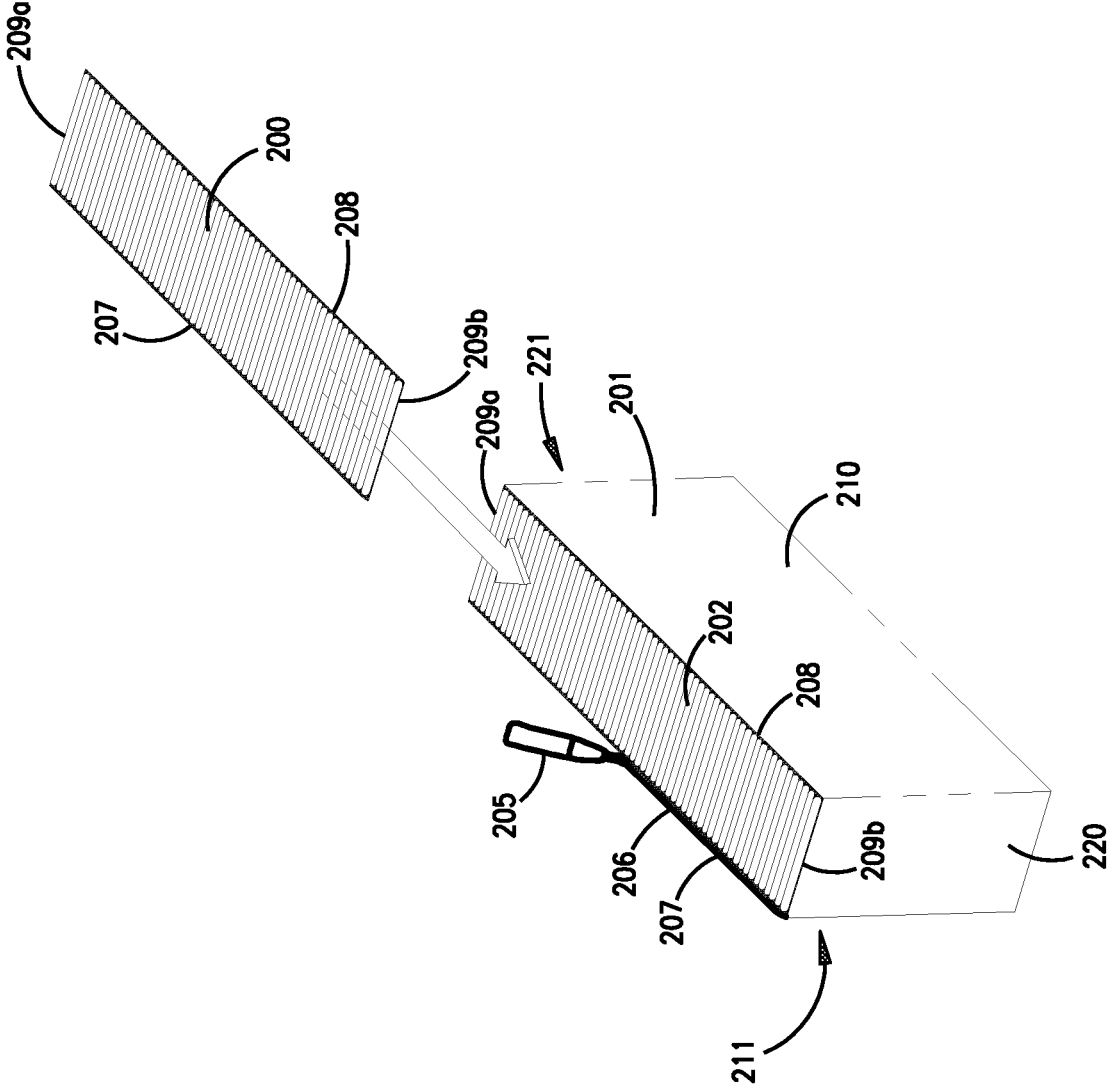
FIG. 7 is a schematic perspective view of a stacked media pack arrangement usable in a filter arrangement having features in accord with the present disclosure and made with a strip of media for example in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731, 504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
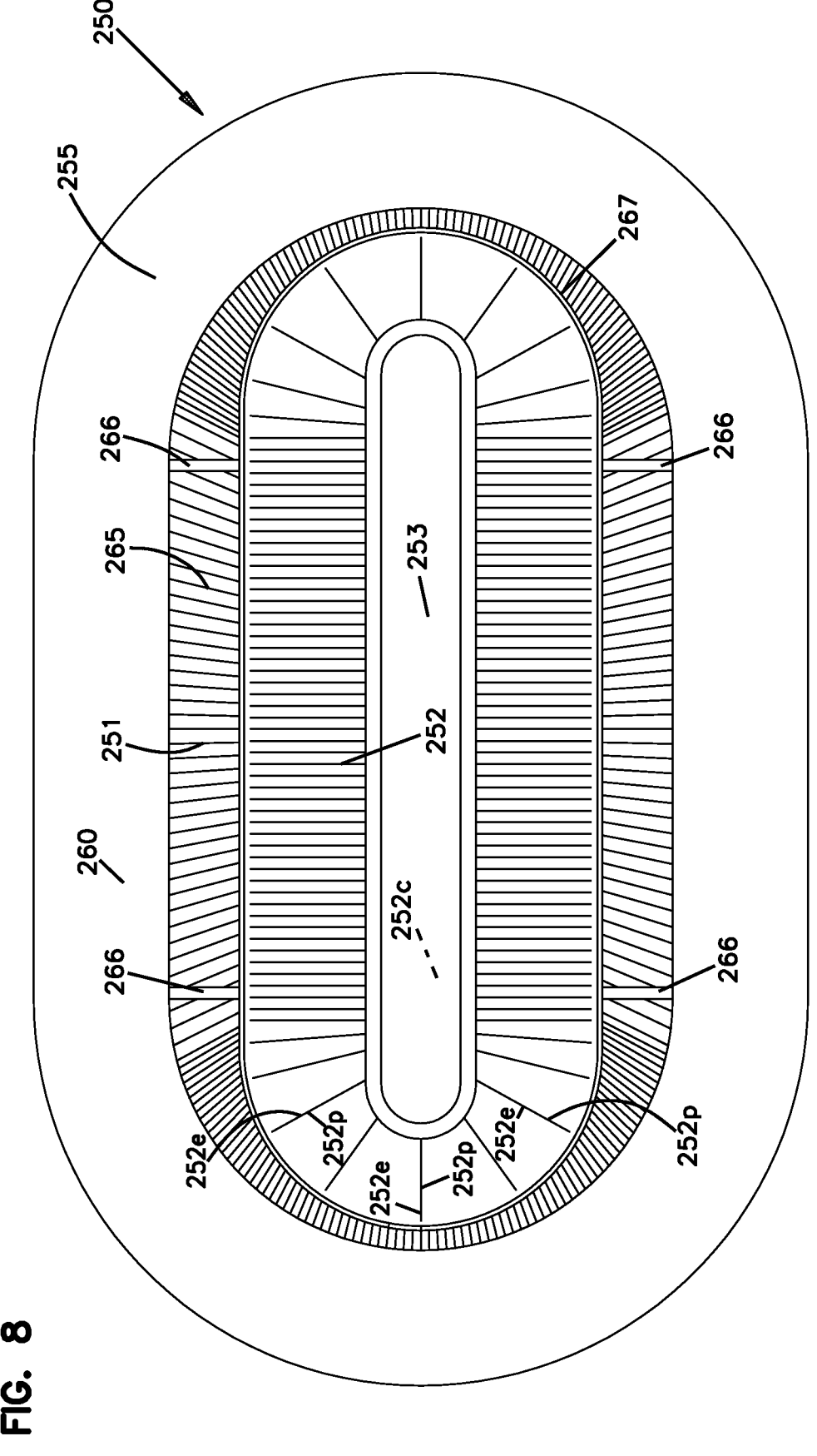
FIG. 8 is a schematic flow end view of a filter media pack using an alternate media to the media of FIG. 1, and alternately usable in selected filter cartridges in accord with the present disclosure.

C. Selected Media or Media Pack Arrangements Comprising Multiple Spaced Coils of Fluted Media; FIGS. 8-8B

Alternate types of media arrangements or packs that involve flutes between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252*c* that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
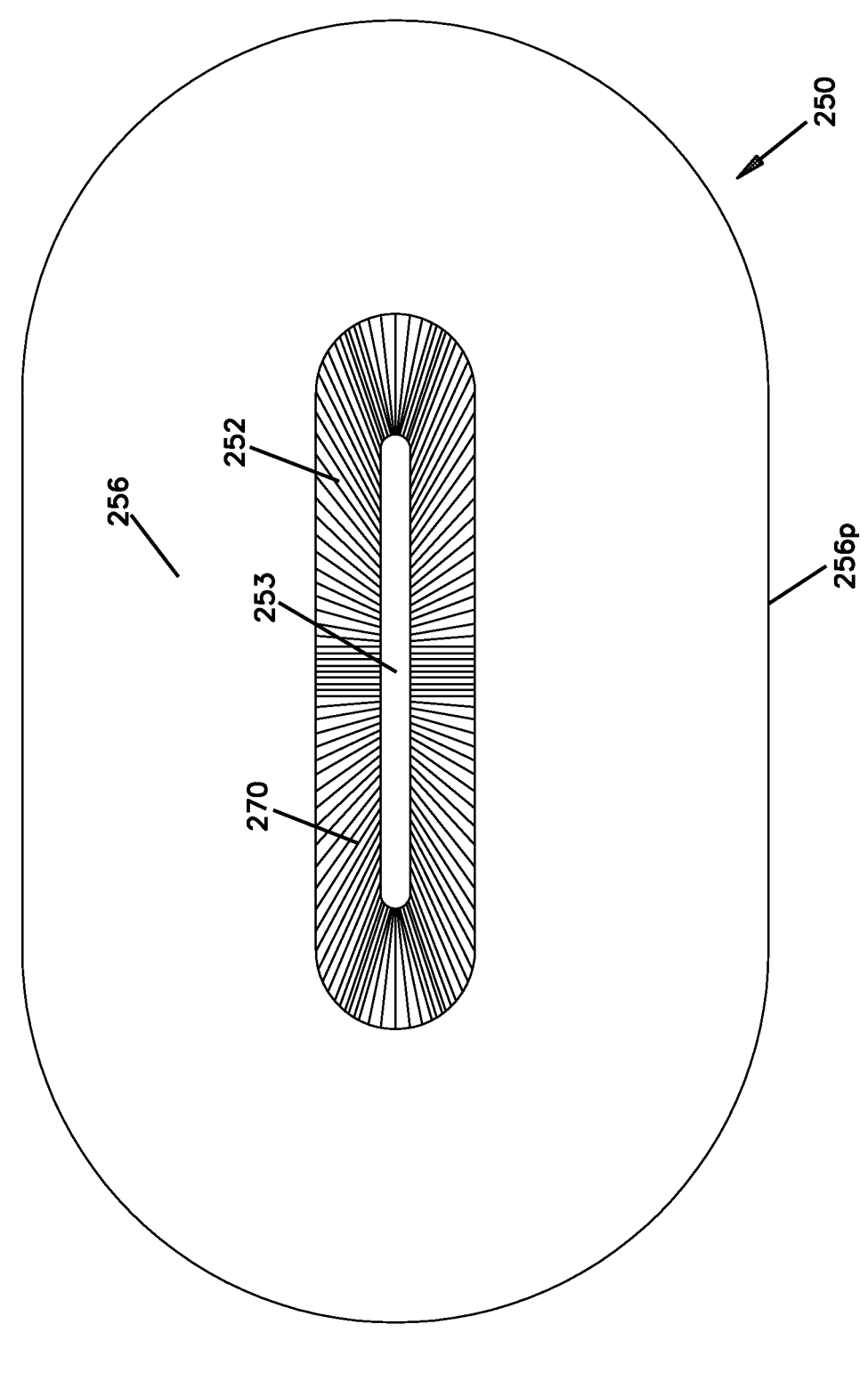
FIG. 8A is a schematic opposite flow end view to the view of FIG. 8.
Figure 8B:
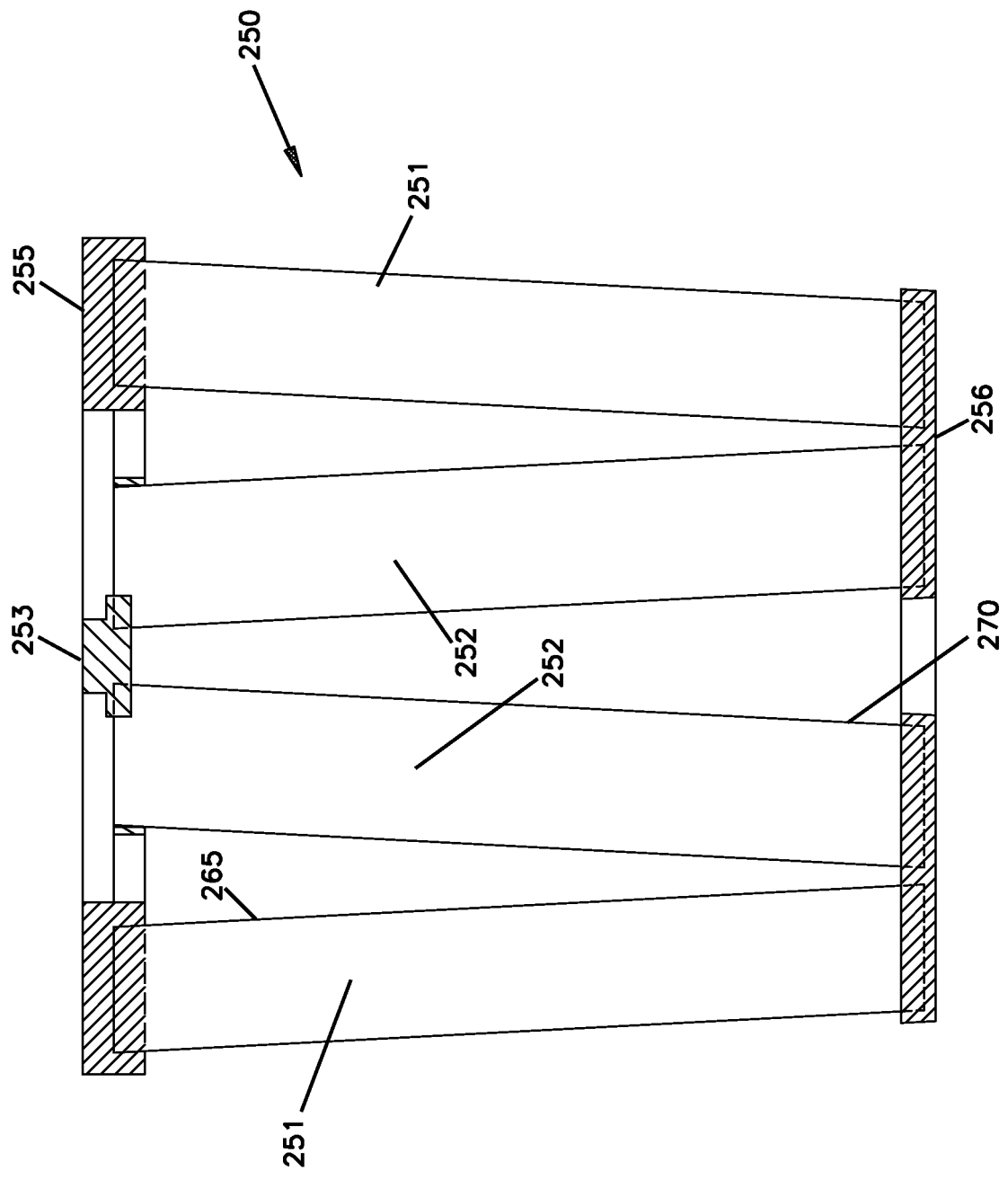
FIG. 8B is a schematic cross-sectional view of the media pack of FIGS. 8 and 8A.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256*p* of end 256.

In FIG. 8B a schematic cross sectional view of cartridge 250 is provided. Selected identified and described features are indicated by like reference numerals.

It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 9-12

Herein, in FIGS. 9-12, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 9-12 represents a media type that can be stacked or coiled into an arrangement that has opposite inlet and outlet flow ends (or faces), with straight through flow.

Figure 9:
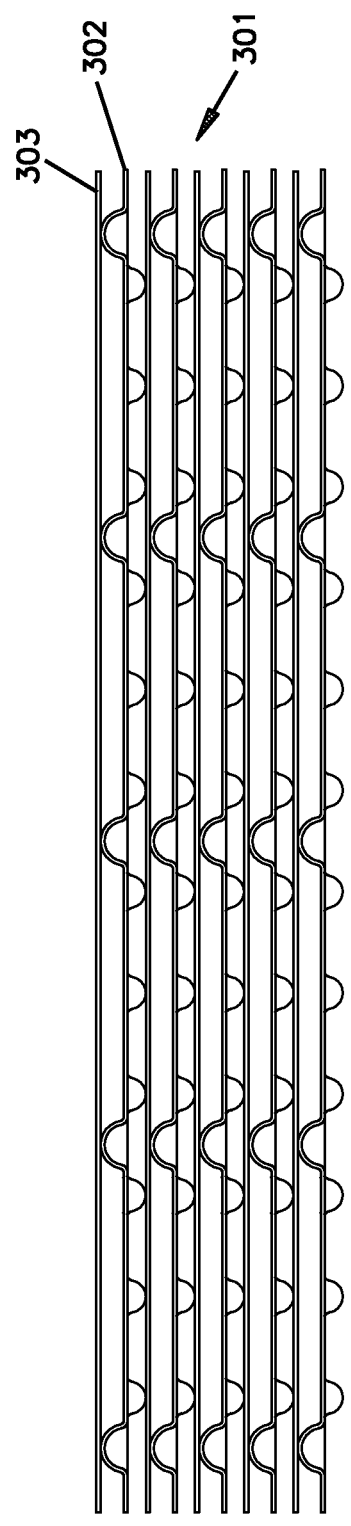
FIG. 9 is a schematic, fragmentary, cross-sectional view of a further alternate media type usable in a media pack of a filter cartridge having features in accord with the present disclosure.

In FIG. 9, an example media arrangement 301 from U.S. Ser. No. 62/077,749 is depicted, in which an embossed sheet 302 is secured to a non-embossed sheet 303, then stacked and coiled into a media pack, with seals along opposite edges of the type previously described for FIG. 1 herein.

Figure 10:
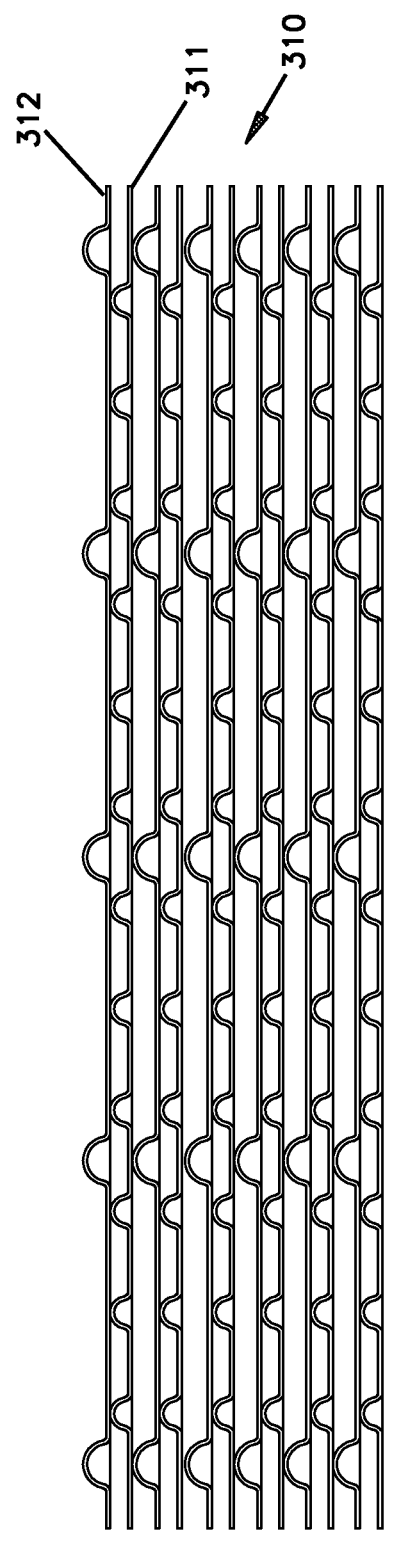
FIG. 10 is a schematic, fragmentary cross-sectional view, of a first variation of the media type of FIG. 9.

In FIG. 10, an alternate example media pack 310 from U.S. Ser. No. 62/077,749 is depicted, in which a first embossed sheet 311 is secured to a second embossed sheet 312 and then formed into a stacked or coiled media pack arrangement, having edge seals generally in accord with FIG. 1 herein.

Edge seals can be conducted in either the upstream end or the downstream end, or in some instances both. Especially when the media is likely to encounter chemical material during filtering, it may be desirable to avoid a typical adhesive or sealant.

Figure 11A:
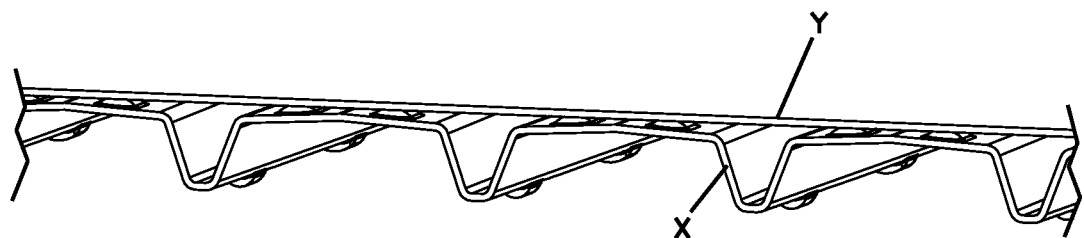
FIG. 11A is a schematic depiction of another usable fluted sheet/facing sheet combination in accord with the present disclosure.

In FIG. 11A, a cross-section is depicted in which the fluted sheet X has various embossments on it for engagement with the facing sheet Y. Again these can be separate, or sections of the same media sheet.

Figure 11B:
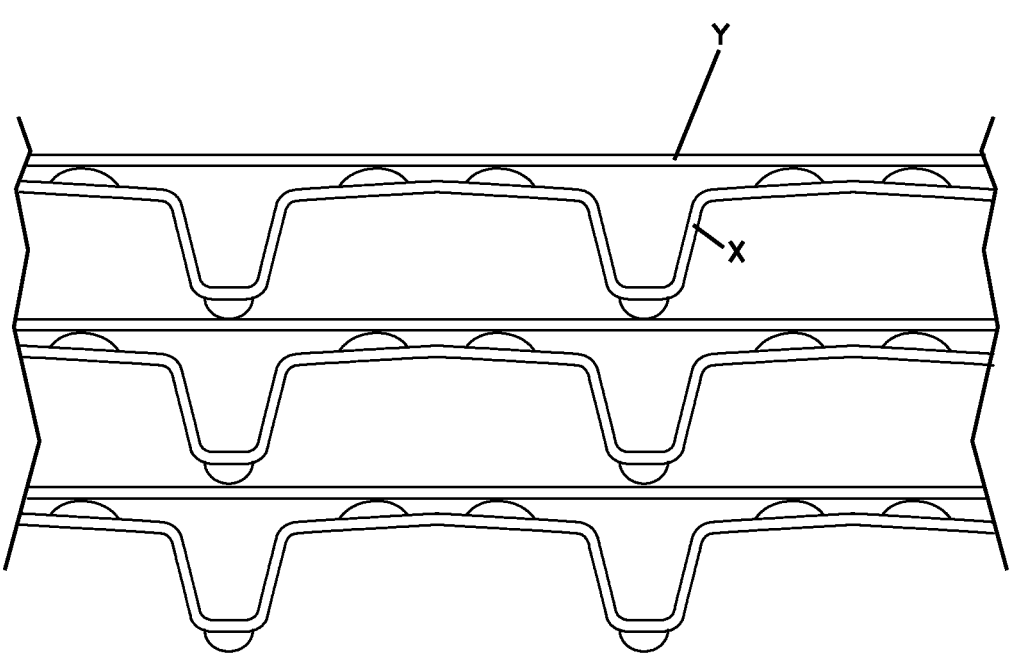
FIG. 11B is a second schematic view of the type of media in FIG. 11A.

In FIG. 11B, a schematic depiction of such an arrangement between the fluted sheet X and facing sheet Y is also shown.

Figure 11C:
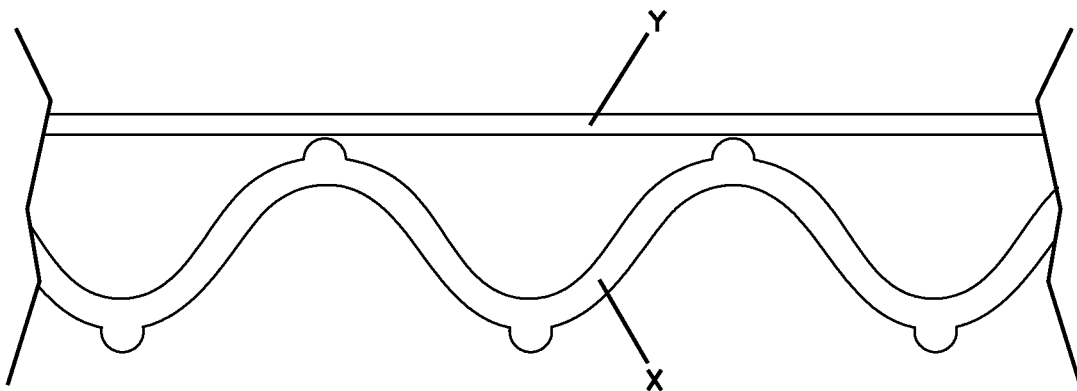
FIG. 11C is a schematic, fragmentary, plan view of still another variation of the media.

In FIG. 11C, a still further variation of such a principle is shown between a fluted sheet X and a facing sheet Y. These are meant to help understand how a wide variety of approaches are possible.

Figure 12:
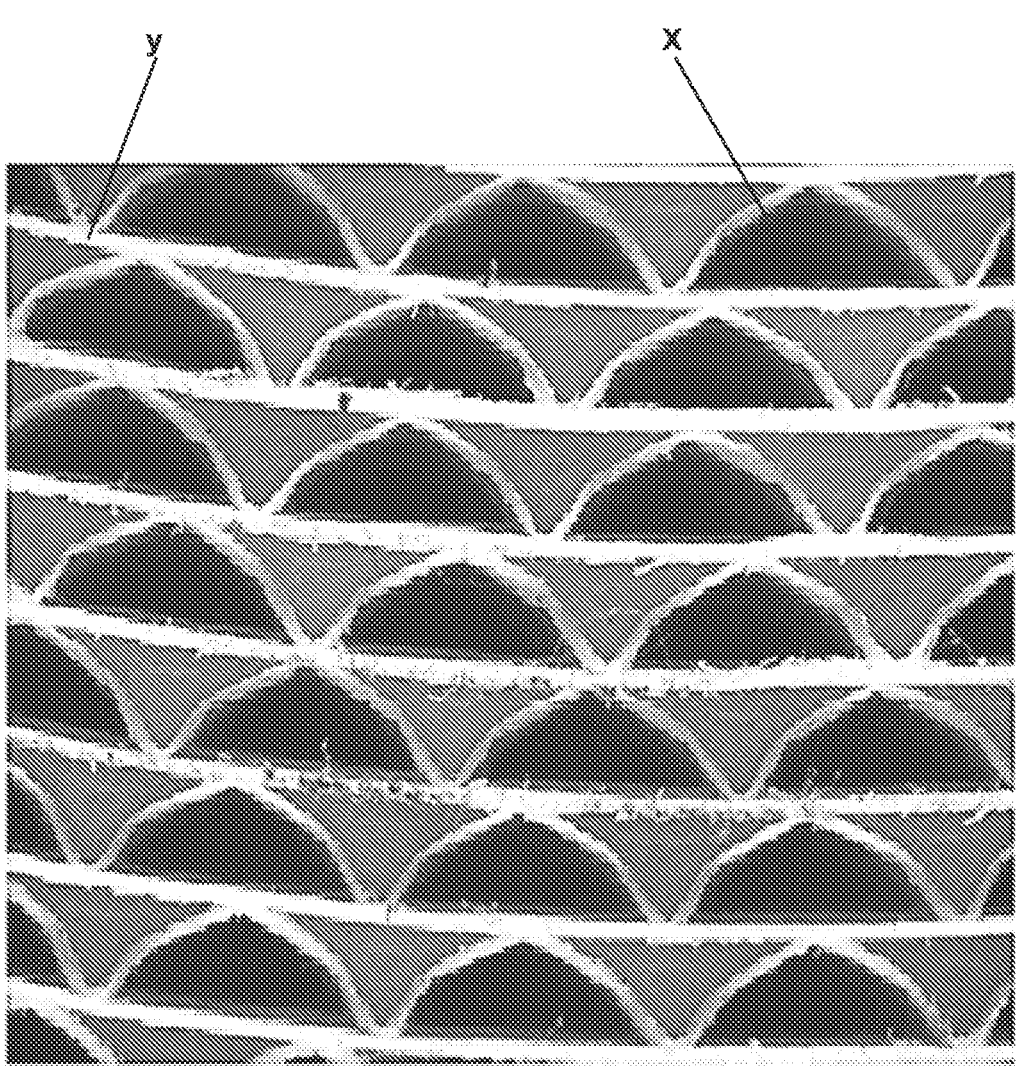
FIG. 12 is a schematic view of another variation of usable media in accord with the present disclosure.

In FIG. 12, still another possible variation in fluted sheet X and facing sheet Y is shown.

Figures 64, 65:
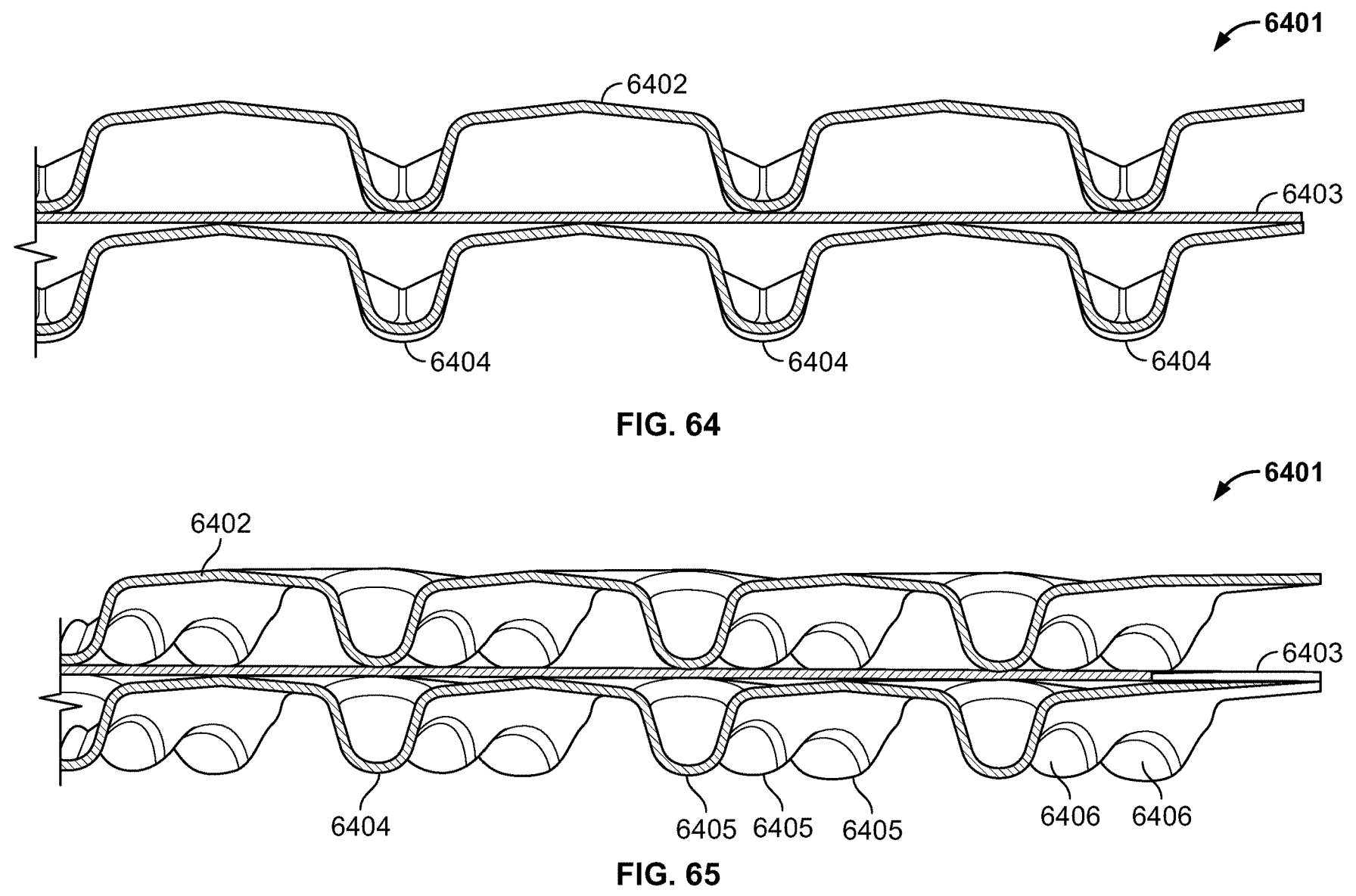

In FIGS. 64 and 65, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described for FIG. 1 herein. In the embodiment shown, the flutes 6404 of fluted sheet 6402 have an undulating ridgeline including a series of peaks 6405 and saddles 6406. The peaks 6405 of adjacent flutes 6404 can be either aligned as shown in FIGS. 64 and 65 or offset. Further the peak height and/or density can increase, decrease, or remain constant along the length of the flutes 6404. The ratio of the peak flute height to saddle flute height can vary from about 1.5 to 1 to 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials. The examples of FIGS. 9-12, 64 and 65 are meant to indicate generally that a variety alternate media packs can be used in accord with the principles herein. Attention is also directed to U.S. Ser. No. 62/077,749 incorporated herein by reference, with respect to the general principles of construction and application of some alternates media types.

E. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

II. Selected Identified Issues with Various Air Cleaners

A. General

Air cleaner designs, especially assemblies that use relatively deep filter media packs, for example using media in general accord with one or more of FIGS. 6-12, have proliferated. As to example actual products in the marketplace, attention is directed to the air cleaners of Donaldson Company, Inc. the Assignee of the present disclosure sold under the trade designation "Powercore;" and, also, to the products of Mann & Hummel provided under the designation "IQORON."

In addition, air cleaner assemblies using such media packs can be incorporated in a wide variety of original equipment (on road trucks, buses; off road construction equipment, agriculture and mining equipment, etc.) on a global basis. Service parts and servicing are provided by a wide range of suppliers and service companies.

B. Identification of Appropriate Filter Cartridges

It is very important that the filter cartridge selected for servicing be an appropriate one for the air cleaner of concern. The air cleaner is a critical component in the overall equipment. If servicing is required to occur more frequently than intended, the result can be added expense, downtime for the equipment involved and lost productivity. If the servicing is not done with a proper part, there may be risk of equipment failure or other problems.

The proper cartridge for the air cleaner of concern and equipment of concern, is generally a product of: product engineering/testing by the air cleaner manufacturer; and, specification/direction/testing and qualification by the equipment manufacturer and/or engine manufacturer. Servicing in the field may involve personnel selecting a part that appears to be similar to the one previously installed, but which is not a proper, rigorously qualified, component for the system involved.

It is desirable to provide the air cleaner assembly, regardless of media specific type, with features that will help readily identify to the service provider that an effort to service the assembly is being made with a proper (or improper) filter cartridge. Optional features and techniques described herein can be provided to obtain this benefit as described below.

In addition, assembly features and techniques which are advantageous with respect to manufacture and/or filter component integrity are described. These can be implemented with features and techniques of the type relating to helping ensure that the proper cartridge is installed in an assembly, or in alternate applications.

C. Mass Air Flow Sensor Issues

In many systems, a mass air flow sensor is provided downstream from the filter cartridge and upstream from the engine, to monitor air flow characteristics and contaminant characteristics. In some instances, minor modifications in media pack configuration and orientation, can lead to fluctuations in mass air flow sensor operation. It is therefore sometimes desirable to provide the air cleaner assembly with features in the filter cartridge and air cleaner, such that variation in air flow from the filter cartridge is managed to a relative minimum. This can facilitate mass air flow sensor use and operation. The features and techniques described herein can be provided to advantageously obtain this benefit.

D. Stable Filter Cartridge Installation

In many instances, the equipment on which the air cleaner is positioned is subject to substantial vibration and shock during operation. The types of media packs described above in connection with FIGS. 6-12, are often constructed relatively deep, i.e. with having depth of extension in the air flow direction of at least 50 mm and often at least 80 mm more, in many instances more than 100 mm. Such deep filter cartridges can load with substantial amounts of contaminant during use, and gain substantially in weight. Thus, they can be subject to significant vibration momenta during operation. It is desirable to provide features in the filter cartridge that help ensure stable positioning of the cartridge, avoidance of damage to the media (or media pack) in the event of movement, and avoidance of seal failure during such vibration and shock.

Similarly, the equipment may be subject to a wide variety of temperature ranges during storage and use. These can lead to expansion/contraction of materials relative to one another. It is desirable to ensure that the filter cartridge and air cleaner are constructed in such a manner that seal integrity is not compromised under these circumstances. The features and techniques described herein can be applied to address these concerns, as discussed below.

E. Protection Against Faulty Insertion

A variety of arrangements have been developed to address concerns of the type recited above, see, for example, WO 2006/076479; WO 2006/076456; WO 2007/133635; WO 2014/210541 and 62/097,060 each of which is incorporated herein by reference. Another issue that sometimes can rise with filter cartridge arrangements, however, is that a cartridge that does not have features for secure sealing can still be installed, in some instances, with the housing still being able to close even though an installed cartridge is not a proper one, properly sealed, for the housing of concern. It is desirable to address those issues.

More generally, it is desirable to provide a filter cartridge which solves the issues characterized herein above, but which also is configured such that the air cleaner housing will not properly close, if such a "faulty installation" has occurred, for example through use of a cartridge that appears to fit the housing, but does not have the proper sealing characteristics. The techniques described herein address this issue. They can be used in connection with the features of such arrangements as characterized in WO 2006/076479; WO 2006/076456; WO 2007/133635; WO 2014/210541 and/or 62/097,060, but they can be used independently as well. This will be understood from the following discussions.

F. Summary

The features characterized herein can be used to advantage to address one or more of the concerns described above. There is no specific requirement that the features be implemented in a manner that maximally addresses all concerns. However, selected embodiments are described in which all of the concerns identified above are addressed to a significant and desirable extent.

III. An Example Assembly, FIGS. 13-40

A. General Air Cleaner Features, FIGS. 13-15; 19, 20, 22 and 23

Figure 13:
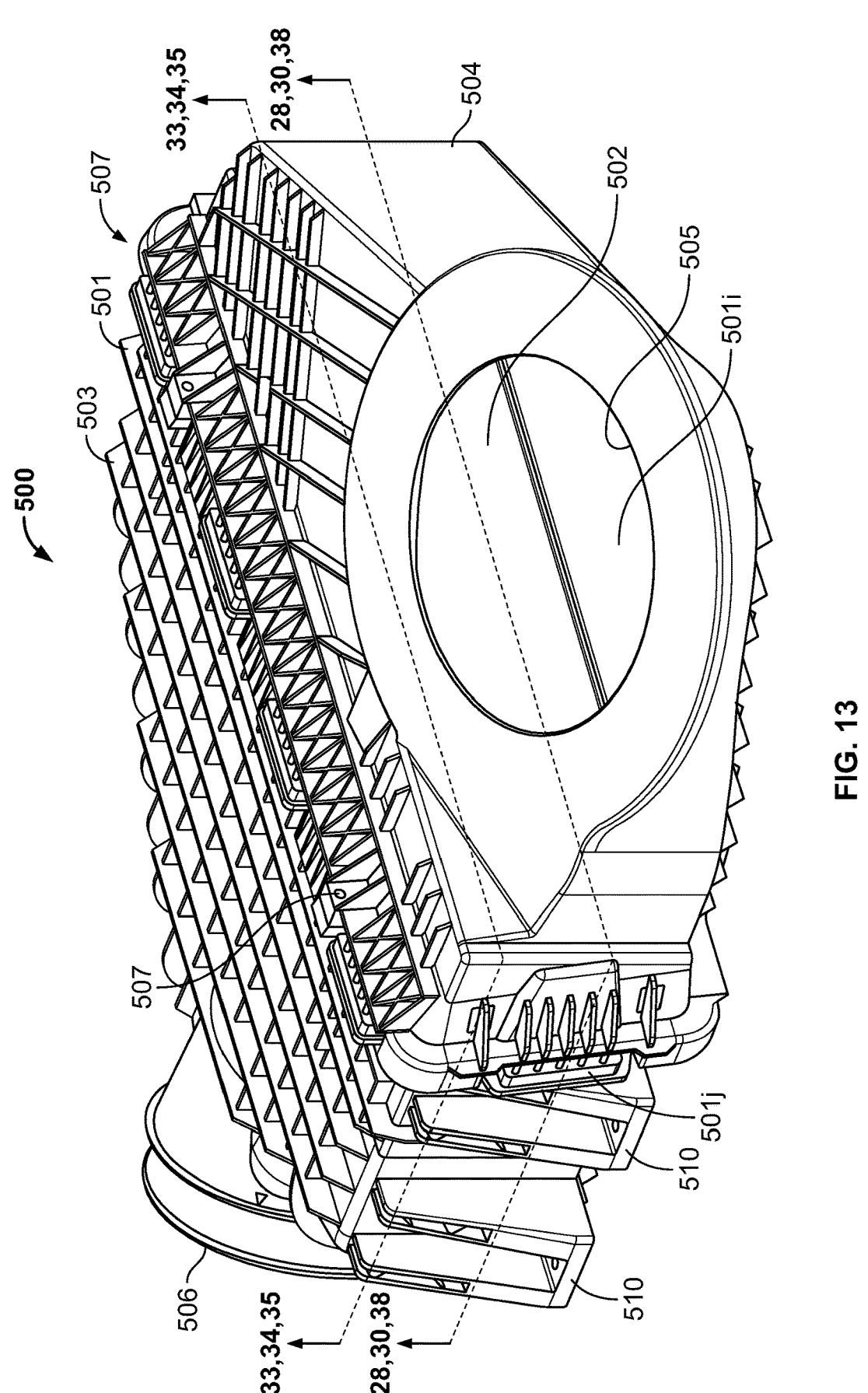
FIG. 13 is a schematic, top, perspective view of an air cleaner assembly including features and components in accord with the present disclosure.

Reference numeral 500, FIG. 13, generally indicates an air cleaner system or assembly including features in accord with the present disclosure. The air cleaner assembly 500 depicted includes a housing 501, in which a filter cartridge 502 is removably positioned. That is, the filter cartridge 502 is a serviceable component; i.e. it is removably positioned within interior 501*i* of housing 501. To accommodate such servicing, the housing 501 is generally configured in two housing sections, 503, 504, that are configured to be selectively separated or opened, for example along joint 501*j* to allow access for removal and replacement of cartridge 502. In the example air cleaner 500 depicted: section 503 is a housing body component or assembly; and, section 504 is an access cover component or assembly.

In typical use, one of the housing sections, usually housing body 503, is mounted on equipment for use; and is not removed from this mounting during servicing. Typically, the housing cover component 504 is operated as an access cover, to allow opening access to air cleaner housing 501, to service cartridge 502.

Still referring to FIG. 13, the housing 501 includes an air flow inlet arrangement 505 and a filtered air flow outlet or outlet arrangement 506. In typical operation, air to be filtered flows into the air cleaner assembly 500 through inlet arrangement 505. It passes through the cartridge 502 with filtering, and is then removed from the housing via outlet arrangement 506 to be directed to downstream equipment, for example to an engine, combustion air, intake. In the assembly of 501 depicted, the inlet 505 is generally oriented to be upwardly directed in installation and outlet 506 to be generally directed somewhat orthogonal to the inlet direction. However, alternatives are possible.

In the example air cleaner assembly 500 depicted, the airflow inlet arrangement 505 is in the access cover 504; and, the airflow outlet arrangement 506 is in the housing body 503. Alternatives are possible.

It is noted that in some air cleaner arrangements, precleaners (not shown) can be used in association with the air cleaner assembly. Precleaners can be used with principles in accord with the present disclosure.

Still referring to FIG. 13, section 504 is removably mounted on section 503 in the example depicted, by a fastener arrangement, in the example comprising bolts 507. Of course, alternate fastening arrangements, including latches, can be used.

In the example air cleaner assembly 500 depicted, the access cover housing section 504 can be completely removed from the housing body 503 during servicing. Alternatives are possible. For example, hinge mounts can be used, with principles described herein.

Still referring to FIG. 13, at 510, an optional mounting pad arrangement is depicted for securing the air cleaner assembly 500 to equipment, such as a vehicle with which it would be used. In the example, the mounting pad arrangement 510 is positioned on housing section 503, since it is section 503 that will be anchored in place on the equipment during use. Alternatives are possible.

Figure 14:
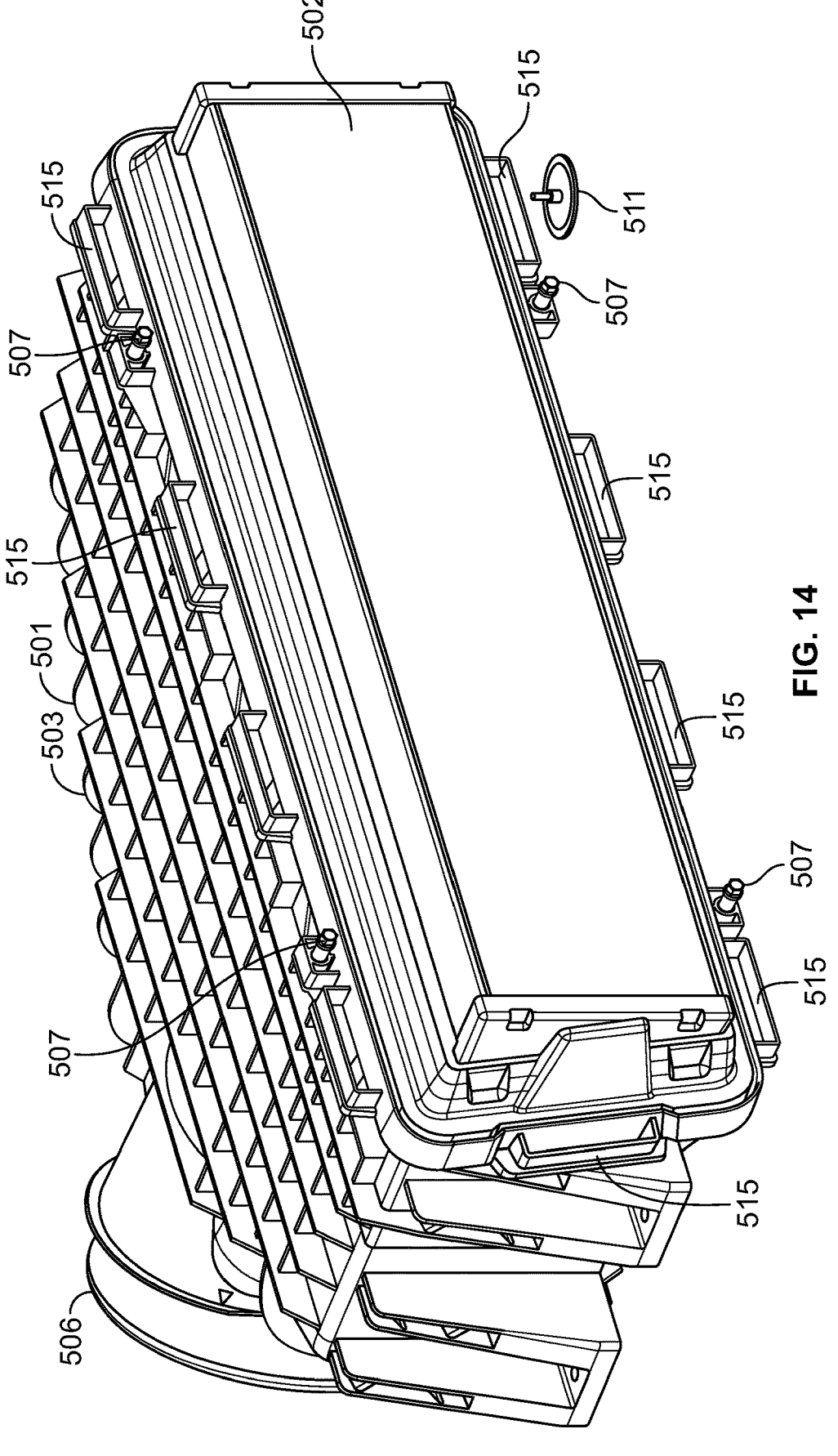
FIG. 14 is a schematic, perspective, view of the air cleaner assembly of FIG. 13, with a housing section removed, and an evacuator valve component shown in exploded view.

In FIG. 14, the air cleaner assembly 500 (of FIG. 13) is depicted with the housing section 504 (i.e. the access cover) fully removed. Thus, cartridge 502 can be seen positioned on housing section 503 as it would be when properly installed or when ready to be removed. In FIG. 14, an optional evacuator valve member 511 is shown "exploded" from the assembly 500. It would normally be included in the access cover 504 and is characterized below. Also, still referring to FIG. 14, fasteners or bolts 507 are shown where they would typically be mounted.

Also viewable in FIG. 14, is a plurality of optional, spaced, perimeter receivers 515 positioned on the housing section 503 adjacent an open end thereof. The depicted receivers 515 are open, exterior, loops on the housing that are oriented to each receive one of a plurality of projections on the access cover 504, during attachment of the access cover 504 to the housing body 503.

In more general terms, the housing 501 includes an optional projection/receiver arrangement between the two sections 503/504 that helps guide the section 504 to the section 503, as connection between the two occurs. This projection/receiver arrangement comprises a plurality of first members (see projections 536, FIG. 22) on one of the sections 503/504 and a plurality of second members 515 (e.g. receivers) on another of the sections 503/504. In this example, the receivers 515 are on the body section 503, but alternatives are possible. Also, a mixed arrangement can be used with both projections and receivers being appropriately positioned on each of the housing components or sections 503, 504.

Figure 15:
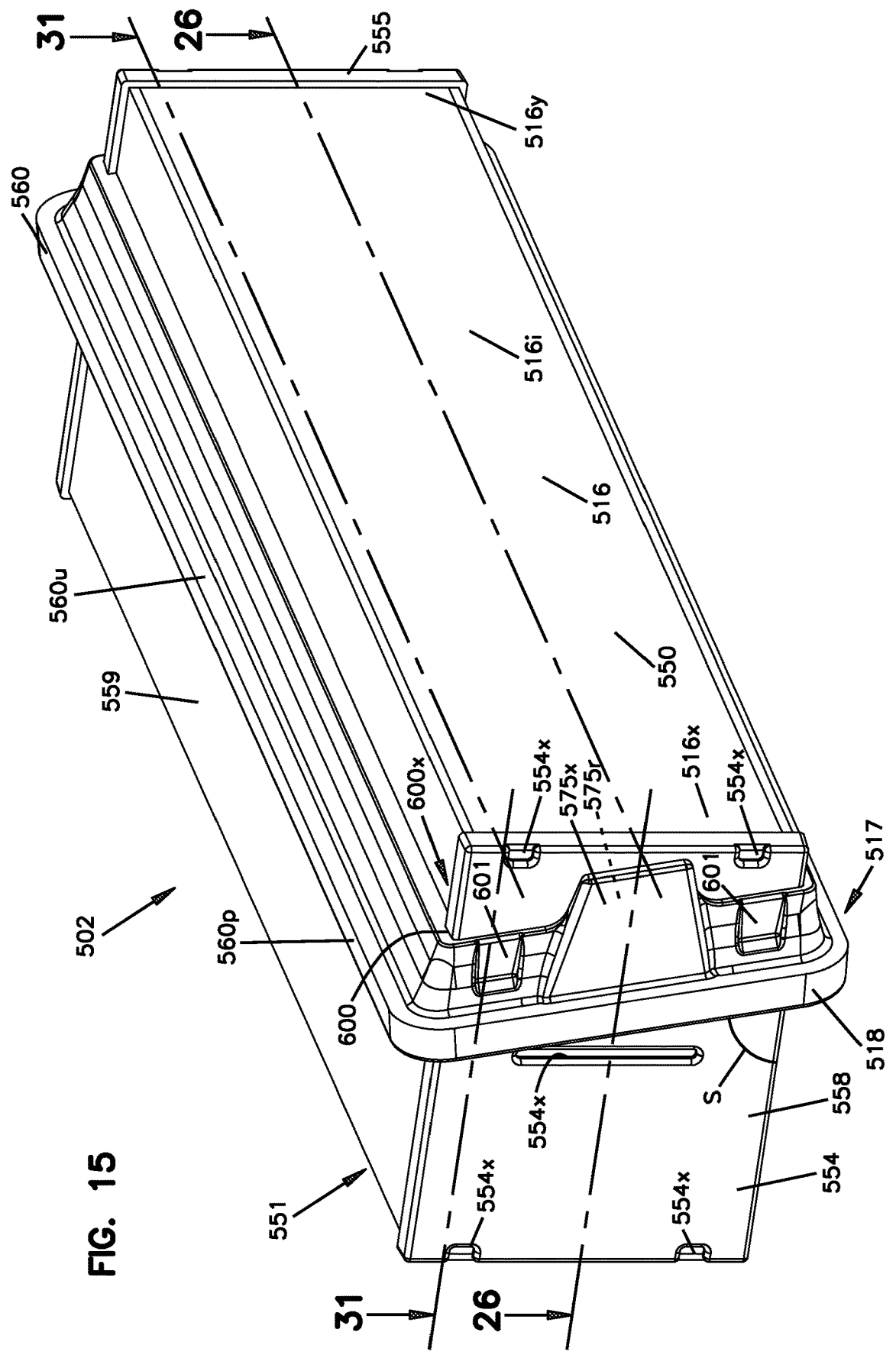
FIG. 15 is a schematic, perspective, view of a filter cartridge component installable in the air cleaner assembly of FIGS. 13 and 14.

In FIG. 15, the cartridge 502 is shown separated from the housing 501. The cartridge 502 generally comprises media 516 and a housing engagement arrangement 517 that extends around the media 516. The housing engagement arrangement 517 includes a housing seal member 518. In general, the housing engagement arrangement 517 is configured to: properly orient the cartridge 502 on the housing section 503 during installation; provide for a seal of the cartridge 502 to the housing 501 for proper air cleaner assembly operation; and, to provide for support and cushioning of the cartridge 502 in the housing 501 during use. In the example depicted, the housing engagement arrangement 517 is a molded-in-place component, which is preferred, but alternatives are possible.

Figure 19:
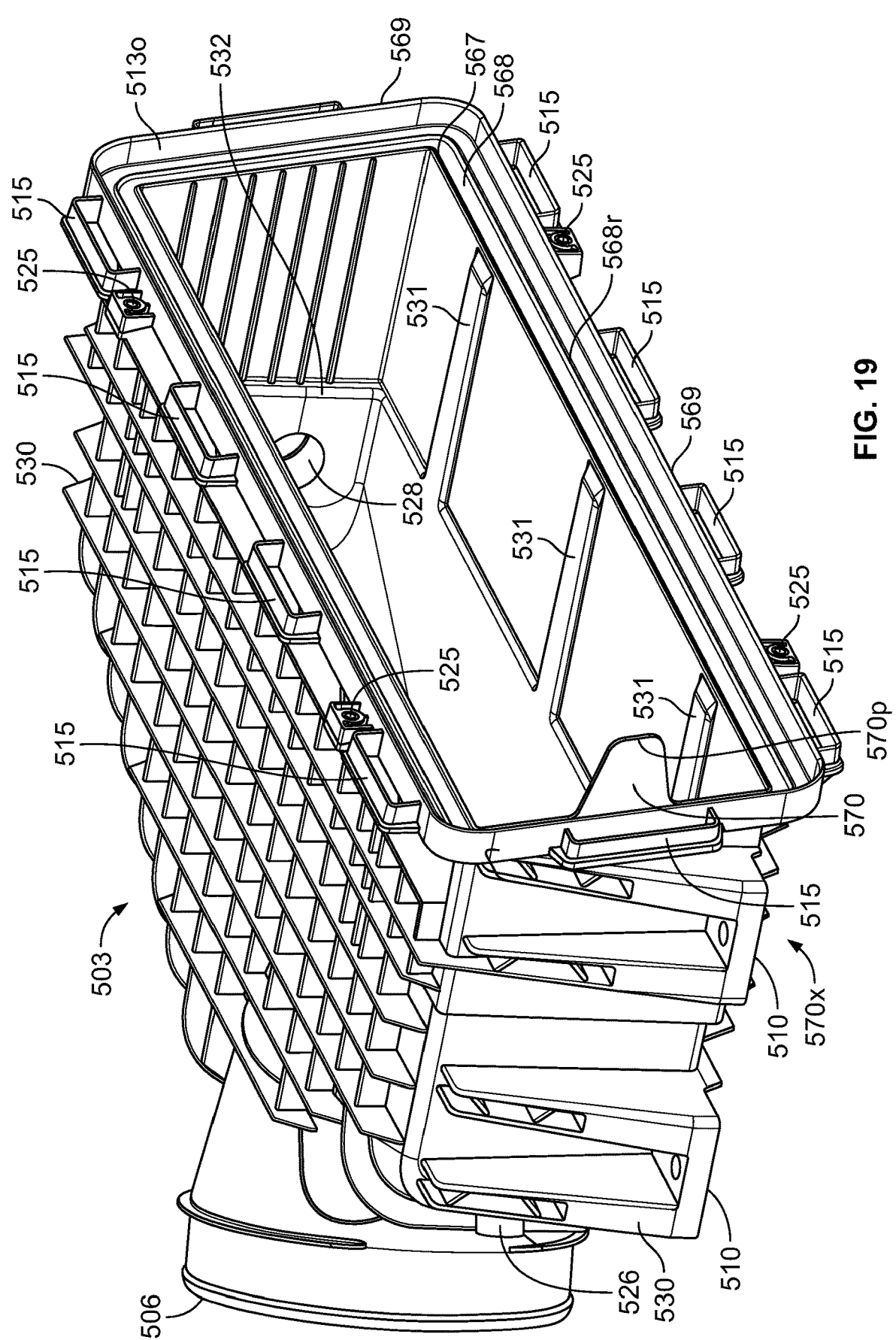
FIG. 19 is a schematic perspective view of a housing component of the air cleaner assembly of FIG. 13.

Referring now to FIG. 19, the housing section 503 is depicted, with the access cover 504 and cartridge 502 removed. Mounting pad arrangement 510 can be viewed, as can receivers 515. Also viewable in FIG. 19 are receivers 525 for the bolts 507, FIG. 14.

Referring to FIG. 19, at 526, an auxiliary port arrangement is provided that can be used to provide mounting of monitoring equipment, such as a restriction indicator, in the housing 501. Also viewable in FIG. 19, is an auxiliary filtered air outlet 528. The auxiliary filtered air outlet 528 can allow for transport of filtered air to another location, besides the outlet 506, for example for operation of equipment such as a compressed air system and/or a brake system.

Still referring to FIG. 19, additional general features can be viewed. For example, the housing body 503 includes strengthening ridges, gussets and grid work 530 thereon, for structural integrity when the housing 501 is molded from a plastic. Also, at 531 some internal, bottom, ribs are shown, against which the cartridge 502 can be positioned to slide or rest, when installed. Further, at 532 a side end abutment is depicted. This can be used to engage with an end of the cartridge 502, if desired, during cartridge installation. It can be configured with a shape for projection/receiver interaction with the cartridge, if desired. Such an abutment/interaction is shown and described in WO 2007/044677, incorporated herein by reference.

Referring to FIG. 19, it is noted that the particular air cleaner assembly 501 depicted, is configured for use without a secondary or safety cartridge. It could be configured to receive a safety cartridge downstream from the main cartridge 502, if desired.

In FIG. 19, seal surface 568 is shown, between inner rim 567 and outer rim 569. In use, a seal member 560 on the cartridge 502, discussed below, is positioned pressed against seal surface 568 between the inner rim 567 and outer rim 569, for sealing. In FIG. 19, rib 568r can be seen projecting from seal surface 568. It will press into the seal material during sealing.

Figure 20:
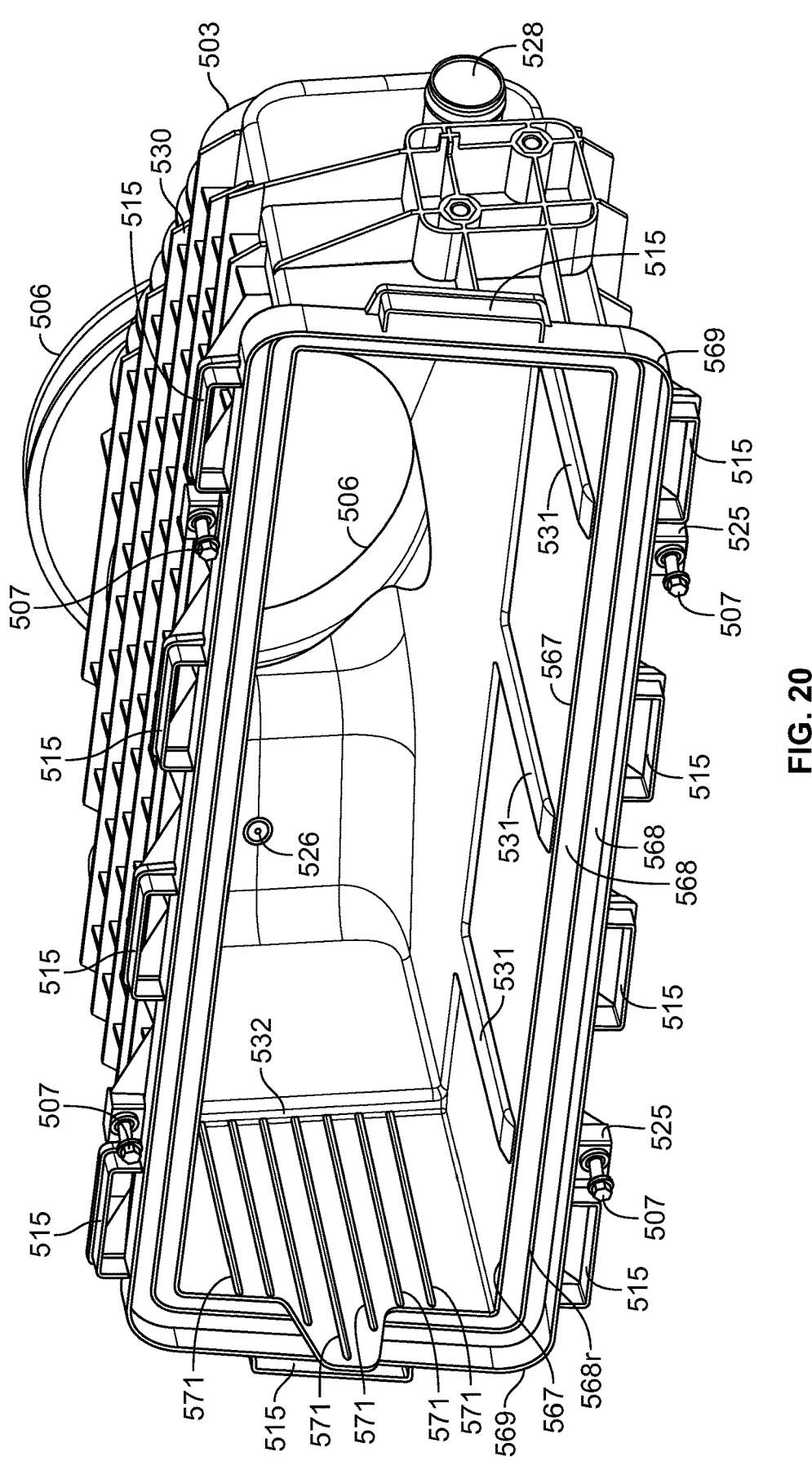
FIG. 20 is a second schematic perspective view of the housing component of FIG. 19.

In FIG. 20, a second perspective view of housing section 503 is provided. Features previously indicated and characterized include: outlet 506; auxiliary port 526; auxiliary filtered air outlet port 528; receivers 515; fastener receivers 525 for bolts 507; abutment 532; seal surface 568; rib 568r; outer rim 569 and inner rib 567.

Figures 21, 22:
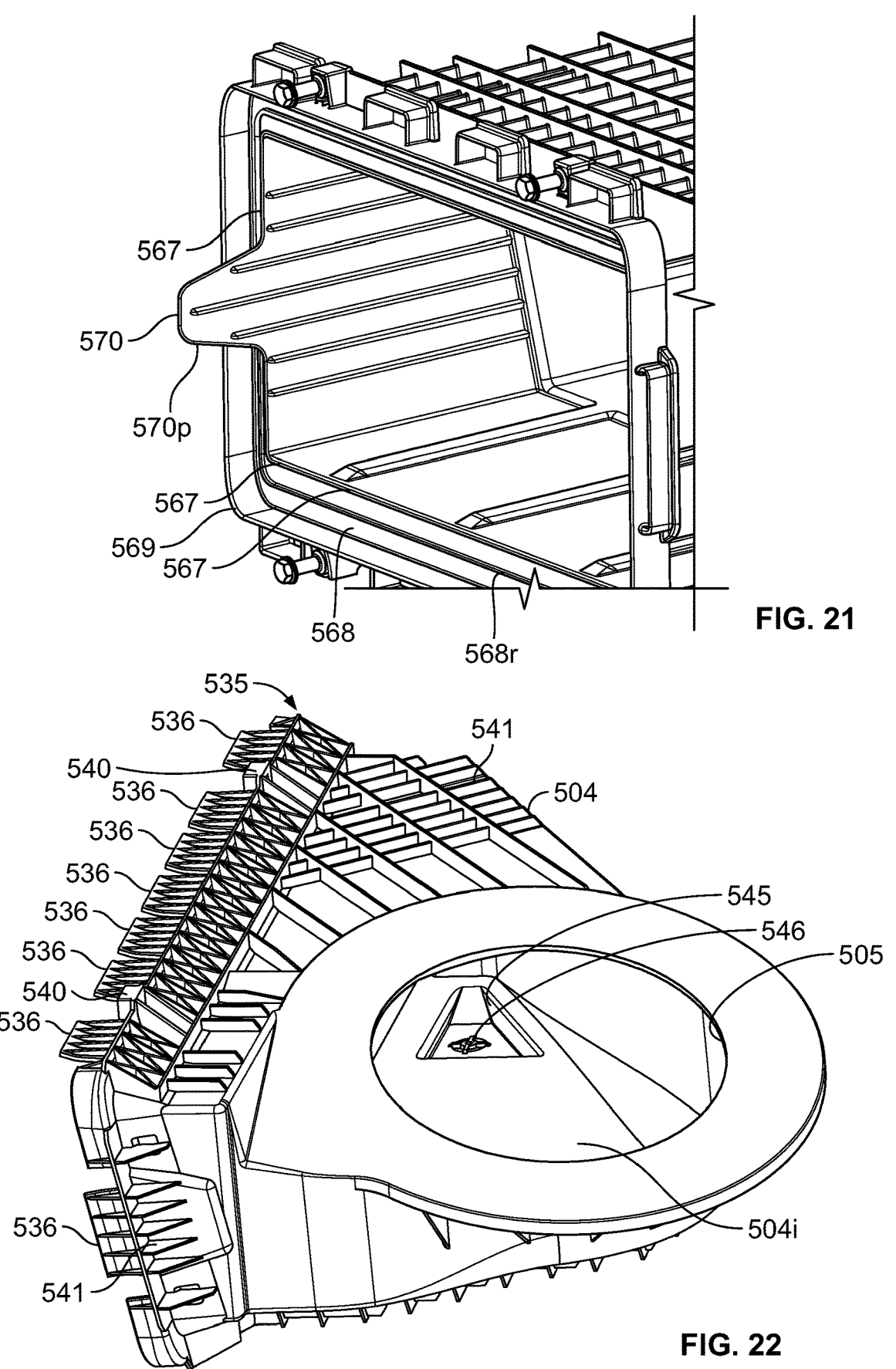
FIG. 21 is a schematic, enlarged, fragmentary, perspective view of an end portion of the housing component of FIG. 20.
FIG. 22 is a schematic top perspective view of a second housing section component of an air cleaner housing of the assembly of FIG. 13.

In FIG. 22, the second housing section 504, in the example an access cover, is depicted. One can see that, at an edge region 535 that engages section 503 in use, section 504 includes a plurality of tabs or perimeter projections 536 at least a portion of which are oriented to push into receivers 515, during installation. Thus, together receivers 515 and projection arrangements 536 comprise a projection/receiver arrangement for engagement. Again, the projection/receiver arrangement can be configured with a projection arrangement on the first section 503 and a receiver arrangement on the second section 504, or with portions of each on each.

Still referring to FIG. 22, the section 504 also includes a plurality of perimeter receivers 540 for bolts or other fasteners during installation. Further, section 504 includes various grid work, ribs, and gussets 541 for strength and material integrity.

In FIG. 22, through inlet arrangement 505, an interior 504i of section 504 can be seen. At 545, a bottom drain depression or recess in a portion of section 504 that will be upstream of the cartridge 502, in use, can be seen. This bottom drain, depression or recess 541 can be used for collection of water, and drainage of that water through drain aperture 546, during use. An evacuator valve member 511, FIG. 14, and referenced above, can be positioned over an exterior of drain aperture 546 in to facilitate control of evacuation of such material. Such drain arrangements are known in air cleaner assemblies; see for example WO 2007/133635 incorporated herein by reference.

Figure 23:
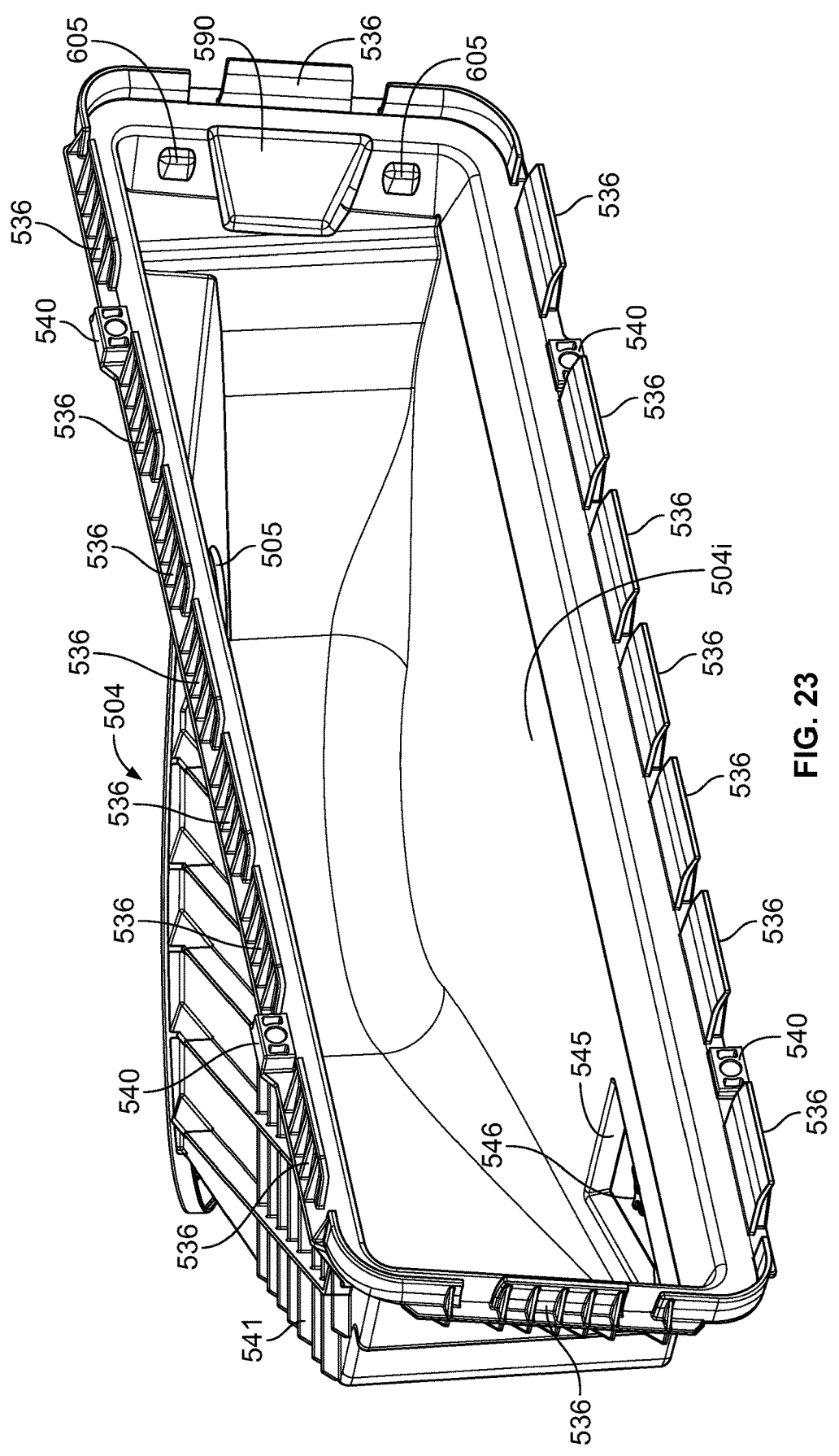
FIG. 23 is a schematic, second, perspective view of the housing section of FIG. 22, taken toward the inside thereof.

In FIG. 23, a second view of the access cover or housing section 504 is depicted. Here, some features previously characterized can also be seen such as, for example: a portion of air flow inlet arrangement 505 is viewable; as are interior 504i; recess 545; drain outlet 546; projections 536; and, bolt receivers 540.

B. Selected, General, Filter Cartridge Features, FIGS. 15-18

Attention is again directed to FIG. 15, in which the cartridge 502 is depicted. The cartridge 502, as indicated previously, comprises media 516 and a housing engagement arrangement 517.

Figure 17:
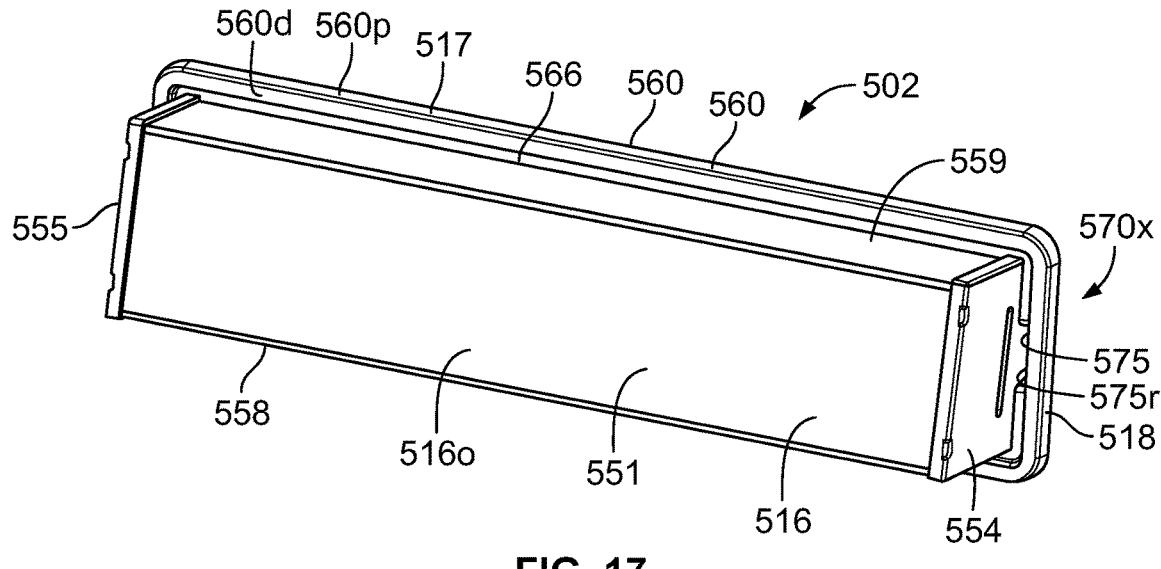
FIG. 17 is a second schematic perspective view of a filter cartridge of FIG. 15; the view of FIG. 17 being toward an opposite end of the cartridge than the view of FIG. 15.

In general terms, the cartridge 502 has opposite flow ends 550, 551. During filtering, air passes through the filter cartridge in a "straight through" flow direction between the flow ends 550, 551. Typically, one of the flow ends will be an inlet flow end or flow face, and the other will be outlet flow end or flow face. Although alternatives are possible, for the example filter cartridge 502 depicted, when used with the depicted air cleaner 500, FIG. 13, flow end or face 550 is an inlet end for unfiltered air, and opposite flow end or face 551 is an outlet end for filtered air. In FIG. 17, cartridge 502 is shown in a view taken toward the flow outlet end 551.

In general terms, cartridges of the type of cartridge 502 will be characterized herein as configured for "straight through flow", or "axial flow" during use, referring to the fact that, generally, the cartridge 502 and the media 516 are configured so that air enters and leaves the cartridge 502, during filtering, with flow along the same direction. This can be accommodated with any of the media types referenced herein above, and variations.

The example cartridge 502 depicted in FIG. 15, generally has a "rectangular" perimeter shape in a plane perpendicular to the flow direction; and, as a result, a rectangular inlet end or face 550 and a rectangular outlet end or face 551. Alternate shapes are possible, including, for example, oval, and other perimeter shapes.

For the example cartridge 502 depicted, the media 516 is configured to have an inlet end 516i adjacent the cartridge inlet end 550; and, an opposite outlet end 516o, not viewable in FIG. 15, see FIG. 17. The opposite surfaces or ends 516i, 516o are each depicted as generally planar, and each is in a plane generally perpendicular to a flow direction through the cartridge 502. With the types of media characterized above that have fluted media sections secured to facing media sections, this will be typical; although alternatives are possible. For example, the surfaces 516i, 516o can be slanted relative to the flow direction; and/or can be configured with variations therein, for example recesses or projections. For example, variations of the type as found in WO 2007/133635; WO 2005/123222; and, WO 2007/044677, can be used with arrangements according to the present disclosure.

Still referring to FIG. 15, the particular cartridge 502 depicted, includes opposite side panels 554, 555 at opposite ends of the media 516. The opposite panels 554, 555 can be used with a variety of types of media characterized herein, to close opposite media ends 516x, 516y and to provide structural integrity. Of course, if an oval unit is used, or with alternate media, there may not be a need for such panels 554, 555. The use of opposite panels for closing various ones of the types of media characterized herein, above have been described, for example, in use with similar rectangular media packs in such references as WO 2005/123222; WO 2006/017790; WO 2006/076479; WO 2006/076456; and, WO 2007/133635 incorporated herein by reference. The panels 554, 555 can be (and typically and preferably will be) molded-in-place, but they can comprise preformed pieces that are secured over the media ends 516x, 516y with sealant.

The particular panels 554, 555 depicted are molded-in-place, for example from a material such as a polyurethane that will seal the opposite ends 516x, 516y closed. The panels 554, 555 may have mold artifacts therein, such as artifacts 554x, FIG. 15 in panel 554, resulting from media stand-offs used in a mold during molding in place of the panel 554.

Still referring to FIG. 15, the particular cartridge 502 depicted is shown having optional, opposite, cover pieces or panels 558, 559 thereon, extending across and closing the media pack 550 in extension between the opposite ends 516x, 516y, i.e. in extension between the opposite panels 554, 555. Such panels or cover pieces 558, 559 can be useful, for example, to protect the cartridge media 516 during handling. They can be molded-in-place, or they can comprise separate pieces attached to the media. In the example depicted, they comprise plastic sheets, for example comprising a polycarbonate plastic secured in place by being embedded in molded-in-place panels 554, 555. Alternatives are possible, such as a plastic net. When constructed in the manner shown, generally sealant will be provided between the panels 558, 559 and the media 516, to prevent a leak path through the cartridge 502.

In some applications, of the techniques described herein, the covers 558, 559 on each surface can each be configured in two pieces, with a joint between them located underneath a molded-in-place arrangement 517, such that the molding-in-place of arrangement 517 can be, in part, directly to the media to help provide sealing.

As indicated previously, the cartridge 502 includes housing engagement arrangement 517. The housing engagement arrangement 517 is generally a perimeter arrangement, i.e. it extends around a perimeter of a remainder of the cartridge 502. A portion of the housing engagement arrangement 517 generally comprises the housing seal member 518, for example a pinch seal flange 560. The housing seal flange 560 is generally positioned and configured to form a seal with the housing 501, when the cartridge 502 is properly installed. The particular housing seal member 518 depicted is a pinch seal flange 560 that is configured to be pinched between housing sections 503/504 when the housing 501 is closed.

A critical surface for sealing of the housing seal arrangement 518, is a typically more downstream surface; i.e. a surface that would engage the housing 501, during use, at a location toward a clean air side of the system 501. In the example, this is a surface that is pressed into sealing with body 503. That surface is the more critical sealing surface, since it is on the downstream or clean air side of the seal 560. This referenced more critical seal surface is indicated generally in FIG. 17, at 560*d*.

Referring to FIG. 17, it is noted that surface 560*d* is generally a flat, planar, featureless, surface in the example depicted. It can be varied (contoured) with features, for example contoured in accord with the disclosures of WO 2014/210541 and/or U.S. Ser. No. 62/097,060, incorporated herein by reference; and/or, in variations depicted and discussed below.

Referring back to FIG. 15, opposite to surface 560*d* the pinch seal member 560 includes an upstream pinch seal surface 560*u*, which is generally engaged by a flange or other structure on the access cover or housing section 504, during installation. This is where, in the example depicted, pressure is applied to the pinch seal member 560 during pinching, to ensure that the surface 560*d* seals against an appropriate surface 568 in the housing section 503. Sealing at surface 560*u* is less critical than at surface 560*d*, in the example depicted.

Still referring to FIG. 15, located in extension between opposite pinch seal surfaces 560*u*, 560*d*, seal member 560 includes an outer, peripheral, surface 560*p*. The outer peripheral, surface 560*p* is generally configured to fit within selected housing features, such as rim 569, FIG. 19, as needed for proper installation.

The thickness of region 560, between surfaces 560*d*, 560*u* can be varied. It will typically be at least 5 mm, and usually not more than about 20 mm, often it will be between 5 mm and 15 mm, but variations are possible.

Figure 16:
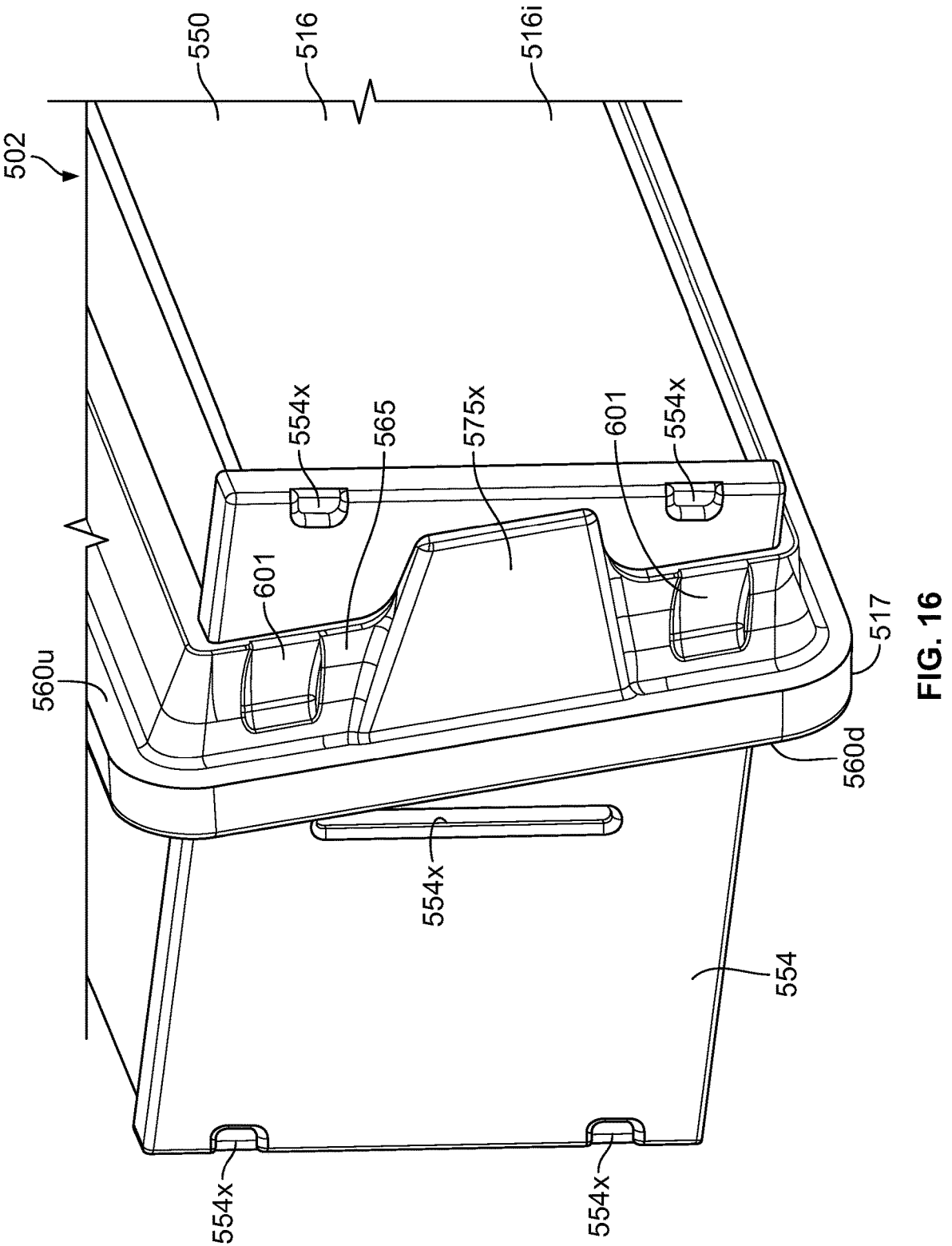
FIG. 16 is a schematic, enlarged, fragmentary, perspective view of a portion of the filter cartridge depicted in FIG. 15.

Referring to FIGS. 15 and 16, the example depicted seal surface 560*d* is configured and positioned with at least a portion that extends generally non-orthogonally to a flow direction through the cartridge media 516 (i.e. to a direction between ends 550, 551). The principles described herein can also be used with an alternate arrangement that does extend orthogonally, for example the alternate embodiment of FIG. 42.

When the seal surface 560*d* has at least a portion that extends non-orthogonally as shown, the pinch seal 560 may sometimes be referred to as a slanted seal. In the example depicted, especially when surface 560*d* is generally planar, the slant(s) can be defined as a seal slant angle, for example of at least 2° from the orthogonal. Typically, when a slant angle is used, the slant angle would be generally at least 4°, usually at least 5° and often within the range of 5°-30°, for example 7°-20°. Of course, alternatives are possible. Slanted pinch seals usable with filter cartridges of the general type characterized herein, are described for example in WO 2006/076456 and WO 2006/076479, incorporated herein by reference.

Referring to FIGS. 13, 14 and 15, it is noted that when the seal arrangement 517 is provided with a pinch seal member 560 that extends non-orthogonally to a flow direction through the cartridge, the cartridge 502 can be configured, in association with the housing 501, such that the cartridge 502 can only be installed in one rotational orientation relative to the housing 501. This can be advantageous in some instances, but is not required.

Also, referring to FIG. 15, it is noted that an extension across the opposite panel 554 or 555, the seal 560 extends non-orthogonally; but, generally, in extension between the panels 554 or 555, i.e., along the longer dimension of the depicted cartridge in FIG. 15, the pinch seal member 560 generally extends along a path of extension perpendicular to the flow direction. This is typical, but alternatives are possible.

Also, it is noted that when it extends across one of the sides 554, 555 of the rectangular configuration, the pinch seal member 560 generally extends along a straight path. While this is typical, alternatives are possible.

Even if surface 560*d* has some irregular or non-planar characteristic to it, for example of the type in WO 2014/210541, the remainder of the seal may still be indicated as defining a plane or slant plane in accord with the principles characterized. That is, even if surface 560*d* is not planar, but rather is contoured, the overall seal 560 may be characterized as having a general slant angle. Again, alternative shapes and possibilities are possible, however.

Still referring to FIG. 15, the housing engagement arrangement 517 includes a base, support or web portion or member 565 which supports the pinch seal member 560 on a remainder of the cartridge 502. The particular support or web portion 565 depicted is molded integral with the peripheral pinch seal member 560, although alternatives are possible. Being molded integral with one another is preferred, as it avoids any need for a seal between the two.

Again, the housing seal member could be molded onto a not molded-in-place support, which is then attached to the cartridge. This may be convenient in some applications, but, again, typically a single molded-in-place piece will be preferred.

Also, the particular housing engagement arrangement 517 is molded-in-place on a remainder of the cartridge, as a peripheral component. This will be typical and preferred, as it helps ensure good secure sealing between the two, with good structural integrity. The portion of the housing engagement arrangement 517 that is in engagement with the remainder of the cartridge 502 is generally the web or support portion 565.

Attention is now directed to FIG. 17, a view of the filter cartridge 502 taken toward the exit end 551, i.e. an end opposite that viewable in FIG. 15. Attention is particularly directed to recess or groove 566. The recess or groove 566 is positioned between a portion of a pinch seal member 560 and a remainder of the cartridge 502. The groove 566 is a recess, receiver or groove positioned to receive, projecting therein, inner rim portion 567 of a housing 501, see FIG. 20, during installation. The example depicted recess, groove or trough 560 extends completely, peripherally, around the cartridge 502 at a location between seal member 560 and the media 516. Alternatives, i.e. discontinuous recesses, can be used, especially with a discontinuous rim 567. For example, it may be advantageous to provide gaps in the recess at the "corners" when the trough otherwise defines a generally rectangular configuration. An example of this would be to provide a "trough" that extends with straight sections along each of the four sides, but which terminates as trough sections extend toward (i.e. into or around) at least one, and typically, each one, of the four corners. That is, in some instances the trough would have no corners. Indeed, the recess 566 is optional in some applications.

For the particular example depicted, and referring to FIG. 19, the housing section 503 includes an optional rim section 567, sized and configured project into recess 502 as installed. This rim 567 can be continuous or discontinuous, and provides a number of functions. First, it helps the cartridge 502 to snuggly rest. Secondly, it provides an isolation function between the pinch portion 560 and the cartridge body that tends to stabilize the cartridge body as it begins to load with dust and gain weight, and thus vibration momentum. Such a trough or recess is generally described, for example in such references as WO 2006/076479; WO 2006/076456; WO 2006/017790; WO 2007/133635; U.S. Ser. No. 62/097,060; and, WO 2014/210541, incorporated herein by reference.

Also referring to FIG. 19, it is noted that seal surface 568 in the housing section 503, which is a surface against which seal surface 560$u$ is compressed during sealing, includes a central rib 568$r$ therein, extending peripherally around the cartridge (or housing interior). This rib 568$r$ will press into surface 560$u$ in pinch seal member 560, during installation, to facilitate sealing. Also, seal surface 568 is positioned recessed between two walls, namely: rim 567 and outer rim or wall 569. This is typical.

Features such as rib 568$r$ are described in WO 2014/210541. The rib 568$r$ will typically be continuous, and project at least 0.5 mm, for example 0.5 to 3 mm, from immediately adjacent portions of the housing 501.

C. An Installation Security Arrangement Between the Filter Cartridge and Housing 1. General Herein, a security installation inhibition arrangement among a filter cartridge and housing is described and provided, that will help ensure that unless a cartridge is a proper, authenticated, one with proper seal features, it will not be able to be positioned in an air cleaner housing such that the housing can be closed during installation. This will prevent a service provider from accidently installing a cartridge that appears to fit, but is not the proper, authenticated, cartridge for the system.

In particular, as indicated above, servicing is often done in the field and may be done by service providers who have access to a variety of cartridges. It can be very important to ensure that the cartridge being installed is not a cartridge which appears to fit, but which is not the proper cartridge for the system. A manner in which this can be controlled, is by using an arrangement involving engagement between the cartridge and the housing that prevents the cartridge from appearing to be fully and properly nested in sealing position, unless it is the proper cartridge.

A variety of approaches to addressing this are characterized herein. These features, can, for example, be positioned for engagement between the cartridge 502 and housing body

503; and/or, they can be configured for engagement between the cartridge 502 and access cover 504. Examples of each are characterized, and they can be used independently or together.

Herein, a feature or features that prevent the access cover from being able to be fully closed unless the cartridge is a proper, properly sealing, authenticated, cartridge appropriately inserted, will sometimes be referred to as a "security, housing closure, inhibition arrangement" or by similar terms.

A variety of features usable to accomplish this effect are described and presented herein.

2. A First Example Secondary Housing Closure Inhibition Arrangement Relating to Interaction Between the Cartridge 502 and the Housing Body Section 503

Referring first to FIG. 19, housing section 503, which in the example is the downstream housing section, is provided with an open (inlet) end 513$o$ having a projection arrangement 570 thereon, which comprises a first member of a security, housing closure, inhibition arrangement 570$x$. In the example depicted, the projection arrangement 570 comprises a single projection 570$p$, although alternatives are possible. Also, in the example depicted, the projection 570$p$ is located aligned with one of the shorter sides of the housing 501 (or section 503), but alternate locations are possible.

In general, if an attempt is made to install a wrong cartridge (which would otherwise appear to fit the housing section 503, but which is not a proper cartridge for the system 500 of concern) projection arrangement 570 will engage that wrong cartridge and prevent it from being able to be fully positioned or nested in the housing section 503 and would thus prevent the access cover 504 from being able to be mounted. However, if the cartridge 502 is a right or proper one, the cartridge 502 will have a second member of a projection receiver arrangement properly positioned to receive projection arrangement 570, and allow the cartridge 502 to be pushed into a proper, fully nested, position for the access cover 504 to then be installed.

Still referring to FIG. 19, it is noted that the particular projection arrangement 570 is located on the radially inner rim projection 567 that extends into a cartridge recess 566 (FIG. 17), during installation. Alternatives are possible. The principal issue is to have the projection arrangement 570 sized and configured so that it will engage a portion of housing engagement arrangement 517 preventing full cartridge installation into housing section 503, unless a proper cartridge 502, properly positioned, used.

In FIG. 20, projection arrangement 570, i.e. projection 570$p$ can be seen from the inside. Strengthening ribs 571 are viewable. In FIG. 21, an enlarged, fragmentary, perspective view is provided somewhat analogous to FIG. 20, but at a greater angle.

Attention is now directed to FIG. 17, for an understanding of a portion of the example security, housing closure, inhibition arrangement 570$x$ that is positioned on the cartridge 502. In particular, and again referring to FIG. 17, the cartridge 502 is depicted toward the outlet end 516$o$, i.e. toward the portion of the cartridge 502 that is received on or against the housing section 503 during installation. The seal arrangement 518, comprising pinch seal member 560 with downstream seal surface 560$d$, is viewable. At 566, the recess characterized above that receives rim 567 on the housing 501 is shown. It is noted that this recess 566 is sufficiently shallow so that it would be engaged in an inhibition manner (to installation) by projection arrangement 570, FIG. 19, unless there was adequate additional relief in it to allow full installation, as a result of the present invention. This relief is viewable in FIG. 17, as receiving pocket arrangement 575. The particular depicted receiving pocket arrangement 575 comprises a single pocket 525r, since there is only one projection 570p, and only one possible proper installation orientation for the cartridge 502. Receiving pocket or receiver 580r is configured so that if the cartridge 502 is installed in the housing 503, projection arrangement 570 will not block the housing engagement arrangement 521 from full installation. However, if an attempt is made to install a cartridge that is relatively similar to cartridge 502, but which does not include an appropriately positioned receiving pocket 575r, the projection 570 will interfere with a housing engagement arrangement 517, preventing full cartridge installation, and ultimately, preventing full access cover closure.

Figure 18:
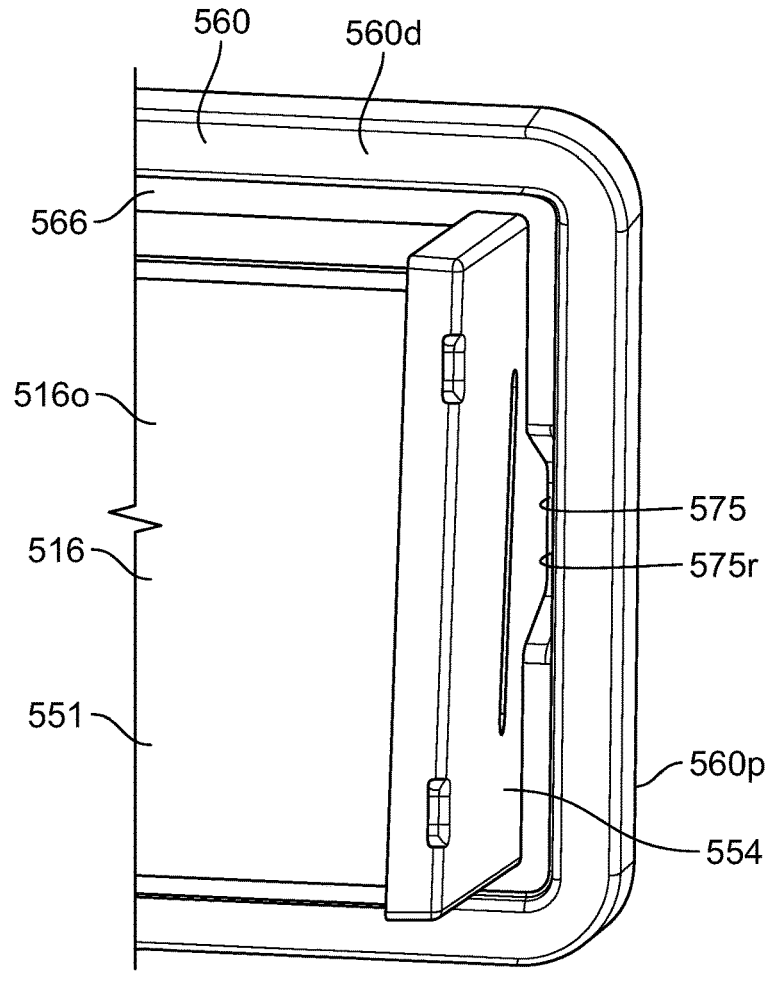
FIG. 18 is a schematic enlarged fragmentary view of a portion of the filter cartridge of FIG. 17.

In FIG. 18, an enlarged fragmentary view is depicted showing the arrangement 575, i.e. receiver 575r.

As indicated above, the particular example arrangement depicted includes a single projection 570p in the projection arrangement 570. In the example depicted, cartridge 502 included a single mateable receiving member 575, i.e. pocket 575r.

The receiving member 575 may comprise a plurality of pockets 575r, if desired; and, the projection arrangement 570 could comprise a plurality of projections 570p if desired.

Again, as indicated above, when the seal the member 560 is configured as shown, and the housing 501 is analogously configured for engagement, the resulting cartridge 502 can only be installed in a single rotational orientation due to the slanted seal 560d. However if a similar arrangement was used, but without a slant in the seal 560d, the cartridge could theoretically be positioned in any one of two rotational orientations. When such is the case, it may be desirable to have two pockets 525r one each on opposite sides of the cartridge, each configured for possible full engagement with the projection 570p, even if a single projection 570p is used, again to accommodate the two possible rotational installation orientations.

If it is desired to control the number of rotational orientations to one, then even if the seal 560 is not slanted, it may be desirable to have only one receiving pocket 575r.

In FIG. 15, at 575x, an exterior view is shown of an exterior portion of housing engagement component 517, under which the interior receiver or pocket 575r is located.

Herein the pocket 575r is characterized as a "interior pocket", when in the configuration shown, since it is positioned interiorly of portions 575x of the housing engagement arrangement 517, i.e., it is not on an exterior surface of the cartridge but rather is an interior arrangement. It is also a "closed" interior arrangement, in that it is not open in any fashion to the exterior, when used, but rather contains the projection member 570p. when used, in the manner shown.

Referring to FIG. 23, the access cover 504 can be seen as having an internal recess or receiver arrangement 590 therein to provide clearance for receipt of this member 575x.

In the example, since there is only one member 570p, one pocket 575r, and the access cover 504 can only be mounted in one orientation, there is only one receiver 590r in arrangement 590. Of course, alternatives are possible.

Figures 24, 25:
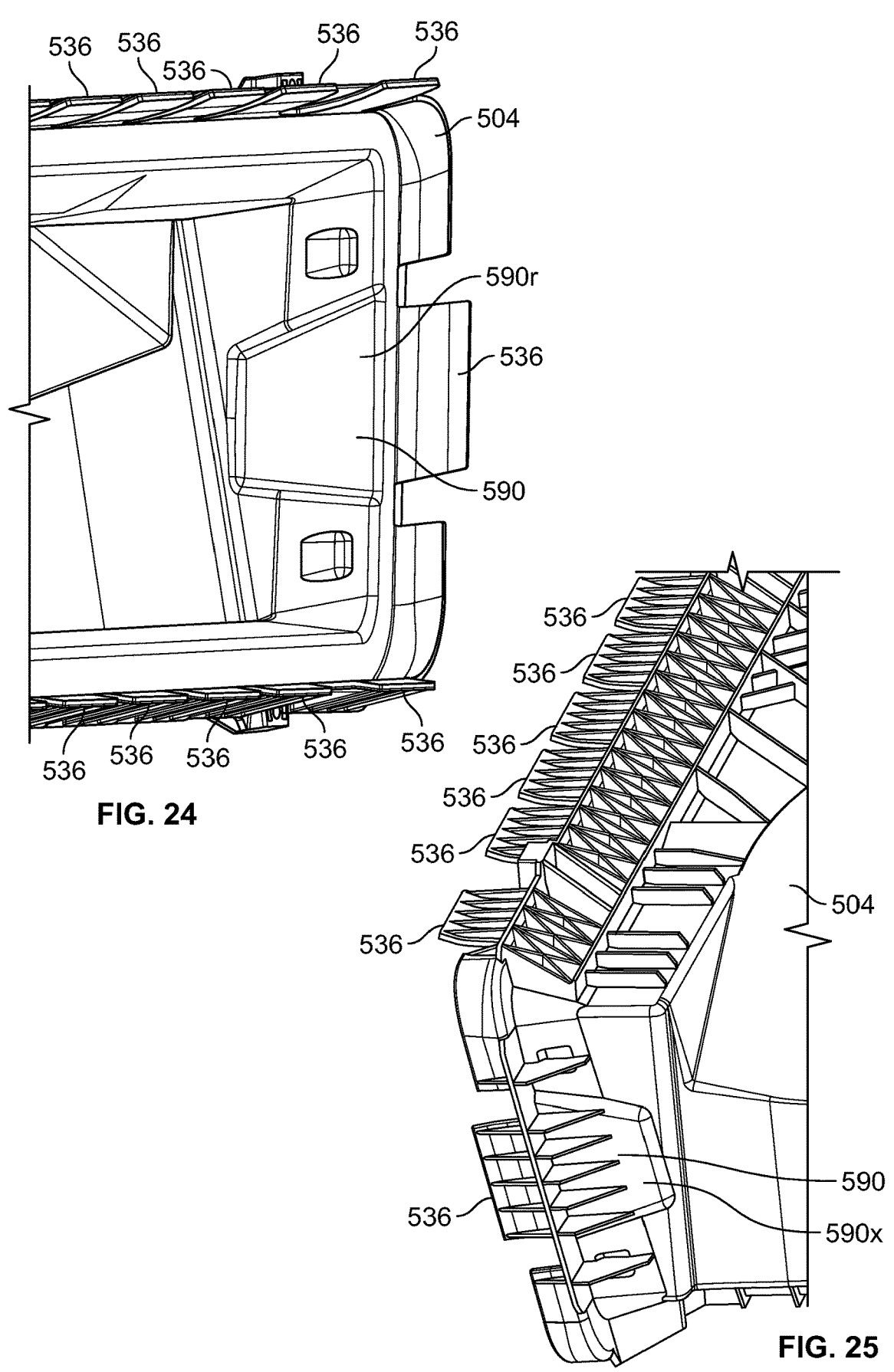
FIG. 24 is a schematic, enlarged, fragmentary, perspective view of a portion of the housing section of FIG. 23, taken toward an interior portion thereof.
FIG. 25 is a schematic, enlarged, fragmentary, perspective view of an exterior portion of the cover section of FIG. 22.

In FIG. 24, an enlarged fragmentary view of the receiver arrangement 590 and recess 590r are provided.

In FIG. 25, an exterior fragmentary view of a portion of the access cover 504 is provided. Here, exterior portion 590x for the receiver arrangement 590 is shown. This exterior section 590x provides that one can easily observe in the assembled air cleaner 500, see FIG. 13, that it is an air cleaner arrangement that has a security, housing closure, inhibition arrangement in accord with selected features of the present disclosure.

In the example depicted in this section, the security, housing closure, inhibition arrangement described comprises a projection/receiver arrangement with: one member on the housing section 503 that comprises the downstream or clean air side; and, a second member on the cartridge 502. This type of arrangement will sometimes be characterized here as a "downstream" feature or arrangement, since the portion on the housing that engages the portion on the cartridge is positioned for insertion toward a downstream side of the seal arrangement 560. Alternatives are possible, as will be apparent from discussions below.

Also, it is noted that portion of the security, housing closure, inhibition arrangement on the housing 503 (i.e. the projection arrangement 570 or projection 570p is positioned radially inwardly from perimeter 560p of the housing pinch seal member 560, in particular radially inwardly from surface 560d. Alternately stated, projection arrangement 570 (projection 570p) is positioned radially inwardly from where sealing occurs between the associated housing component 503 and the seal member or arrangement 560 on the cartridge 502. By "radially" inwardly in this context, it is meant that the positioning is interiorly of a pattern defined by the seal service 560d, and/or perimeter 560p, i.e. toward a central flow direction axis of the cartridge 502. Such configurations will sometimes be characterized as a "radially interiorly engaging" arrangement, or by variants thereof. Alternatives to radially interiorly engagement arrangements are possible.

It is also noted that the particular projection arrangement 570 (i.e. projection 570p) depicted, is positioned on the ridge 567 characterized above. This is typical and straightforward to assemble and use, but alternatives are possible.

3. An Example Security, Housing Closure, Inhibition Arrangement Involving the Access Cover or Housing Section 504

Above, a security, housing closure, inhibition arrangement is characterized, which would prevent a cartridge from sufficiently nesting in a housing section 503, for the access cover 504 to be mounted, unless the cartridge included features for proper mating, such as receiver recess 575r. The particular, preferred, approach characterized is between the housing body and cartridge 502, so that even before an installer begins to put the access cover in position the installer would know that the cartridge was not a proper, authenticated, one that can be properly installed for use.

An alternate or additional approach could be used, in which there is a sufficient interaction between the cartridge and the access cover, if an improper cartridge is used, so as to make it difficult to fully install the access cover (unless a proper cartridge was involved). This could be used with the arrangement characterized above, or alternatively in some arrangements. An example can be understood by the following.

Attention is directed again to FIG. 15. In FIG. 15, at 600 a first member 600 of another security housing closure interference arrangement 600x is depicted, in this instance configured for use to ensure that unless a cartridge 502 installed in the housing body 503 is the right one, properly installed, the access cover 504 will interfere and not close. This arrangement can be used with arrangement 570x, or it can be used independently. The particular arrangement 600x depicted, would correspond to an "upstream" arrangement since it is positioned to be engaged on an upstream side of the housing seal member 518. It is also an "open" and "exterior" arrangement, relative to arrangement 517 even though parts of it may be radially inside of surface 560*u*, the at least one arrangement is "exterior" because it is not contained by the seal 560.

In FIG. 15, the member 600 depicted is at least one receiver or recess arrangement 601 extending radially inwardly in a portion of housing engagement arrangement 517, in the example in web 565. In the depicted example, more than one recess 601 is depicted, but a single one can be used in some applications. In FIG. 16, an enlarged fragmentary view of FIG. 15 is shown, and recesses 601 are viewable.

Referring to FIG. 23, along an interior 504*i*, the access cover 504 includes a projection arrangement indicated at 605 positioned to project into the recess arrangement 600. There are two spaced projections 605 depicted, although an alternate number is possible. The approach is to size and position the engagement arrangement 600*x* such that interference will occur as a result of projections 605, unless an appropriate receiver arrangement 601, for engagement, is positioned on the cartridge 502.

Of course, if the cartridge 502 is configured so that it can be engaged in any of two rotational orientations, the second set of projections analogous to projections 605 could be positioned along an opposite side of the access cover 502.

4. Remaining Figures of the Example Embodiment of FIGS. 13-40

Figure 26:
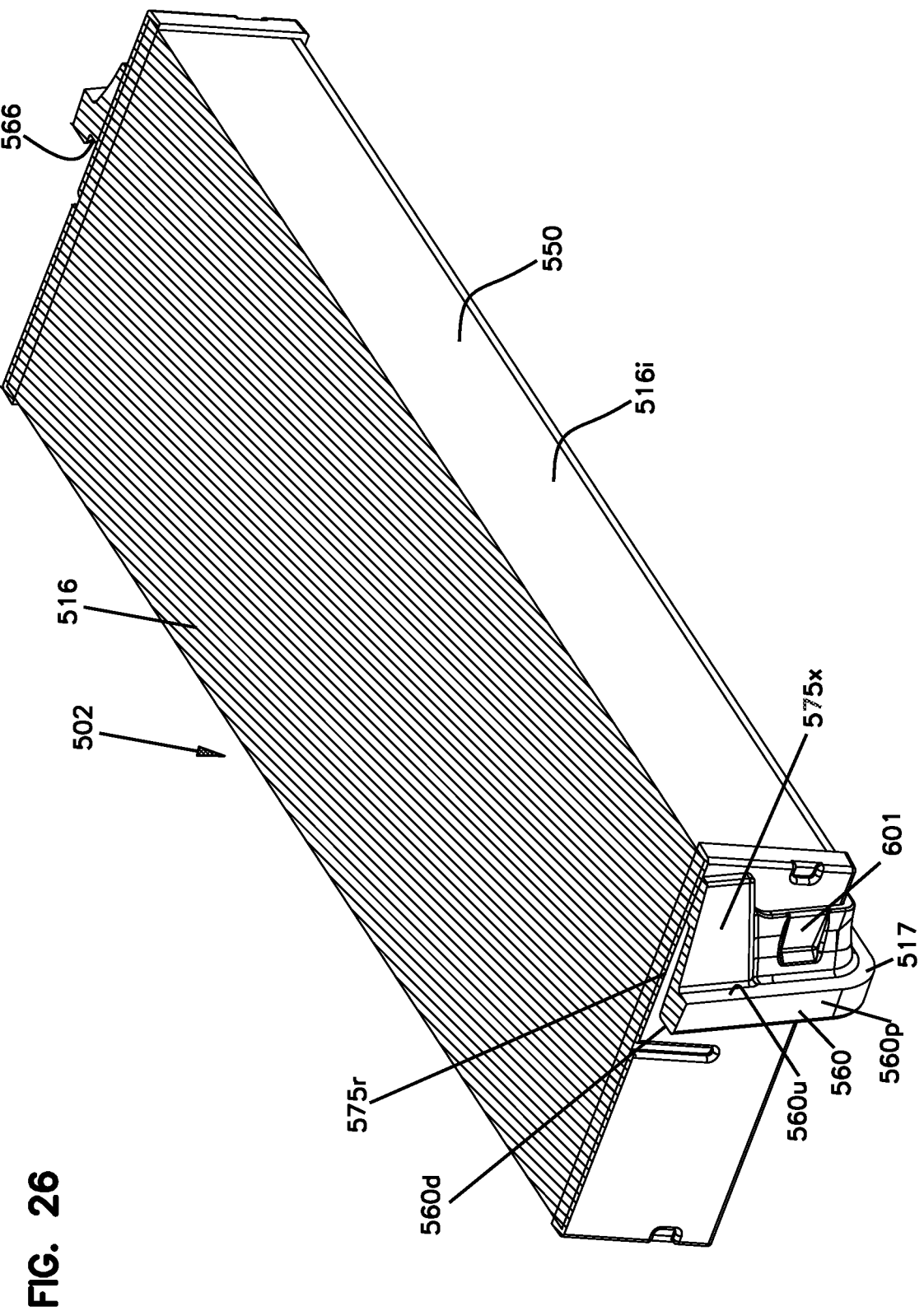
FIG. 26 is a schematic, perspective, cross-sectional view of the filter cartridge component of FIG. 15, taken generally along line 26-26 thereof.
Figure 27:
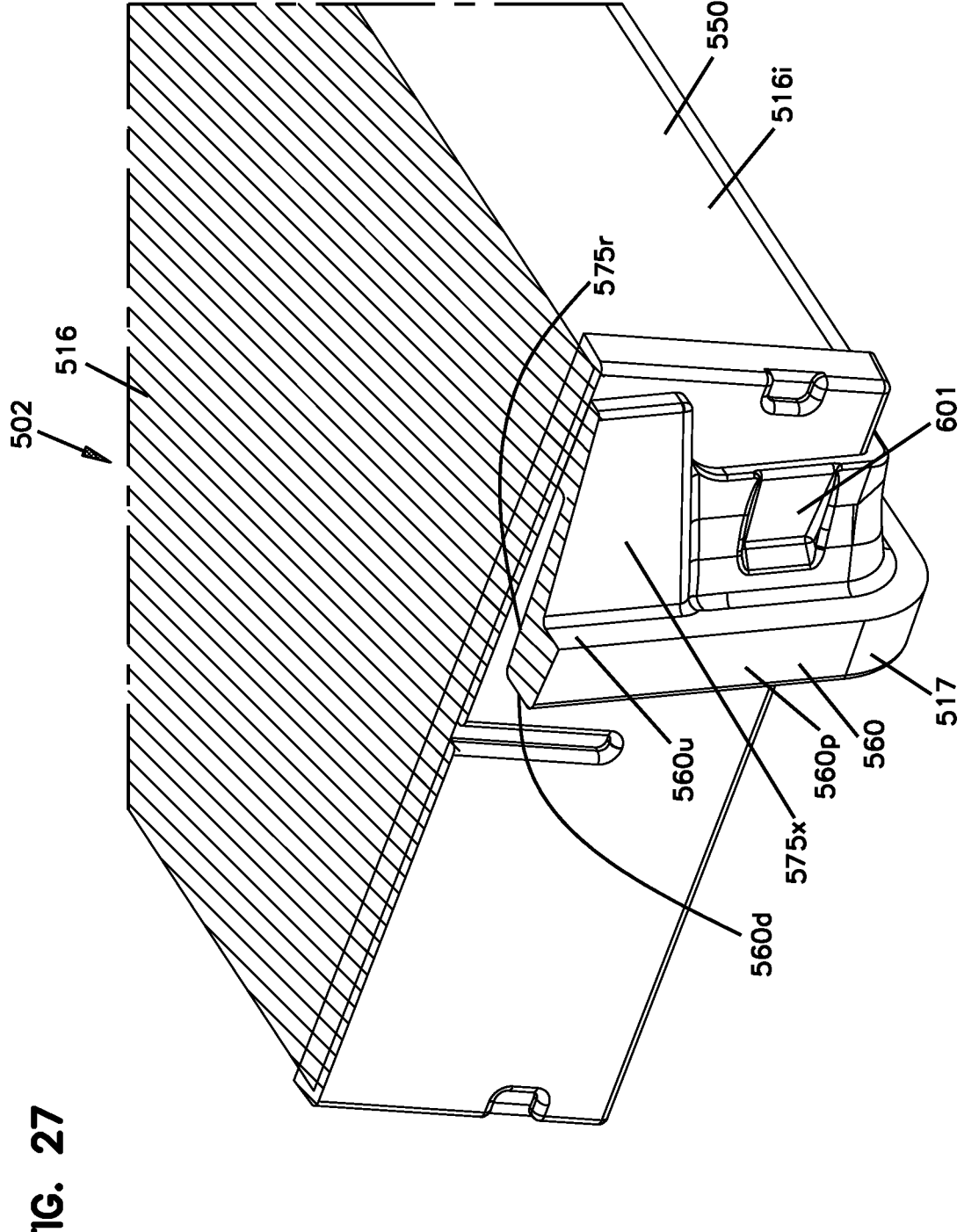
FIG. 27 is an enlarged, schematic, fragmentary, view of a portion of FIG. 26.

Herein above, selected ones of FIGS. 13-40, for the example air cleaner 500 were described. Additional figures are provided, for full development of understanding the features and principles. Selected additional figures not specifically discussed in detail above, are referenced here. In FIG. 26, a cross-sectional view of cartridge 502 is provided. The cross section is taken through the housing engagement arrangement 517 at a location through the receiver 575*r*. In FIG. 27 an enlarged fragmentary view of this portion of the cartridge 516 is shown.

Figure 28:
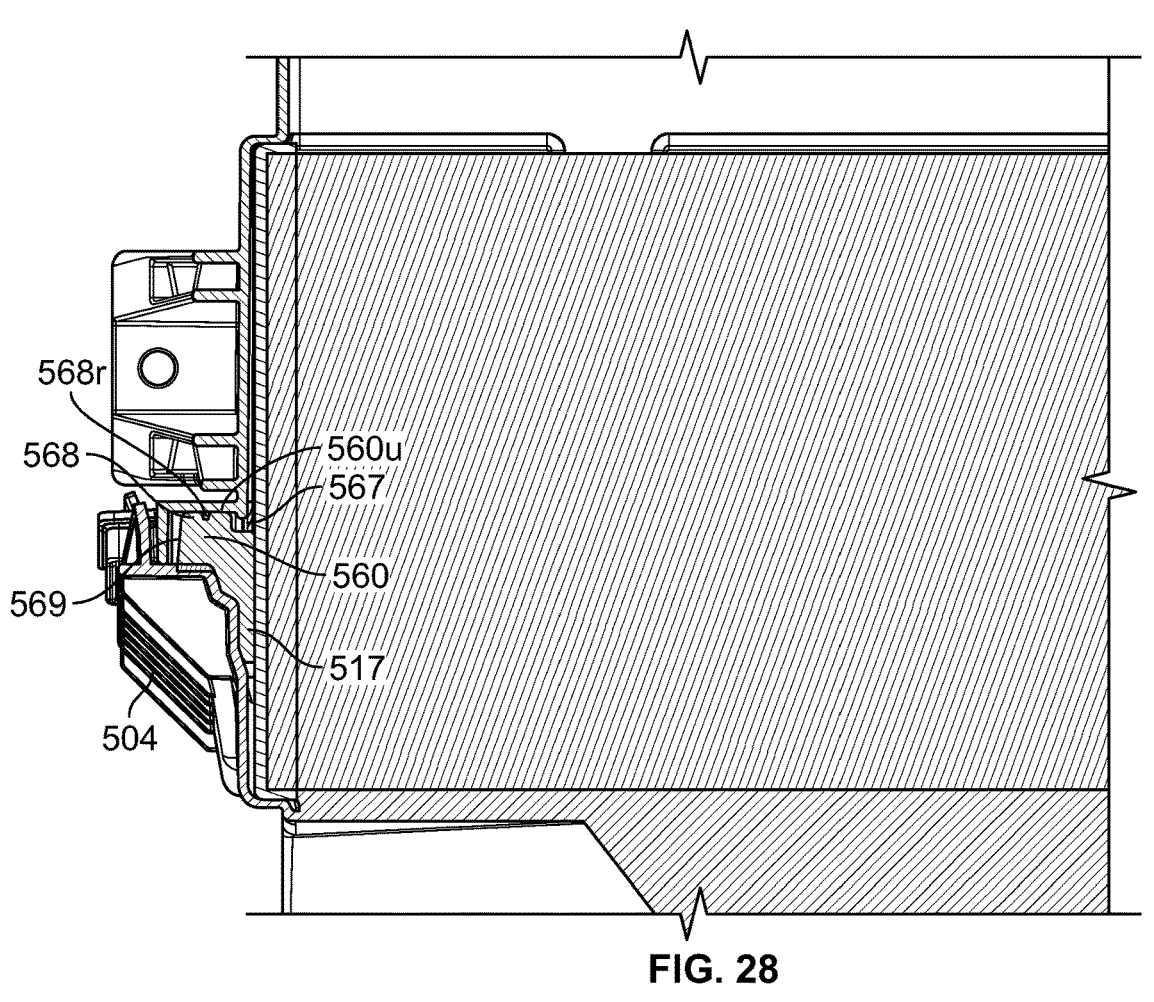
FIG. 28 is a schematic, fragmentary, cross-sectional view of a portion of the air cleaner assembly of FIG. 13.

In FIG. 28 a cross sectional view through the air cleaner assembly is shown, indicating that seal surface 560*u* is pressed against housing surface 568 and rib 568*r*, between inner rim 567 and outer rim 569.

Figure 29:
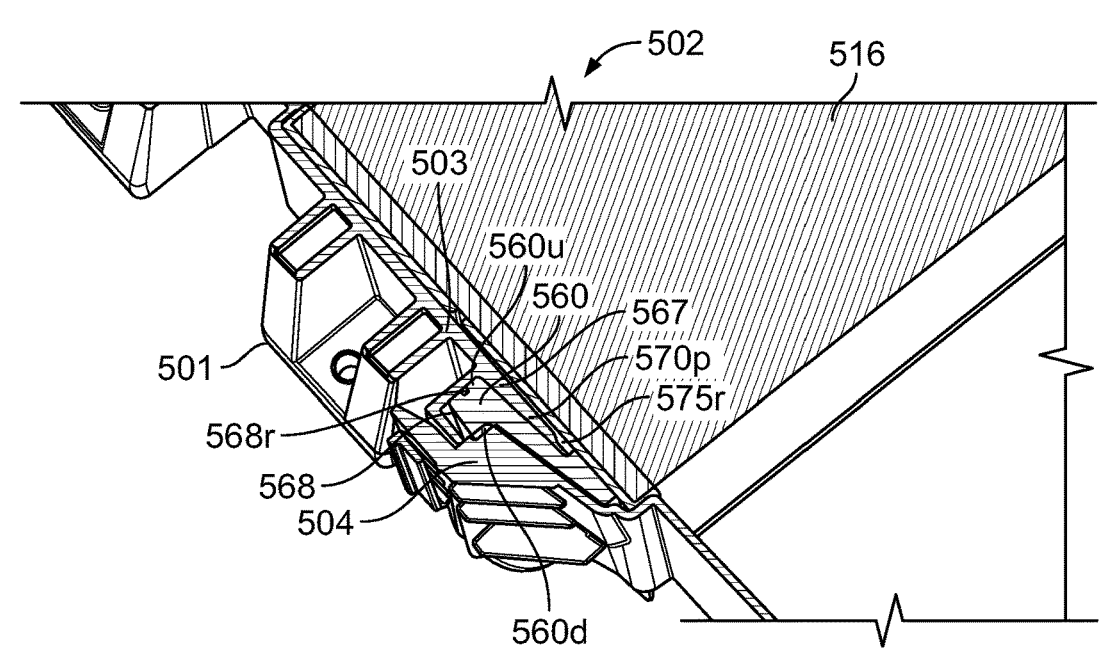
FIG. 29 is an enlarged, schematic, fragmentary, cross-sectional view of a portion of the air cleaner assembly of FIG. 13.

In FIG. 29, a fragmentary cross sectional view is depicted showing projection 570*p*, on rim 587, extending into receiver 575*r*. Also, the seal member 560 can be seen positioned between the access cover 504, housing body 503. Overlap between the member 560 and various ones of the housing sections 503, 504 indicate where compression would occur, and an approximate amount of that compression that can, if desired, be used. Alternatives are possible.

Figure 30:
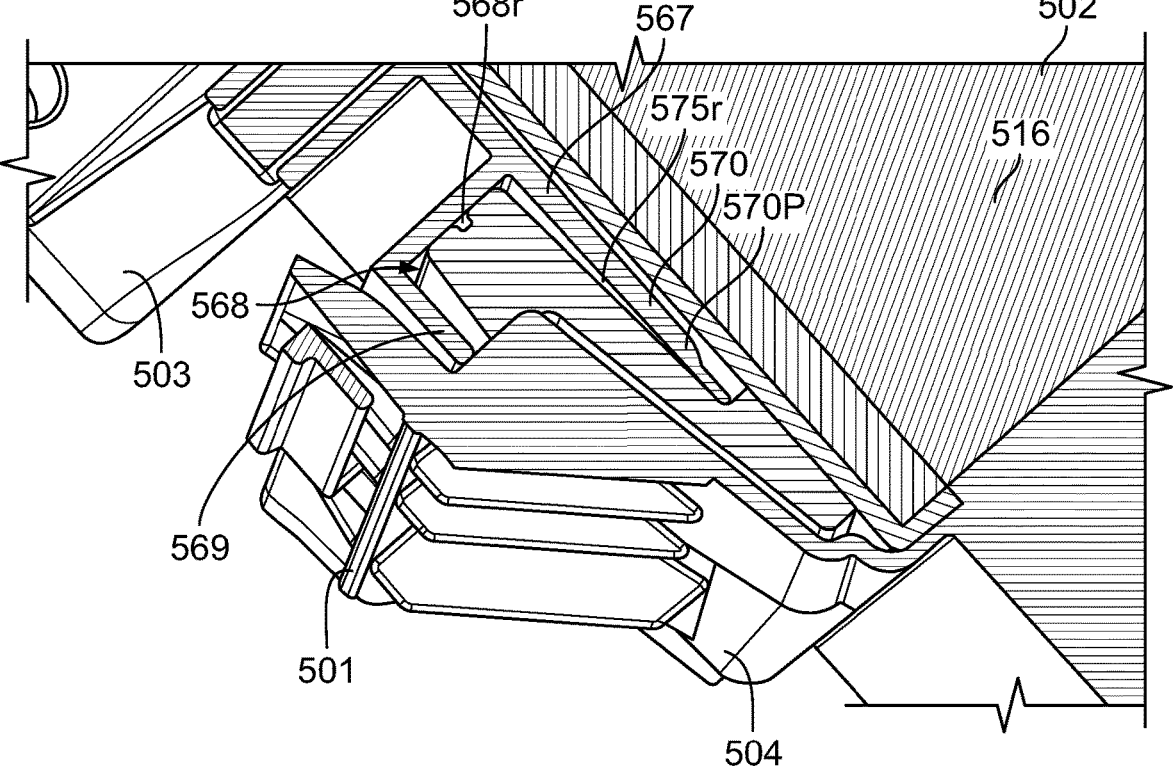
FIG. 30 is an enlarged, schematic, fragmentary view of a portion of FIG. 29; taken generally along line 30-30, FIG. 13.

In FIG. 30 a second enlarged fragmentary view analogous to FIG. 29 is shown. In addition to identified features already characterized, rib 568*r* can be seen projecting into surface 560*d* on the seal arrangement.

Figure 31:
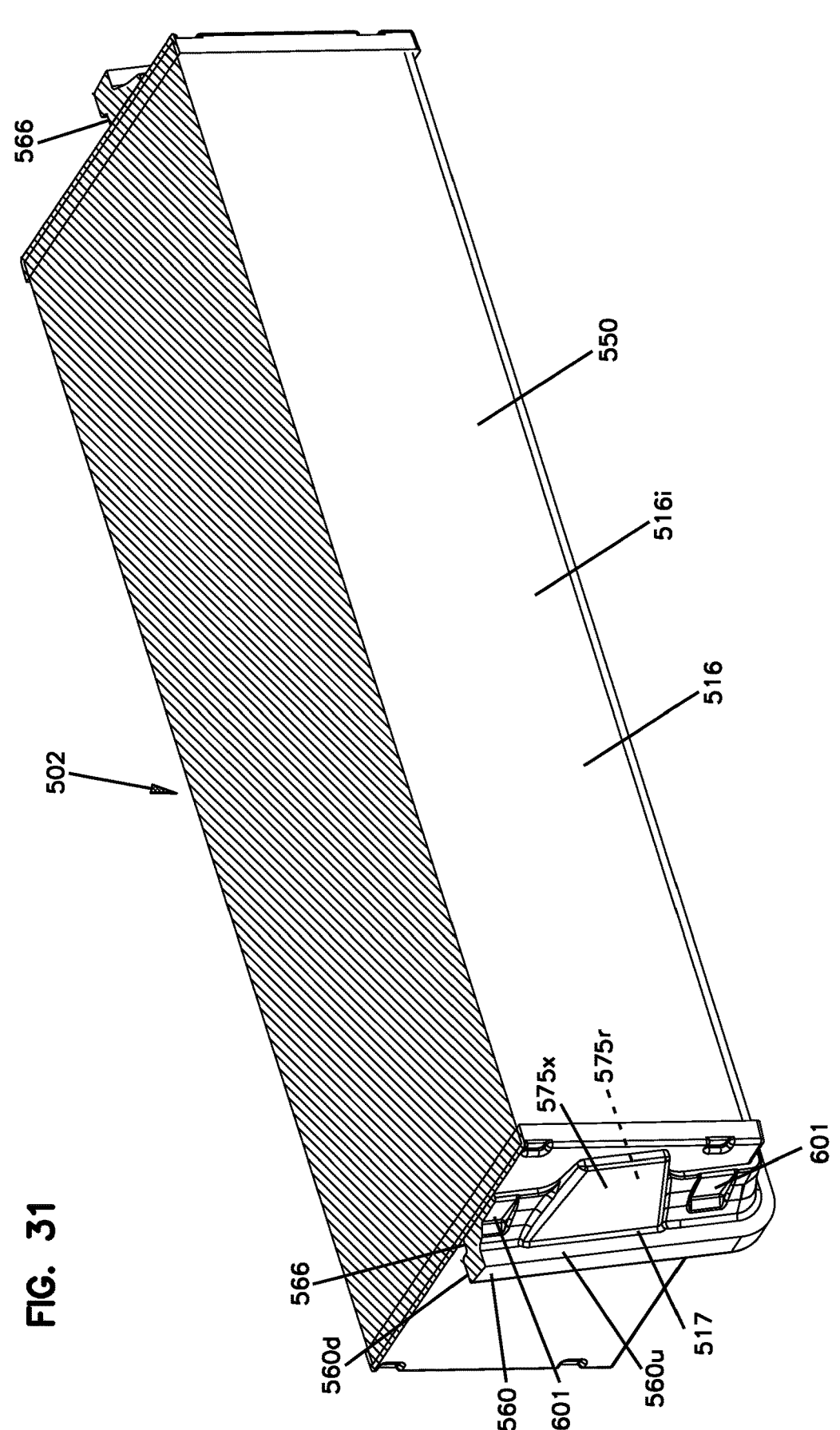
FIG. 31 is a second schematic cross-sectional view of a portion of the filter cartridge of FIG. 15.

In FIG. 31, a second cross sectional view of the cartridge 502 is shown. Here the cross section is through a portion of the housing engagement arrangement 517 that does not have the receiver 575*r* therein, but does include recess 601.

Figure 32:
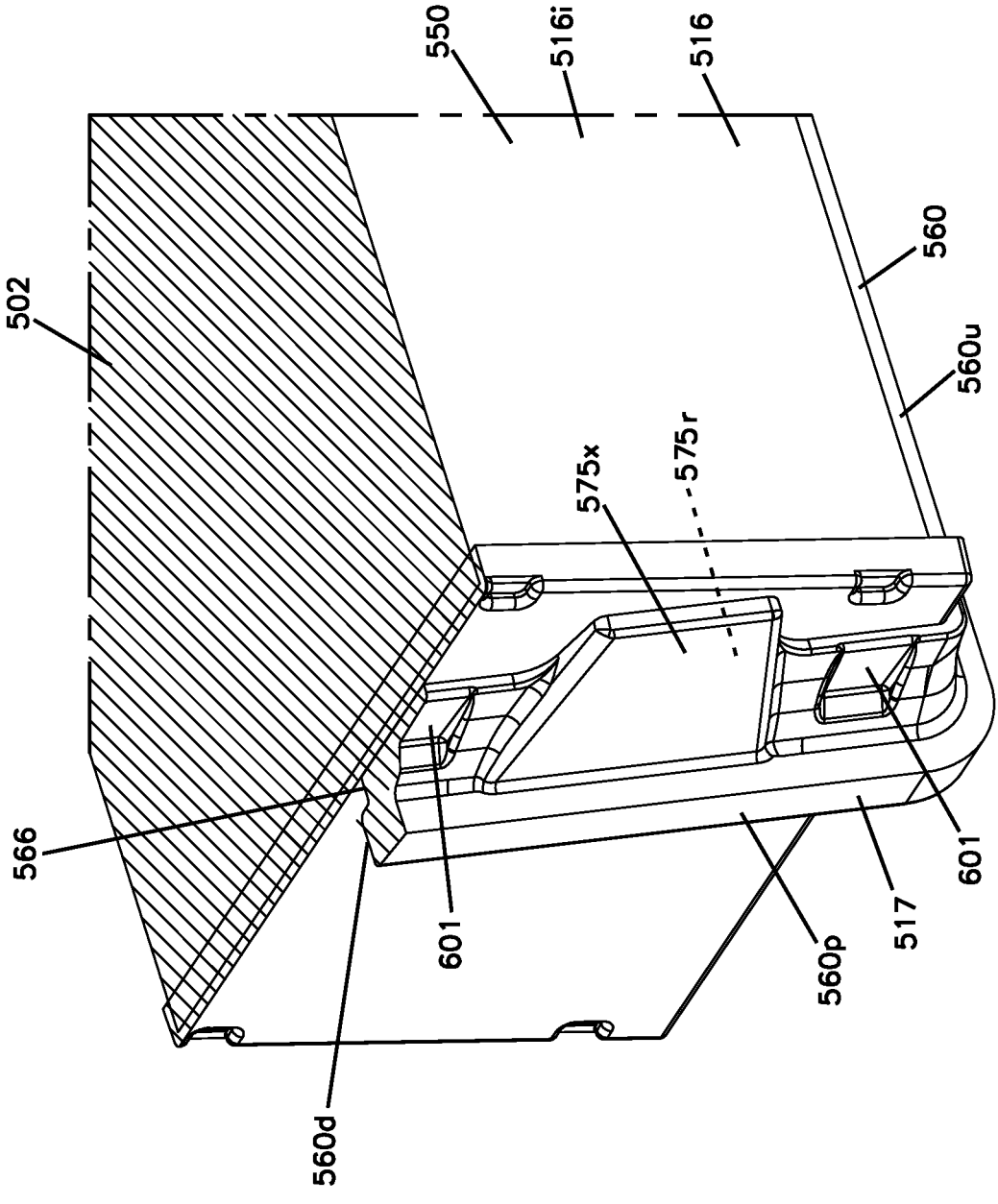
FIG. 32 is an enlarged, fragmentary, schematic view of a portion of FIG. 31.

In FIG. 32 an enlarged fragmentary view of the portion of the cartridge 502 of FIG. 31 is shown. Again, it can be seen that the cross section is through an exterior receiver recess 601.

Figure 33:
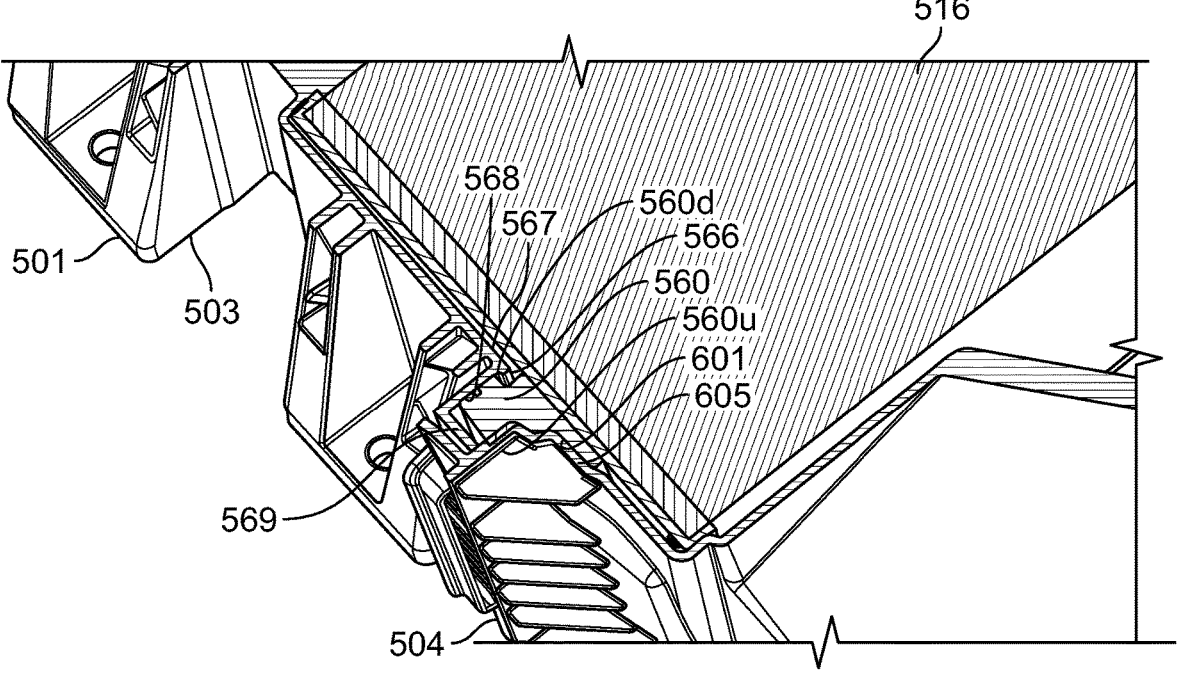
FIG. 33 is an enlarged fragmentary cross-sectional view of the assembly of FIG. 13.

In FIG. 33 an enlarged cross sectional view of this portion of the air cleaner assembly is shown. Seal member 560 can again be seen compressed between sections 503, 504. Also, a portion 605 of the access cover 504 projecting into receiver recess 601 can be seen. Further, rim 567, at a location not including projection 570*p*, can be seen extending into the trough 566.

Figure 34:
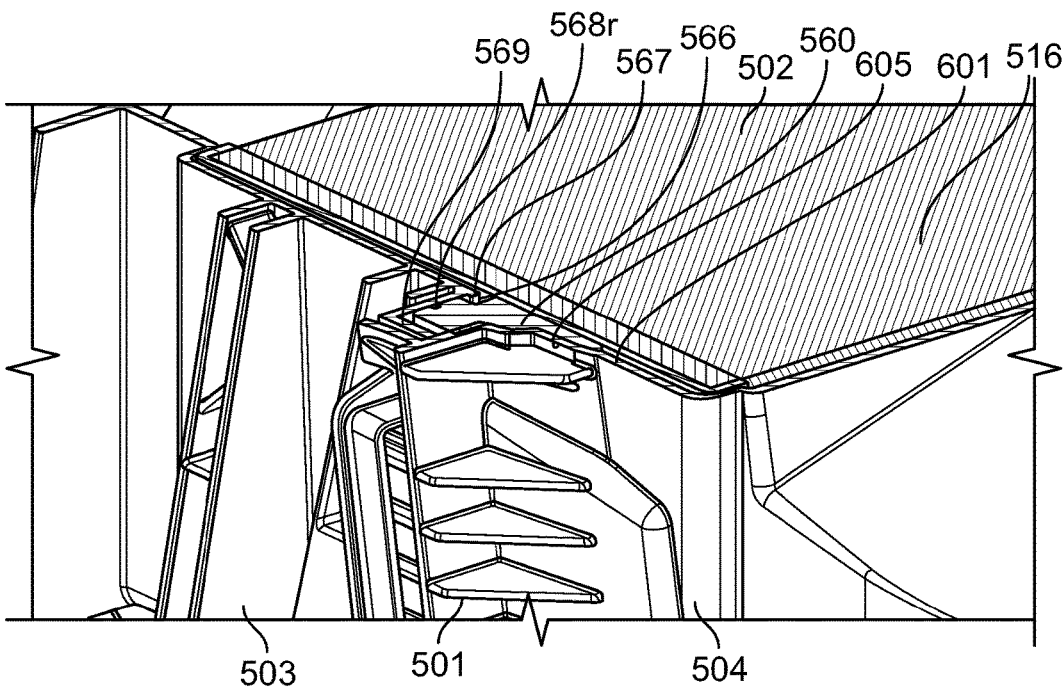
FIG. 34 is a second, fragmentary, enlarged, schematic, cross-sectional view of the air cleaner assembly of FIG. 13, taken generally along line 34-34, FIG. 13, but from a different perspective, than FIG. 33.

In FIG. 34 an alternate perspective view of that of FIG. 33 is shown, depicting similar features.

Figure 35:
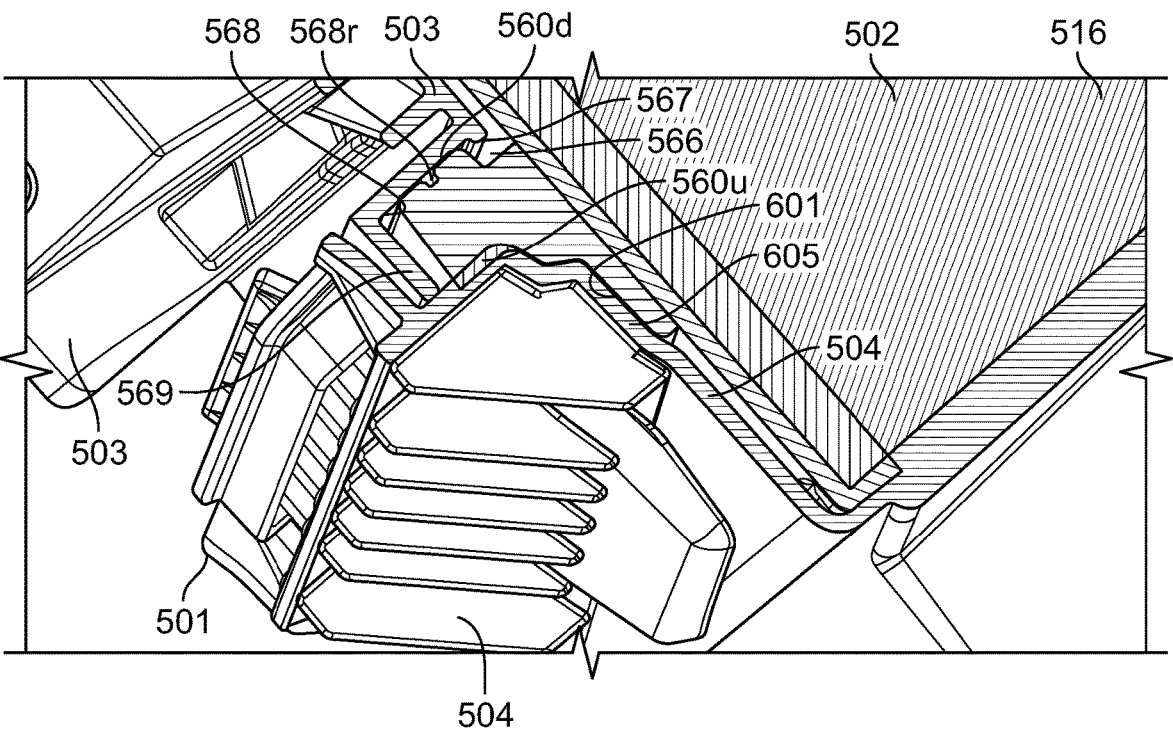
FIG. 35 is an enlarged, fragmentary, schematic, perspective view analogous to FIG. 34, but from a different perspective.

In FIG. 35 a still further alternate perspective view is shown. Here rib 568*r* can be seen projecting into the seal member 560.

In FIG. 36 an enlarged fragmentary perspective view of a portion of the engagement arrangement 517 is shown separate from the cartridge 502. Of course the one depicted would not typically be constructed in this manner, since it would be molded in place. However, the figure allows for inspection of selected features previously indicated.

In FIG. 37 an analogous view is shown, but of an interior. Here, recess 575*r* is viewable.

FIG. 38 yet another cross sectional view is provided. Projection 570*p* can be seen projecting into recess 575*r*.

Figure 39:
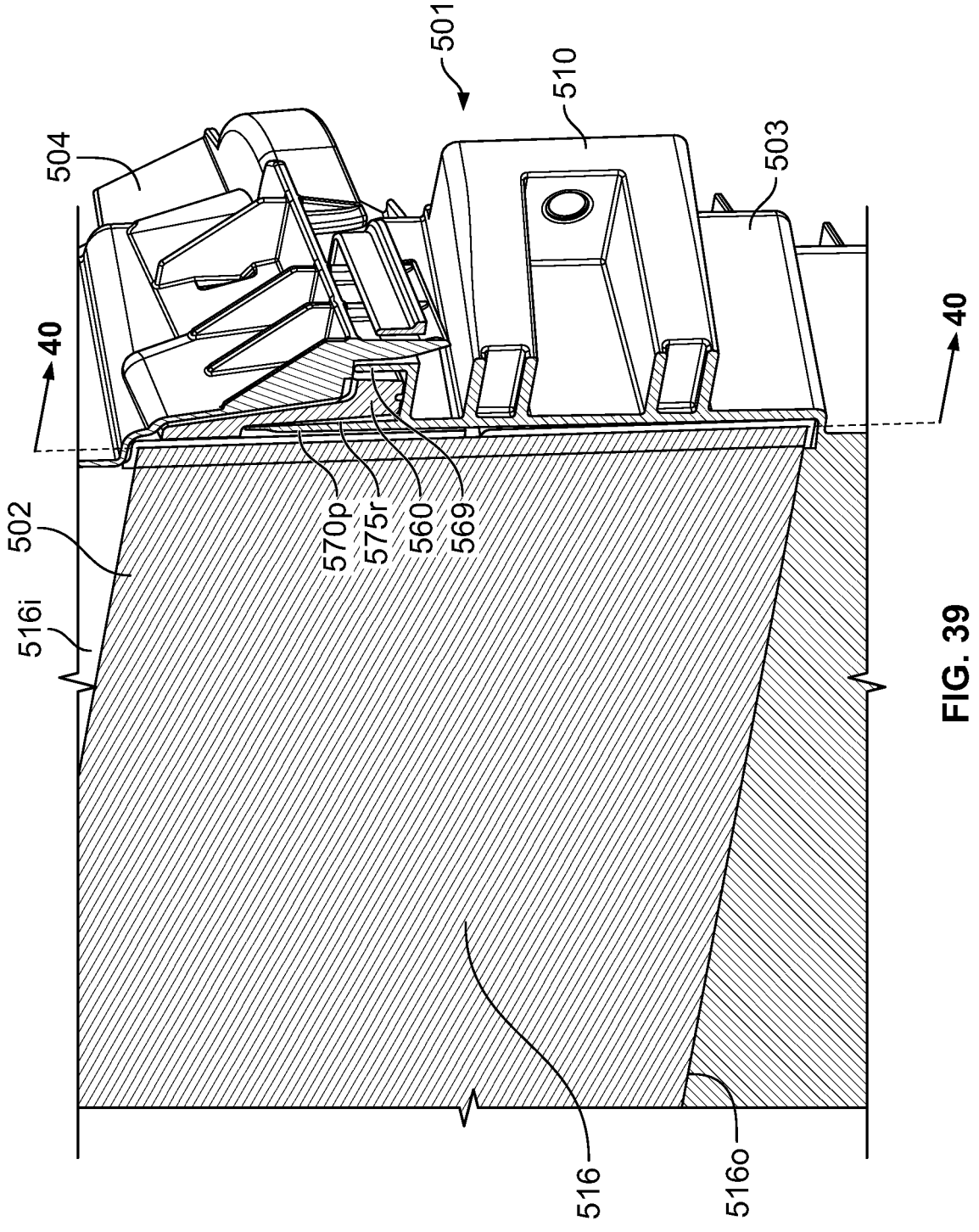
FIG. 39 is an enlarged, schematic, fragmentary cross-sectional end perspective of the portion of the assembly depicted in FIG. 38.

In FIG. 39 yet another cross sectional view of the air cleaner assembly in this region is shown, but in perspective.

Figure 40:
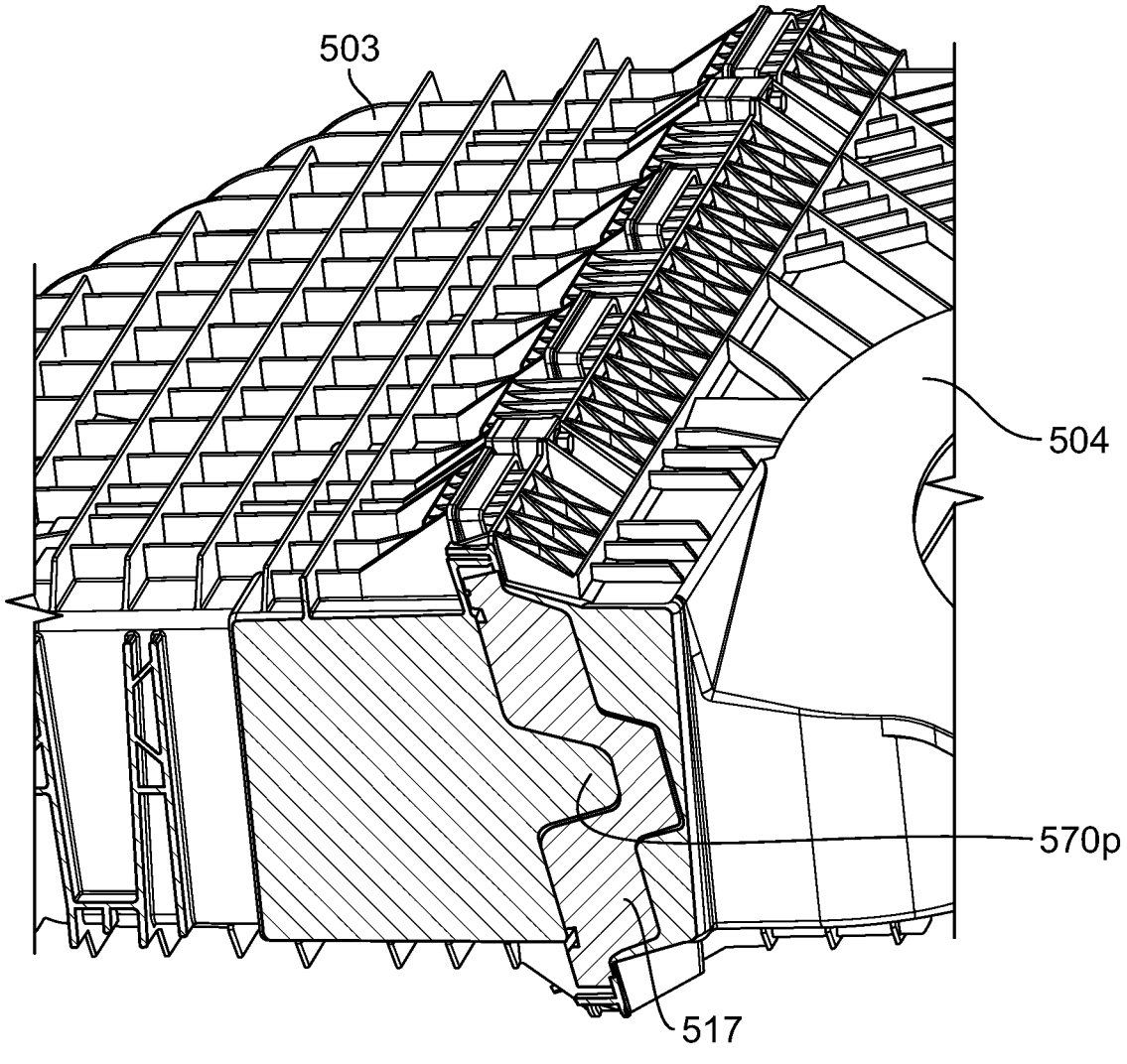
FIG. 40 is a schematic enlarged fragmentary cross-sectional view of a portion of the air cleaner assembly of FIG. 13.

In FIG. 40 a cross sectional view and the general plane of FIG. 39 is viewable. Projection 570*p*, projecting into and being surrounded by material of the molding 517 can be seen.

As indicated above, variations and application of the techniques are possible. In addition, variations in the size, shape, location and amount of engagement are possible. In the next several sections, some of these possible variations are characterized.

IV. Some Example Assembly Variations, FIG. 41-44

A. Example Variations Depicted in the Context of an Oval Media Pack

As indicated above, various types of media can be used. One possibility comprises a coiled arrangement such as shown in FIG. 6. Also indicated above, alternatives to rectangular arrangements are possible. In the example arrangement of FIGS. 41-43, an arrangement is depicted in which the media pack has a generally oval configuration with one long cross-section axis and one short cross-section axis; and, in which the media pack can be configured from a coiled arrangement, for example as characterized in connection with FIG. 6.

Figure 41:
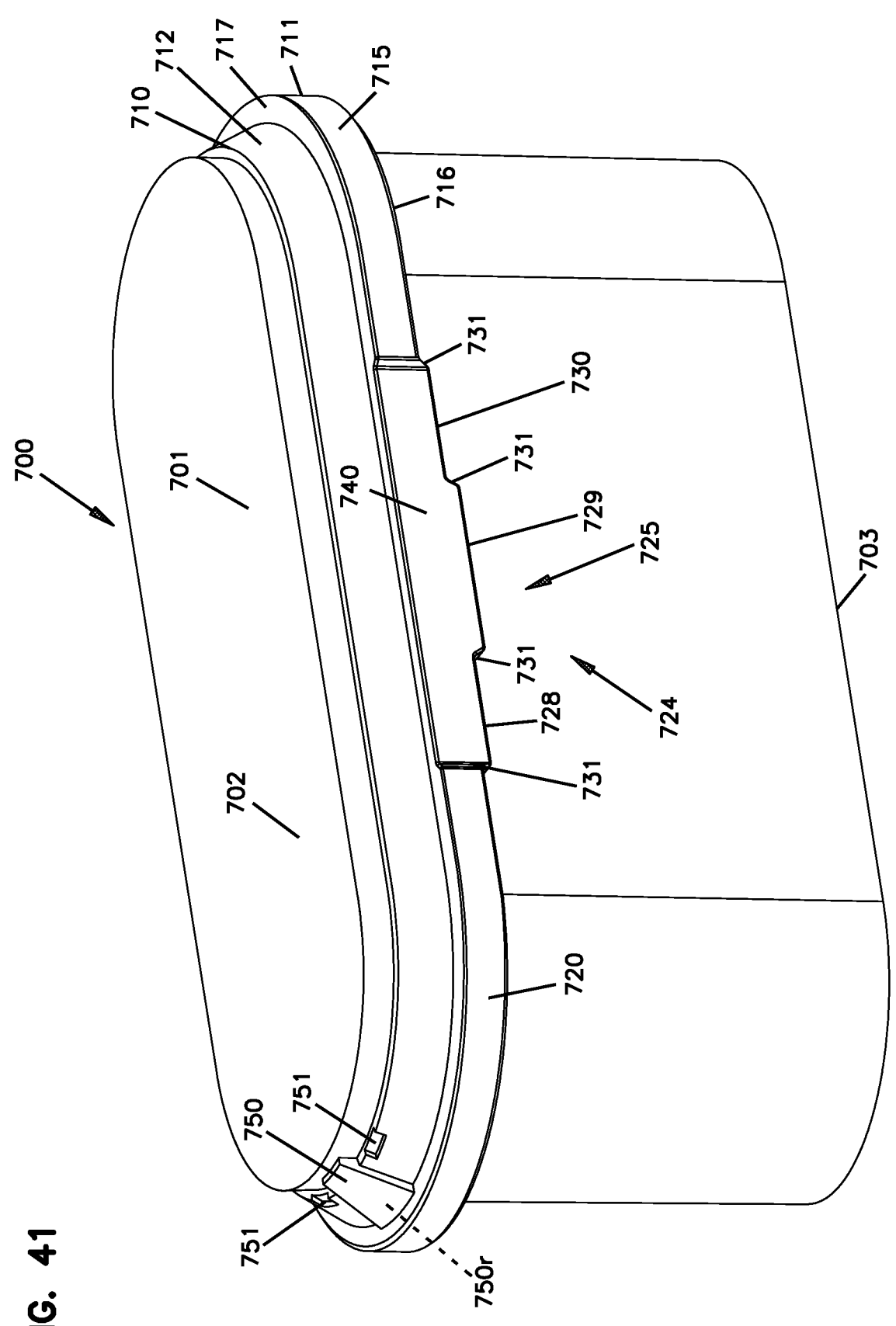
FIG. 41 is a schematic perspective view of an alternate filter cartridge embodying principles according to the present disclosure.
Figures 42, 43:
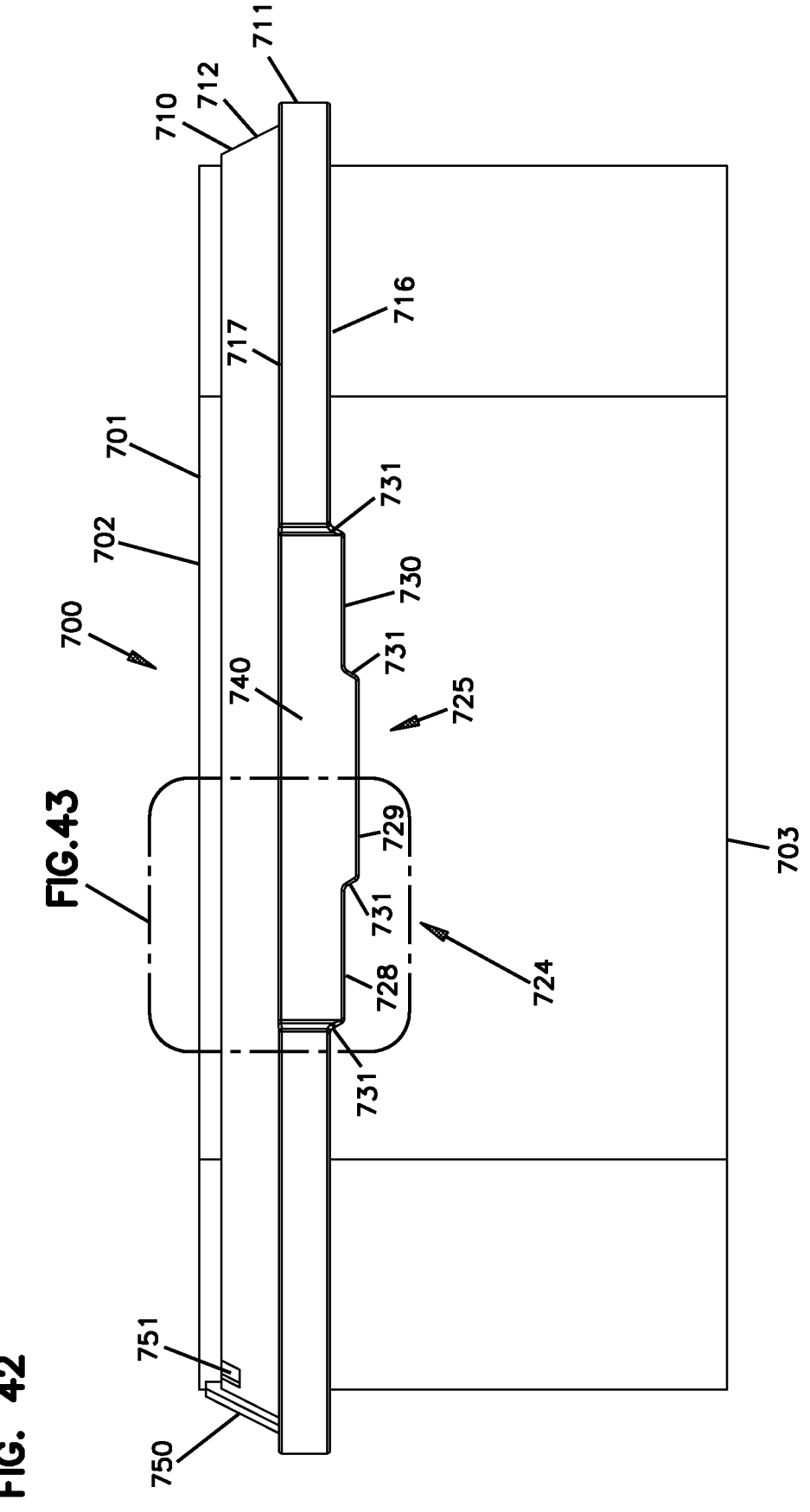
FIG. 42 is a schematic side elevational view of the filter cartridge of FIG. 41.
FIG. 43 is a schematic enlarged fragmentary view of an identified portion of FIG. 42.
Figure 43:
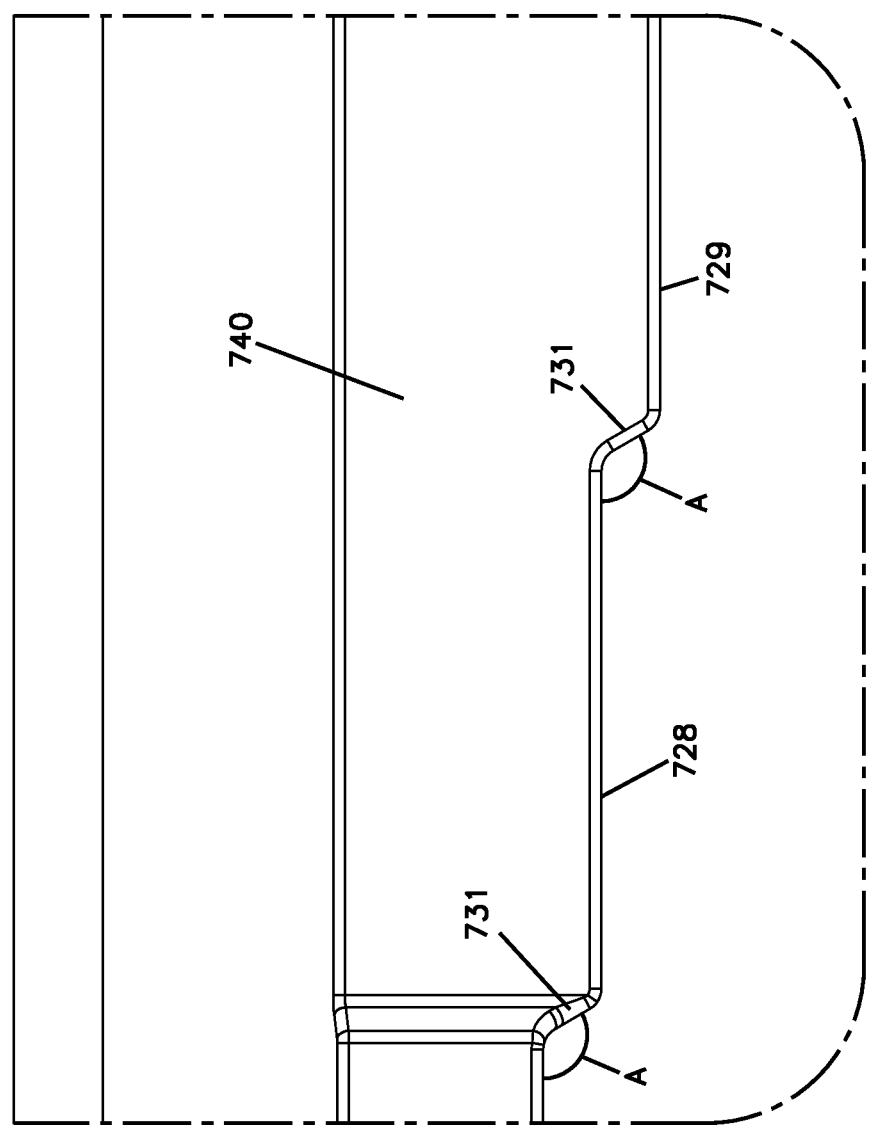

Further, as indicated above, the techniques characterized herein can be used in association with a seal arrangement that does not have a flat, planar, downstream seal surface, but rather has contouring, such as by features generally in accord with WO 2014/210541. In FIGS. 41-43, an example of this is depicted in the context shown.

Also above, it was indicated that the techniques can applied with a seal arrangement that is not slanted, but, rather, in extension around the media pack, is generally perpendicular to the direction of airflow through the media pack. An example of this is shown in the embodiment of FIGS. 41-43.

Of course, the various techniques described in connection with the embodiment of FIGS. 41-43 can be applied separately, or together, in alternate arrangements.

Referring to FIG. 41, a cartridge 700 is depicted, comprising media 701 extending between first and opposite ends or faces 702, 703. A housing engagement arrangement 710 is shown positioned on the cartridge 700 at a location extending peripherally around the media 701. The housing engagement arrangement comprises a seal portion 711 and a support or web portion 712. These portions can be formed generally analogous to similar portions in the previously described embodiments. Thus, the seal portion 711 comprises a pinch seal 715 having opposite pinch surfaces 716, 717. Typically surface 716 would be the downstream or critical seal surface. The seal arrangement 715 also includes an outer peripheral surface 720.

At 724 a housing interactive feature is shown in the housing engagement portion 710 and in particular in the seal member 711. This arrangement 724 is generally analogous to ones described in WO 2014/210541 and/or U.S. Ser. No. 62/097,060 incorporated herein by reference. The example depicts a region 724 of distortion or contouring from flat in surface 716, and in particular a stepped region 725 comprising steps or projections (or projection sections) 728, 729 and 730. These would be sized, located and positioned to engage mating variations in the corresponding seal surface of the housing, during use. Said engagements are described, for example in WO 2014/210541 and/or U.S. Ser. No. 62/097,060 incorporated herein by reference. Typically the projection sections 728, 729 and 730 would have transition sections between them or between various ones of them and other portions of the seal surface 716, as indicated generally at 731. A variety of such stepped arrangements is possible, including multiple projections and multiple spaced projections. Typically, a maximum total extent of projection for region 725 would be at least about 5 mm, sometimes at least 10 mm, often within the range of 5-20 mm, but alternatives are possible.

Also, in region 724, the outer peripheral rim 720 is modified and in this instance with a peripherally recessed portion 740. The peripherally recessed portion 740 can be in general accord with the descriptions of WO 2014/210541 and/or U.S. Ser. No. 62/097,060 and can be varied therefrom. It can be provided in a single location or as multiple spaced sections. In the particular example, it is oriented in alignment with the same portion 724 of the seal arrangement 711 that has the stepped region s 725 therein. Alternatives are possible. The recess region 740 can be configured to be engaged by a housing feature in an appropriate system for installation.

Typically, the housing seal arrangement comprising the housing engagement portion 710 and seal member 711 would be configured with a receiver recess or groove generally analogous to groove 566, FIG. 17. This could be used analogously, to receive projecting therein a ridge or rim on a housing section.

Referring to FIG. 41, an example is provided of how, for such a cartridge, a security, housing closure, interaction arrangement can be provided. With respect to this, attention is directed feature 750, where, internally, a receiver pocket 750*r* for a projection analogous to projection 370*p* would be positioned; and, to recesses 751, which could be used analogously to recesses 601 described above.

Of course, the stepped region 725 could be located in overlap with one or both of the regions 750, 751 if desired.

In FIG. 42, a side elevational view of cartridge 700 is depicted. In FIG. 43, an enlarged fragmentary view of a portion of FIG. 42 is shown. Transition regions 731 are viewable. Such transition regions 731 would typically extend over an angle A, relative to a plane perpendicular to the flow direction through the cartridge, of angle of about 35°-85°. Also inward recess region 740 can be viewed in FIG. 43, which would usually correspond to an inward recess, at maximum of at least 2 mm, often at least 4 mm, and typically not more than 20 mm.

It is noted that in a cartridge of the type of cartridge 700 it is sometimes desirable to surround the media with a protective shield or sheath, such as described in WO 2014/210541 and/or U.S. Ser. No. 62/097,060, incorporated herein by reference. Such a sheath can be used if desired. Also, it is sometimes desirable to provide a support or preform support region embedded within molded material of the housing seal member 711, and such members can be used here, analogously to the use in WO 2014/210541 and/or U.S. Ser. No. 62/097,060. Of course, if they were used, it may be desirable to have them include a pocket recess to accommodate features characterized herein.

It is also noted that in such arrangements as WO 2014/210541 and/or U.S. Ser. No. 62/097,060, the housing engagement arrangement, analogous to arrangement 710, FIG. 41, is sometimes molded-in-place with a portion in direct contact with the media. Both practices can be applied with techniques in accord with the present disclosure, if desired.

In the embodiment of FIGS. 41-43, region 724 is shown with a peripheral recess 740, but the peripheral contouring could be a projection arrangement or both a projection and a recess arrangement if desired. Also, the seal surface 716 is shown with projection arrangement 725, but it could alternately be a recess or a combination of recess and projection if desired.

B. Additional Possible Variations in Which Features of the Security Housing Closure Inhibition Arrangement Extend, Peripherally, into the Housing Seal Member Herein above, the arrangements described and depicted for the embodiment of FIGS. 13-40 and for the embodiment of FIGS. 41-43 features of the security, housing closure, inhibition arrangement on the cartridge are shown located in the web or support portion of the housing engagement arrangement, but not in the pinch seal member, for example not in pinch seal members 560 and 711. Alternatives are possible. More specifically, the various features could be in the web section, the pinch seal section, or in some combination of the two. There can also be features that straddle both. An example alternate is provided in FIGS. 44 and 45.

Figure 44:
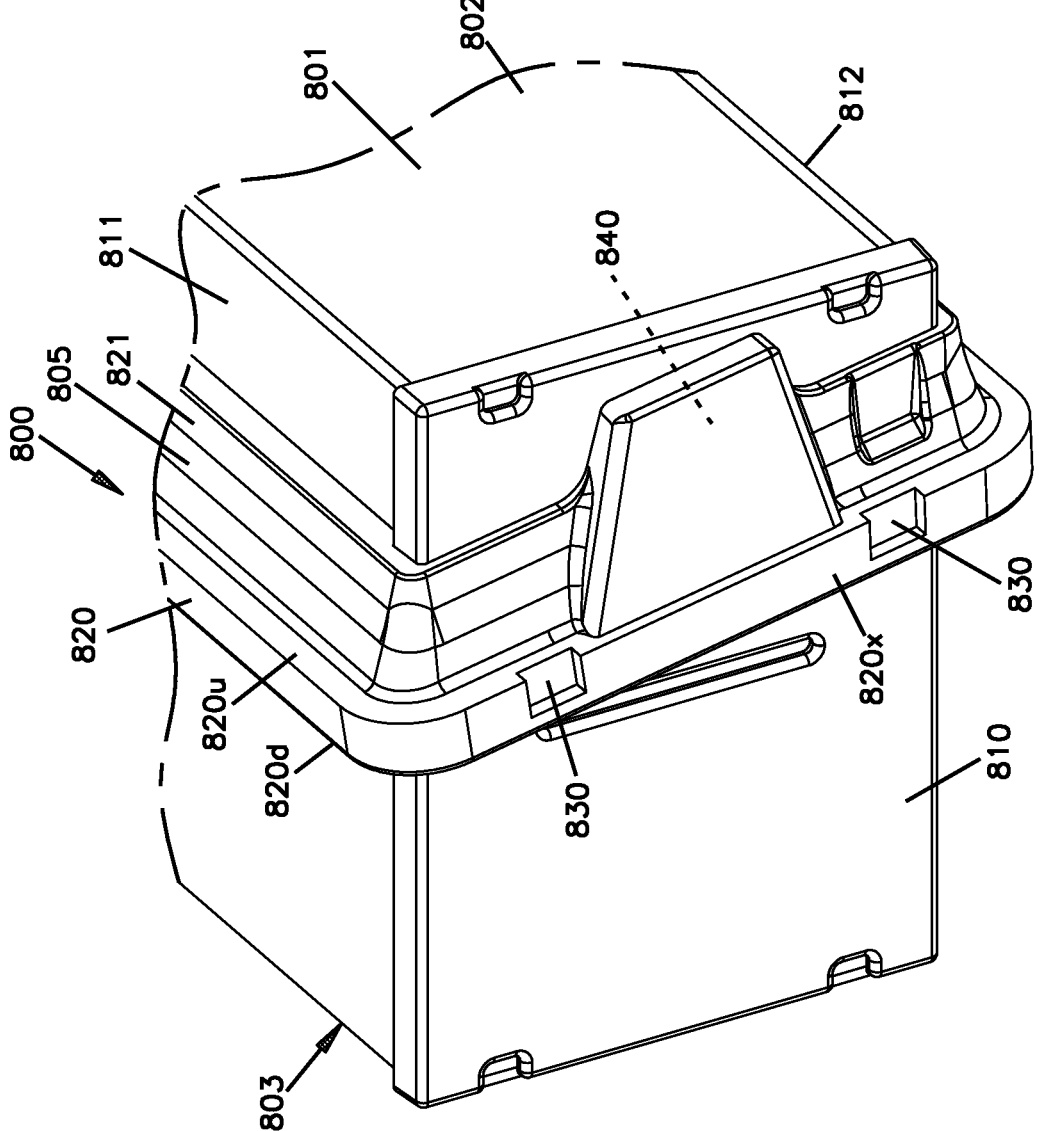
FIG. 44 is an enlarged, schematic, fragmentary view of a filter cartridge generally in accord with FIG. 15, but including alternate specific features thereon.

In particular, and referring to FIG. 44, cartridge 800 is depicted in fragmentary view. The cartridge 800 comprises media 801 with opposite ends or flow surfaces 802, 803. Cartridge 800 includes a housing engagement arrangement 805 in the example depicted, molded-in-place in extension around a remainder of the cartridge. The example cartridge includes an end panel 810 (analogous to panel 554, FIG. 15) and protective covers or panels 811, 812, analogous to covers 559, 558, FIG. 15. Indeed the example cartridge 800 depicted is meant to be analogous to cartridge 502, except as described below.

The housing engagement arrangement 805 does comprise a pinch seal 820 and support web 821. Further pinch seal 820 includes opposite pinch seal surfaces 820*d* and 820*u*. It also has an outer periphery 820*x*.

Here, optional recesses 830 are depicted to operate analogously to optional recesses 601, FIG. 16, with engagement with an access cover that would be appropriately configured. However, as noted by the differences, the recesses 830 can be positioned in, or partly in, the seal member 820, or partially in both the seal member 820 and the web 805.

Figure 45:
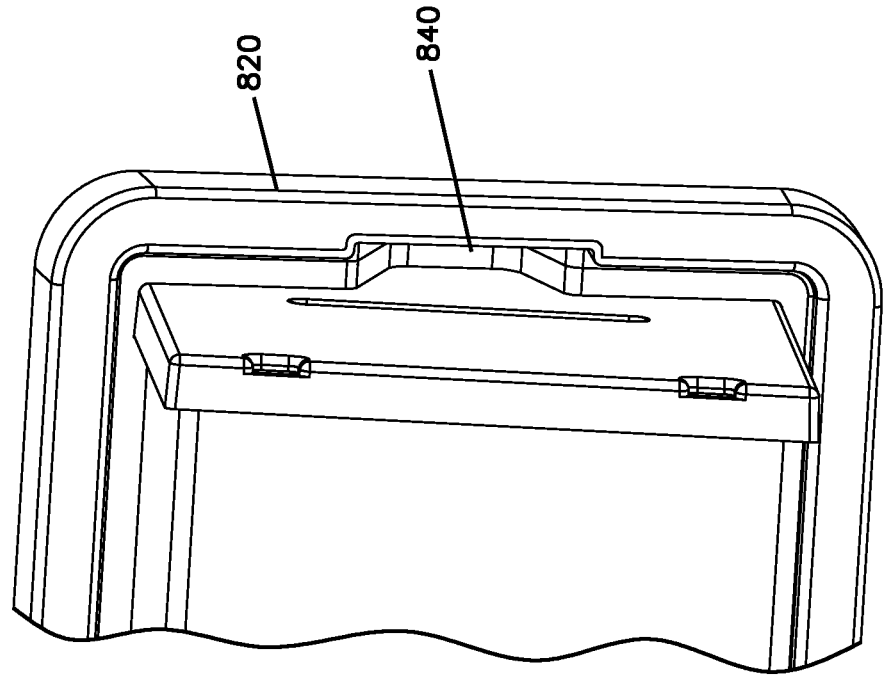
FIG. 45 is a schematic fragmentary view toward an opposite end of the filter cartridge toward FIG. 44.

Referring to FIG. 45, pocket 840, which would operate analogously to pocket 575*r*, FIG. 17 is depicted. It is noted, however, that for the embodiment of FIG. 45, the pocket 840 does have a radial extension that extends at least partly into the seal member 820, unlike pocket 575*r*, FIG. 17.

Other features viewable in the embodiment of FIGS. 44 and 45 are generally analogous to ones previously characterized in the embodiment of FIGS. 13-40.

V. An Additional Example Arrangement, FIGS.
46-63

Herein above, it was indicated that a contoured, for example "stepped" or modified, seal region somewhat analogous to region 725, FIG. 41-43, could be utilized in association with an assembly of the type of FIGS. 13-40. Further, it was indicated that the modified seal region 725 could be aligned with the security housing closure inhibition arrangement, if desired. An example depicting each of these possibilities is provided in FIGS. 46-63.

The example arrangement of FIGS. 46-63 is depicted in an embodiment otherwise analogous to the embodiment of FIGS. 13-40. In this section, emphasis will be on the features demonstrating the points of differences. Generally analogous terms or depictions indicating analogous features are meant to indicate features with analogous functions.

Figure 46:
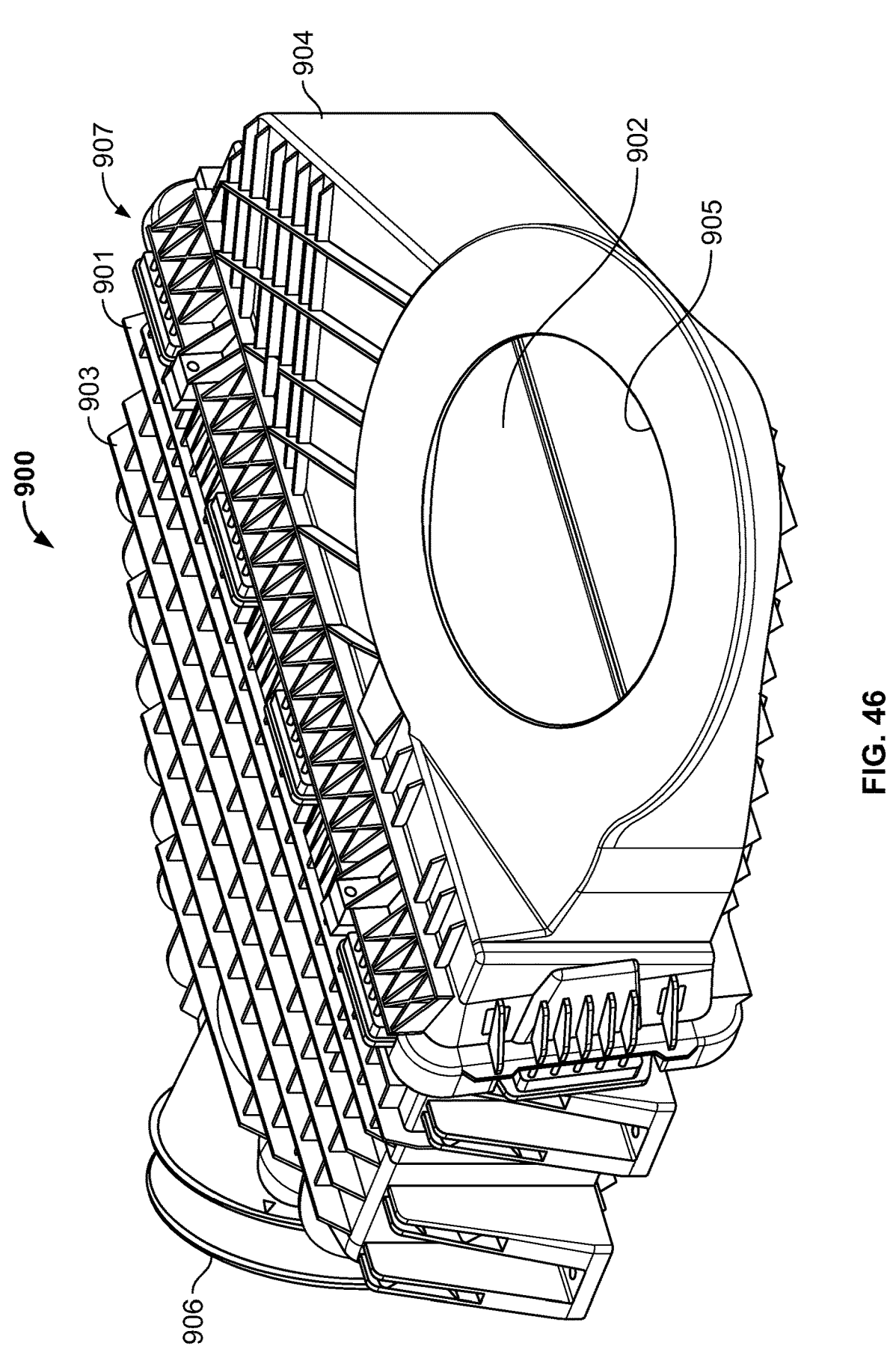
FIG. 46 is a top perspective view of an alternate air cleaner assembly to the air cleaner assembly of FIG. 13.

Referring to FIG. 46, air cleaner assembly 900 is depicted comprising a housing 901, containing a removable, serviceable, filter cartridge 902. The housing 900 comprises separable housing sections 903, 904, securable by appropriate means such as a bolt fastener or similar fastener, not shown. The housing 901 includes an airflow inlet arrangement 905 and a filtered air outlet arrangement 906. The housing sections 903, 904 separate along region 907.

Figure 47:
FIG. 47 is a schematic perspective view of the air cleaner assembly of FIG. 45 with a housing component removed.

In FIG. 47, the air cleaner assembly 900 is depicted with the access cover 904 removed, thus allowing the viewing of cartridge 902, fully nested on housing section 903. Section 903 is depicted with receivers 915 thereon, analogous to receivers 515.

Figure 48:
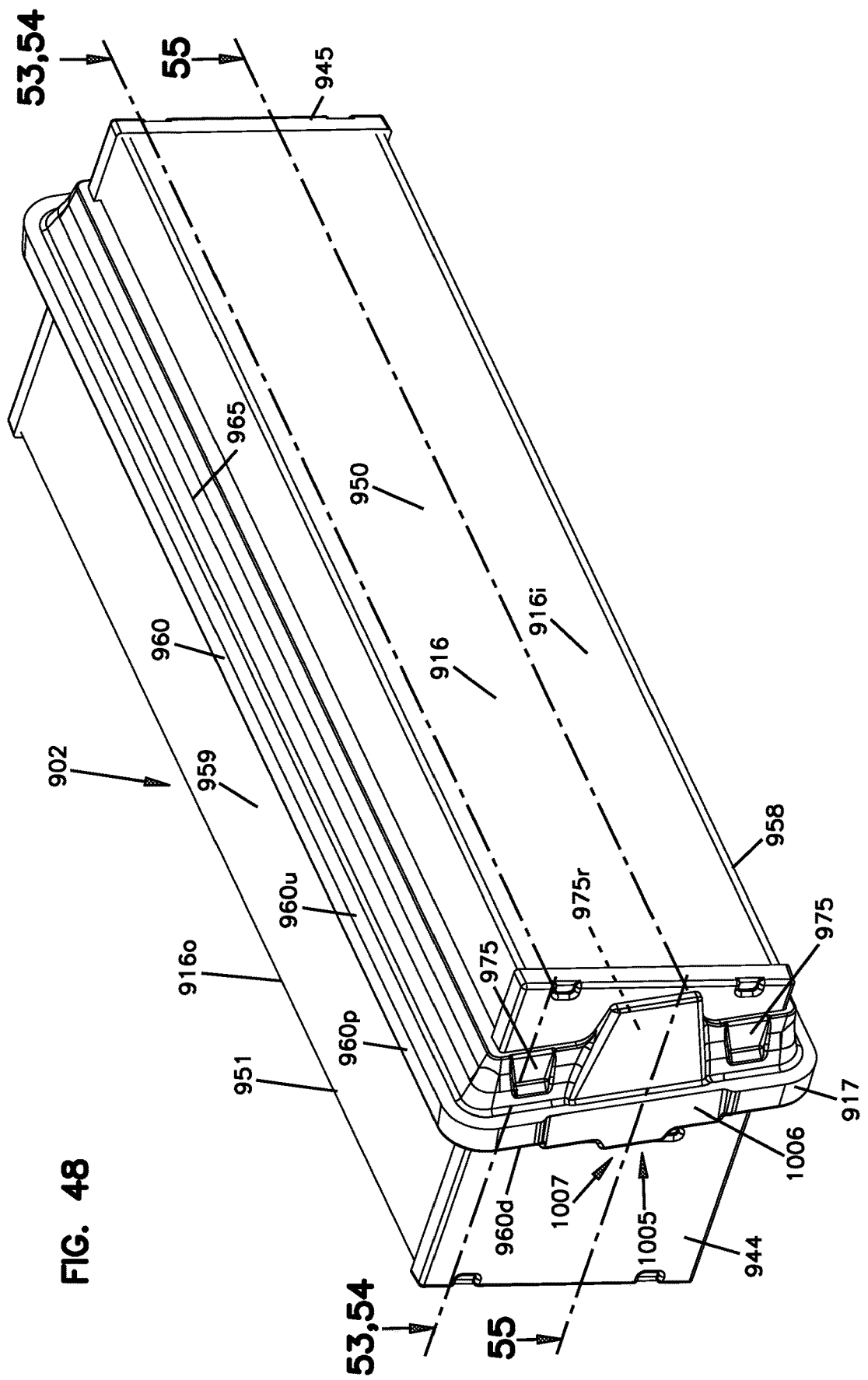
FIG. 48 is a schematic perspective view of a filter cartridge component of the air cleaner assembly of FIGS. 46 and 47.

In FIG. 48, cartridge 902 is depicted in perspective view. The cartridge 902 comprises media 916, with an inlet media end or face 916i and an opposite outlet media end or face 916o (not viewable). Thus, the cartridge 902 has an upstream flow end or face 950 and an opposite downstream end or face 951.

The particular cartridge 902 includes opposite, in the example molded-in-place, panels 944, 945 (analogous to panels 544, 545) and also protective coverings or extensions 958, 959 (analogous to coverings 558, 559). These coverings (958, 959) are depicted extending between and embedded in the panels 944, 945.

A housing engagement arrangement 917 is shown molded-in-place around a perimeter of the remainder of the cartridge 902. The housing engagement arrangement comprises a seal member 960 and a support or web section 965.

In FIG. 48, an interior recess or receiver pocket is shown at 975r, and, at 997, exterior recess arrangement is shown.

Referring to FIG. 48, at 1005, a contour region generally analogous to region 724, FIGS. 41, 42 is shown. This region includes both a contour arrangement 1006 in an outer perimeter 960p of seal member 960, and also a stepped contour section 1007 in downstream seal surface 906d (i.e. opposite surface 960u). In the example arrangement, contour arrangement 1006 is a recess, but it could alternatively be a projection or have aspects of both. Also, contour section 1007 is depicted as projection section, but in alternate applications, it could be a recess section or have aspects of both.

Figure 49:
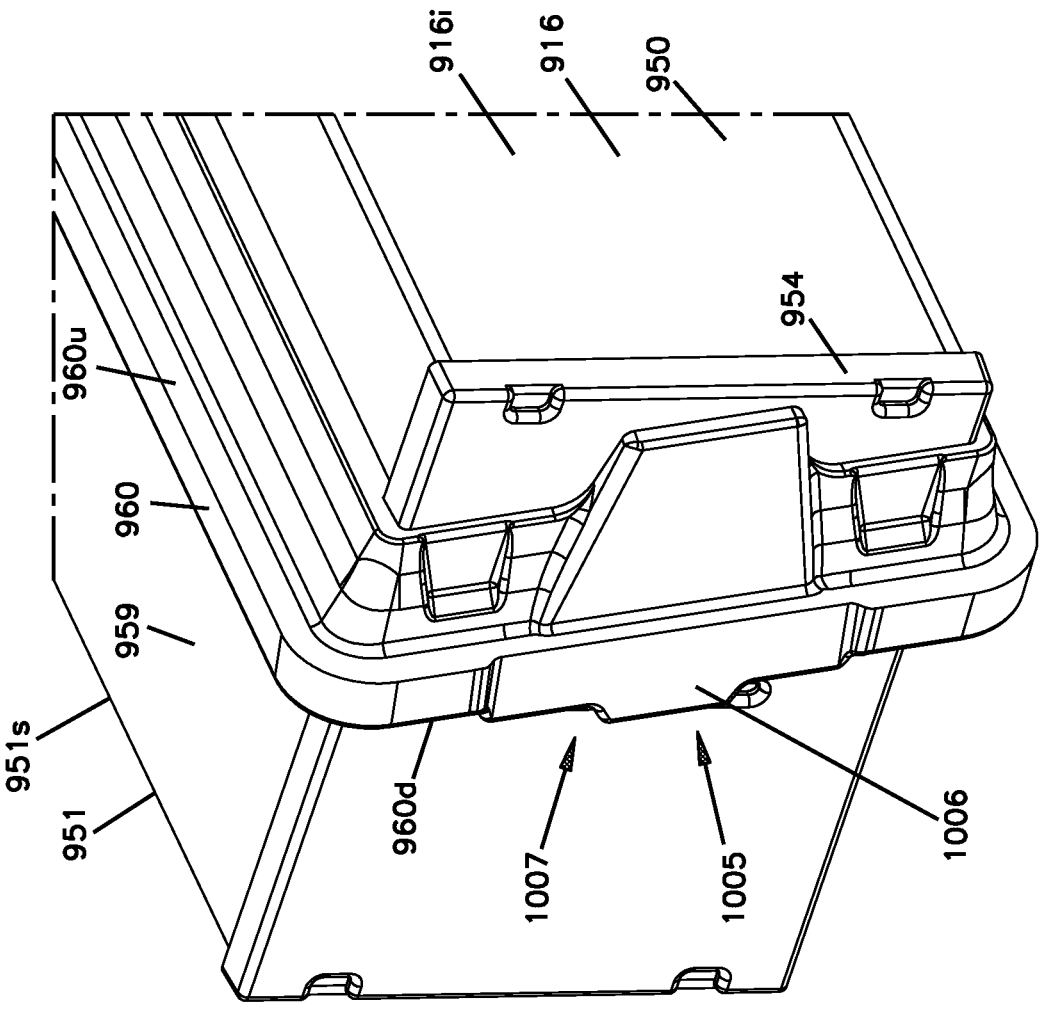
FIG. 49 is a schematic, enlarged, fragmentary, perspective view of a portion of the filter cartridge of FIG. 48.

In FIG. 49, an enlarged fragmentary view depicting region 1005 is shown.

Figure 50:
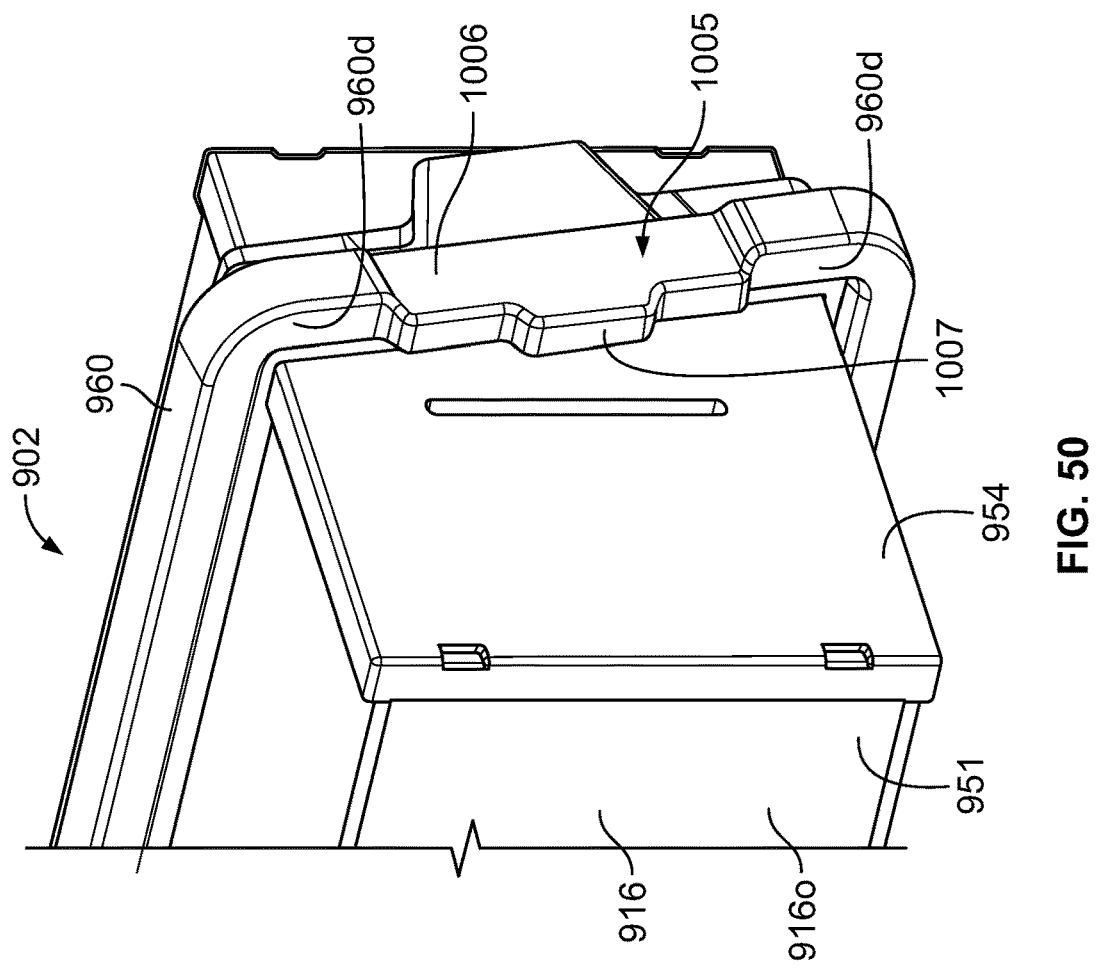
FIG. 50 is a schematic, enlarged, fragmentary, perspective view of an identified portion of the cartridge of FIGS. 48 and 49, taken toward an opposite end of the cartridge.

In FIG. 50, a second fragmentary perspective view, taken generally of the same region 1005, but toward the downstream seal surface 960d.

Figure 51:
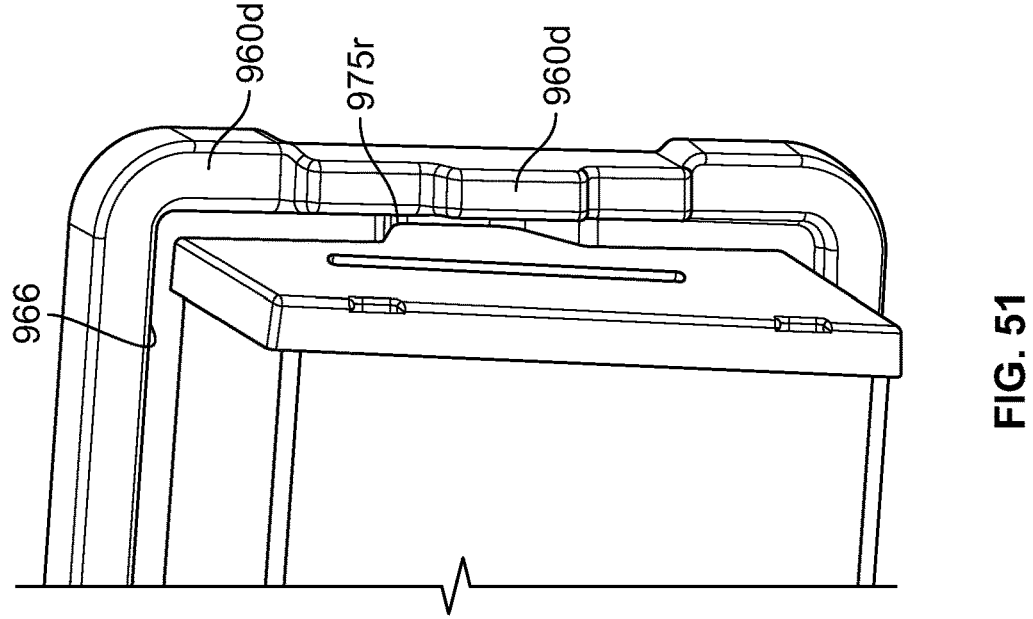
FIG. 51 is a schematic perspective view of the portion of the filter cartridge depicted in FIG. 49 from a different perspective and still toward the same end of the cartridge.

In FIG. 51 an analogous view is shown to FIG. 50, but at a different perspective, so that one can see interior receiving pocket 975r and trough or receiving groove 966.

Figure 52:
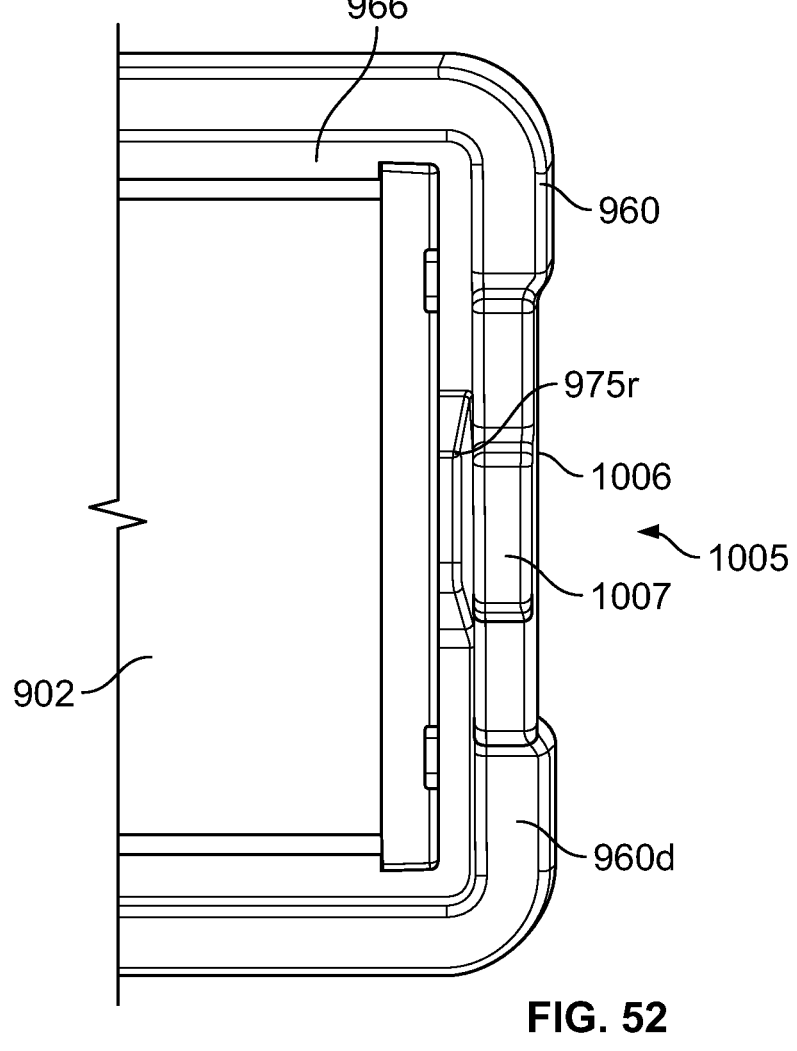
FIG. 52 is a fragmentary, schematic, plan view of the portion of the filter cartridge depicted in FIG. 51.

In FIG. 52 another view is shown of similar portions of the cartridge 502, but here in plan view, for further inspection of receiver 975r, and trough 966.

Figure 53:
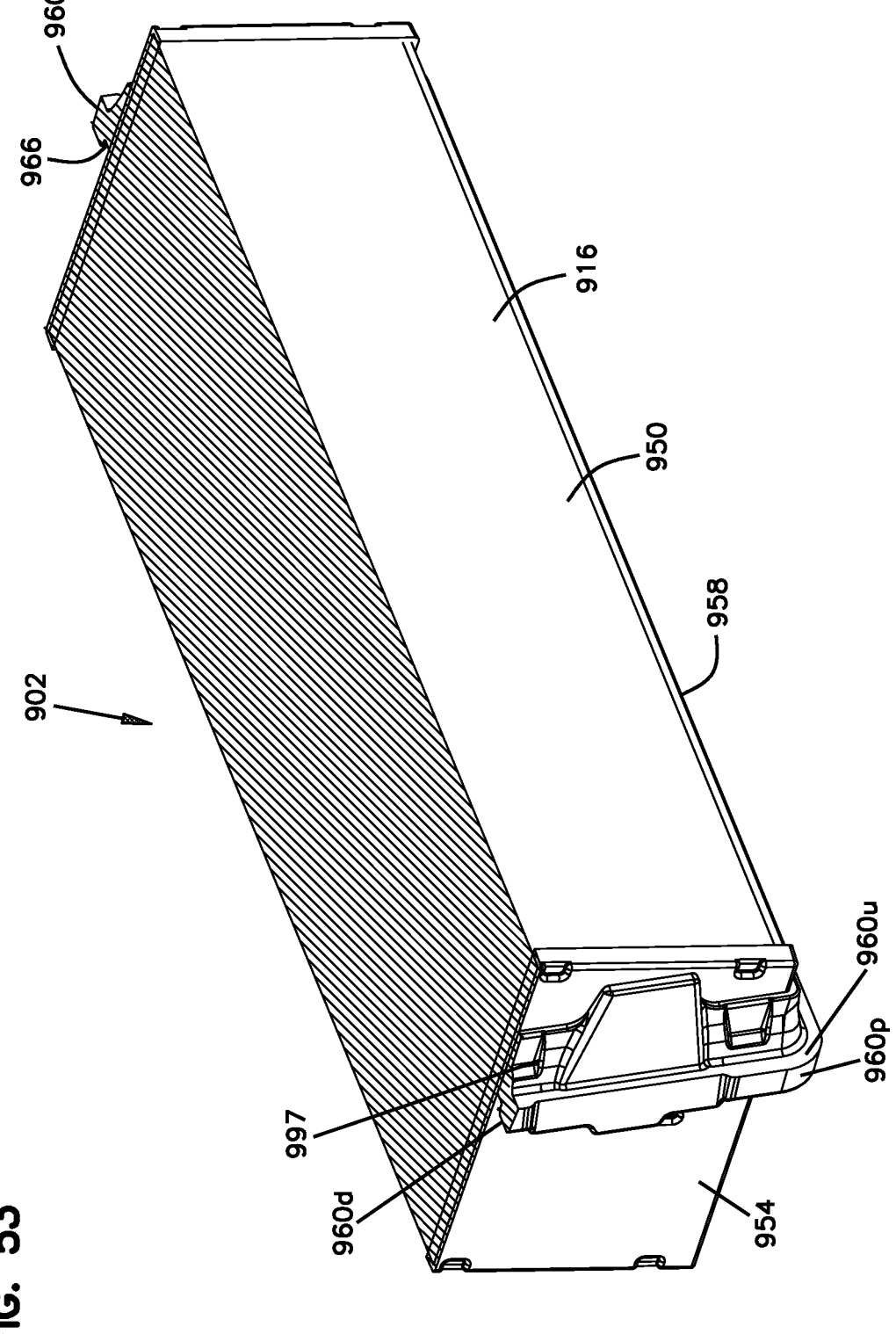
FIG. 53 is a schematic, cross-sectional view of the filter cartridge depicted in FIG. 48.

In FIG. 53 a first cross sectional view of the cartridge is shown, taken generally along line 53-53, FIG. 48. Here a cross section is through an exterior receiver 997.

Figure 54:
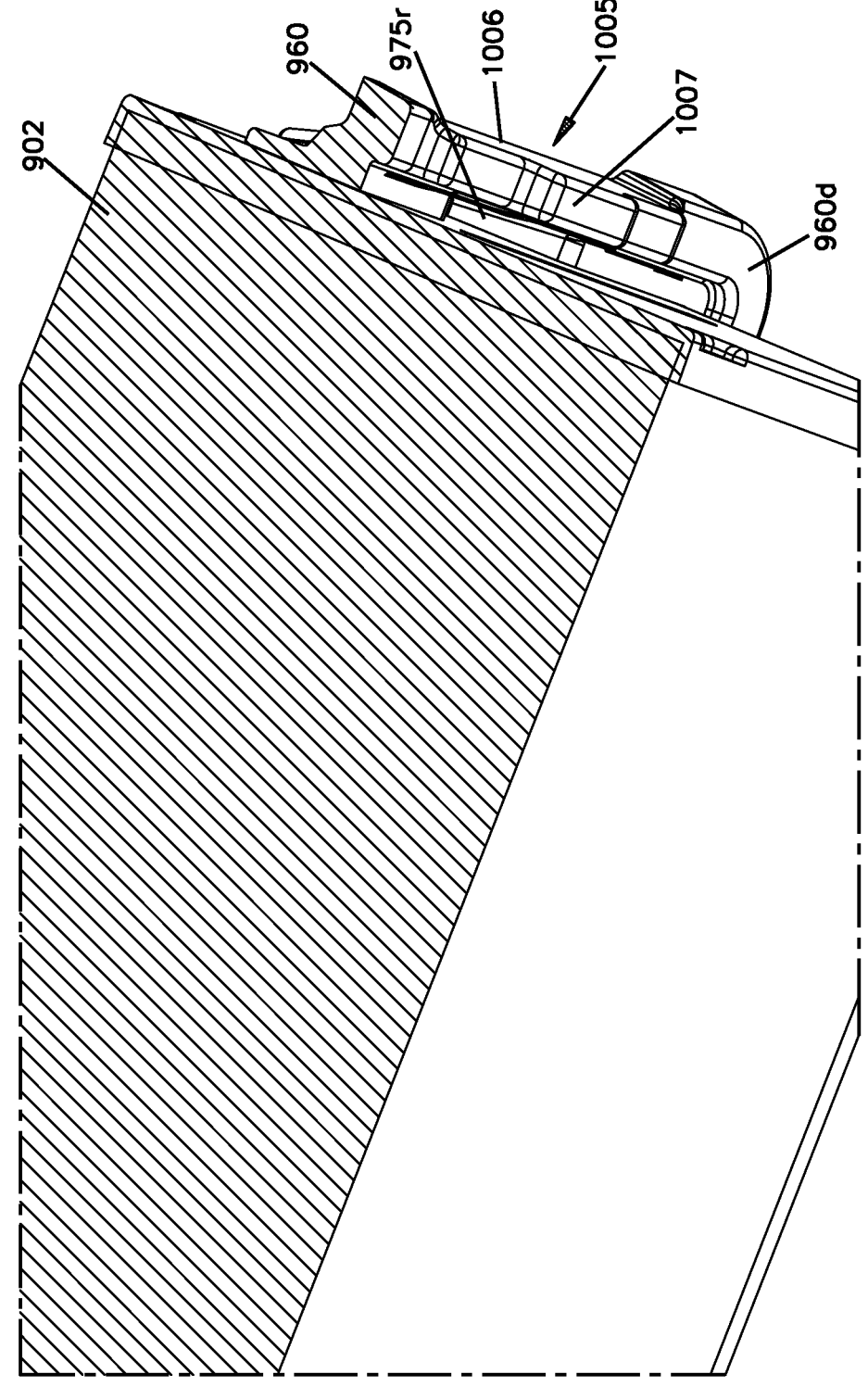
FIG. 54 is an enlarged, schematic, fragmentary cross-sectional view taken in the same plane as FIG. 53, but depicting the cartridge from a different perspective.

In FIG. 54 a perspective view corresponding to the same cross section, in fragmentary, is shown, but taken generally toward surface 960d of the seal arrangement 960.

Figure 55:
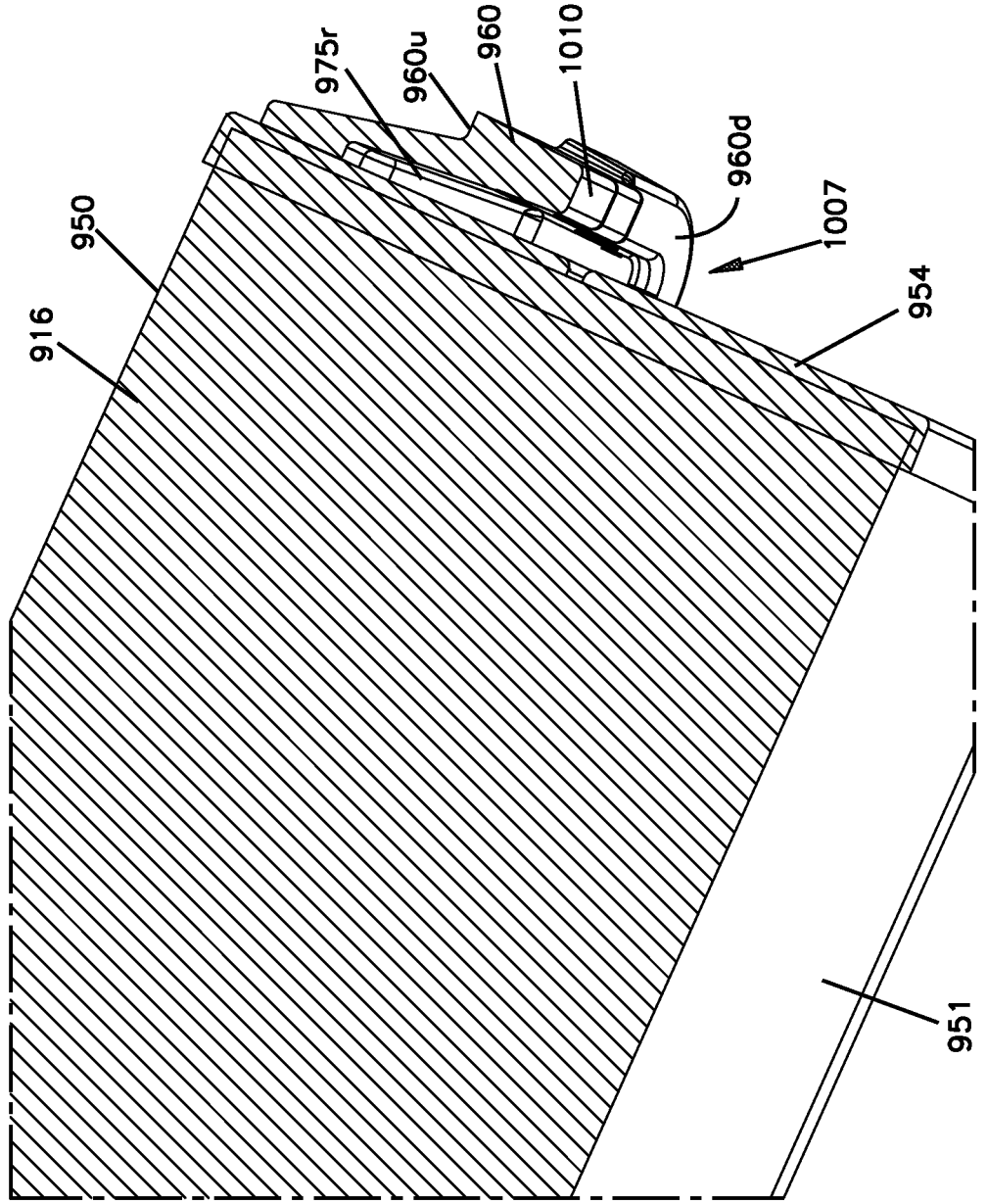
FIG. 55 is a second fragmentary cross-sectional view taken from a similar perspective to FIG. 54, but with a cross-sectional plane at a different location.

In FIG. 55 a second cross sectional view is taken generally along line 55-55, FIG. 48, but shown in fragmentary. Here, the cross section is through the receiver pocket 975r, providing for inspection of this feature. The view is still generally toward downstream surface 960d and seal member 960. It is also through the largest step 1010 of the stepped region 1007.

Figure 56:
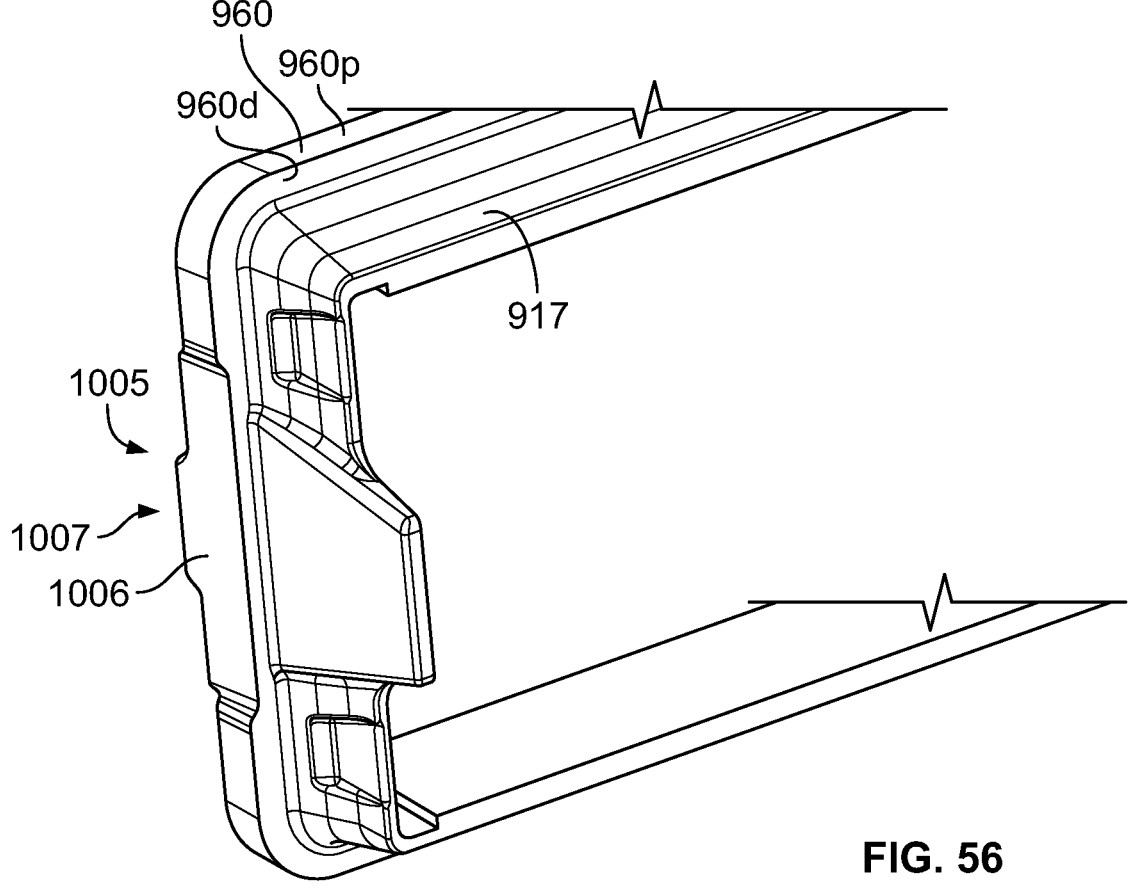
FIG. 56 is an enlarged fragmentary, perspective view of a selected portion of a housing seal engagement portion of the filter cartridge of FIG. 48.

In FIG. 56 an enlarged fragmentary view of the molded-in-place portion of the housing engagement arrangement 917 is shown.

Figure 57:
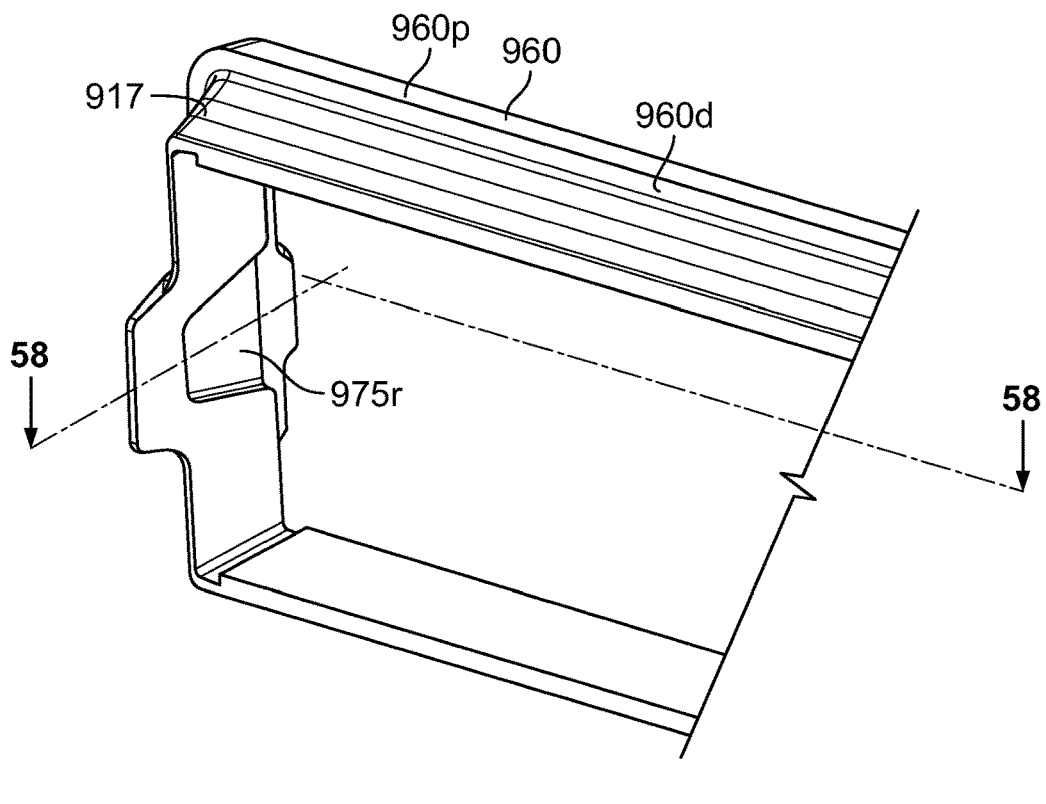
FIG. 57 is a schematic, perspective, view of the portion of the housing engagement arrangement of FIG. 56, depicted from a different perspective.

In FIG. 57 an interior view of the same portion of arrangement 917 is shown.

Figure 58:
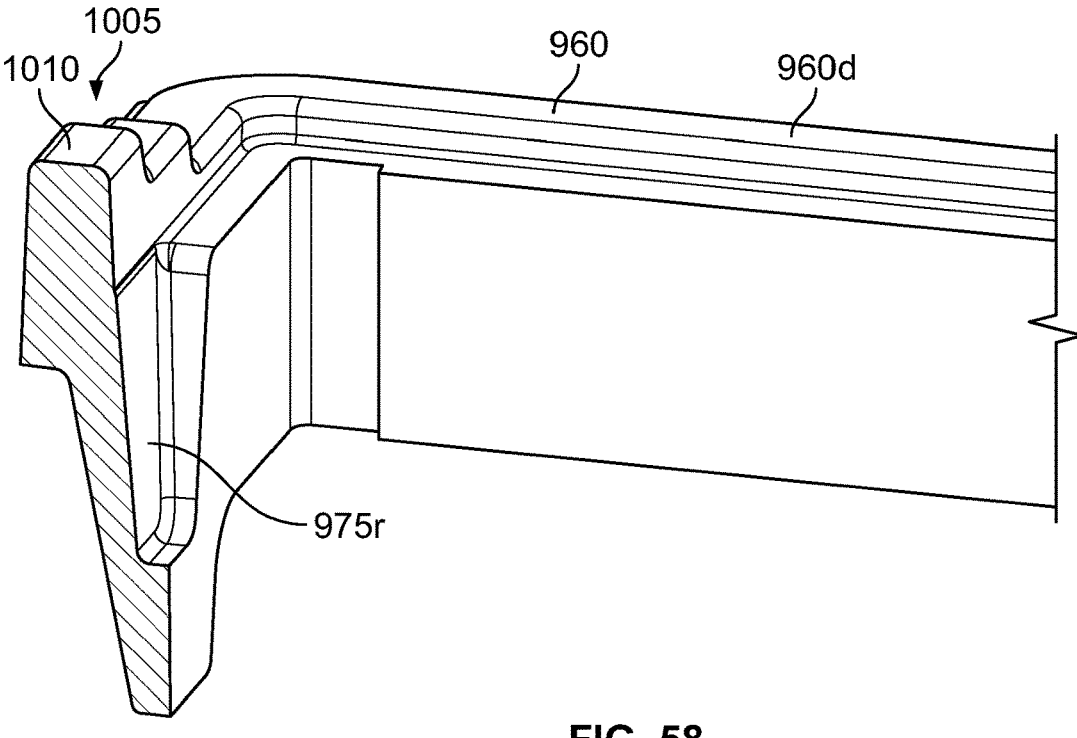
FIG. 58 is an enlarged, fragmentary, cross-sectional view of a portion of the component of FIG. 57.

In FIG. 58 a cross sectional view is taken at plane 58-58, FIG. 57 is shown.

Figure 59:
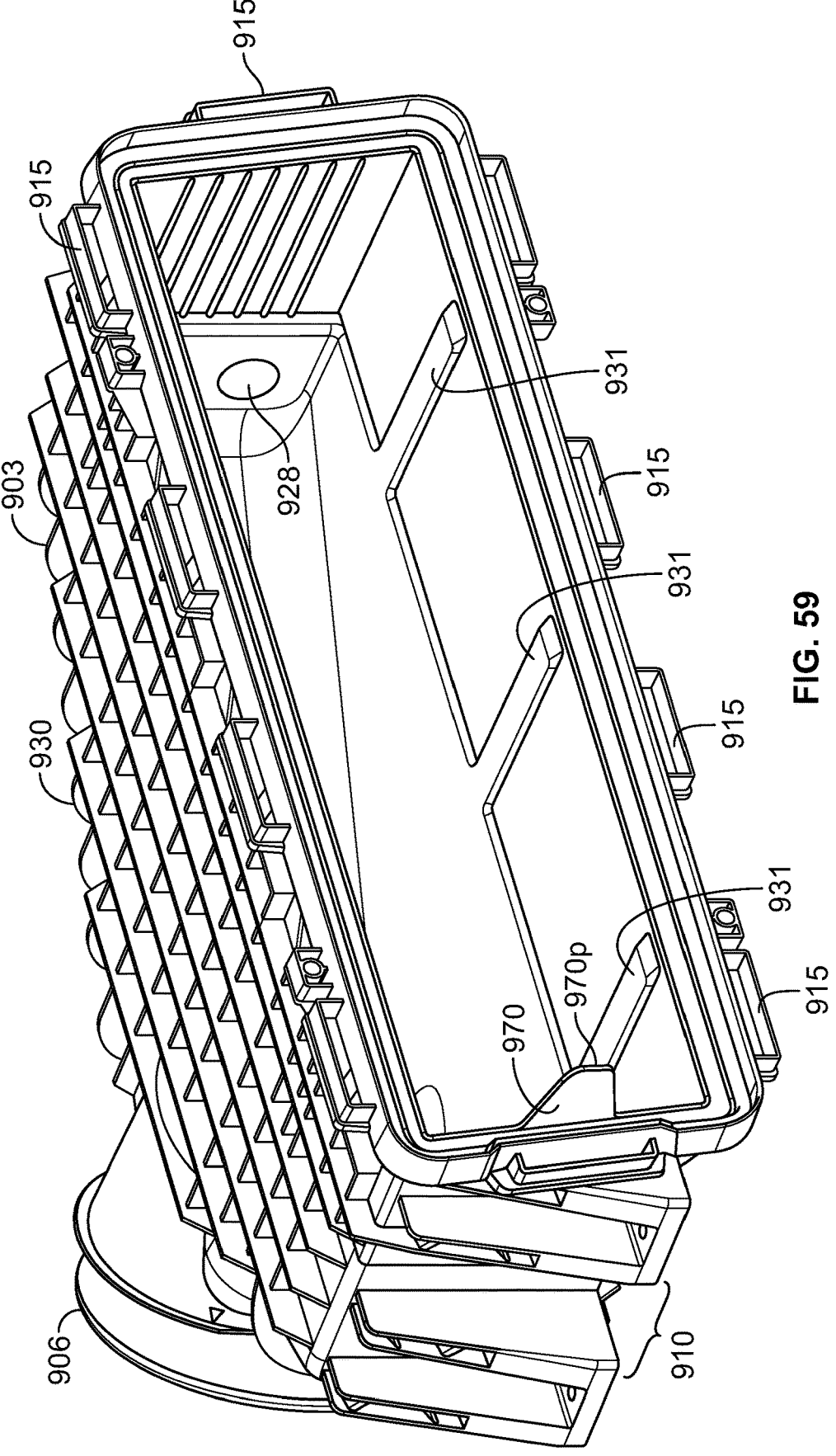
FIG. 59 is a schematic, perspective view of a housing section of the air cleaner assembly of FIG. 46.

In FIG. 59 a perspective view of the housing section 903 is depicted. Viewable are gridwork 930, outlet 906, auxiliary outlet 928, mounting pads 910, guide/slide ribs 931, receivers 915, projection arrangement 970 comprising projection 970p. Features generally analogous in appearance and location to those previously referenced above in variations discussed can be used.

Figure 60:
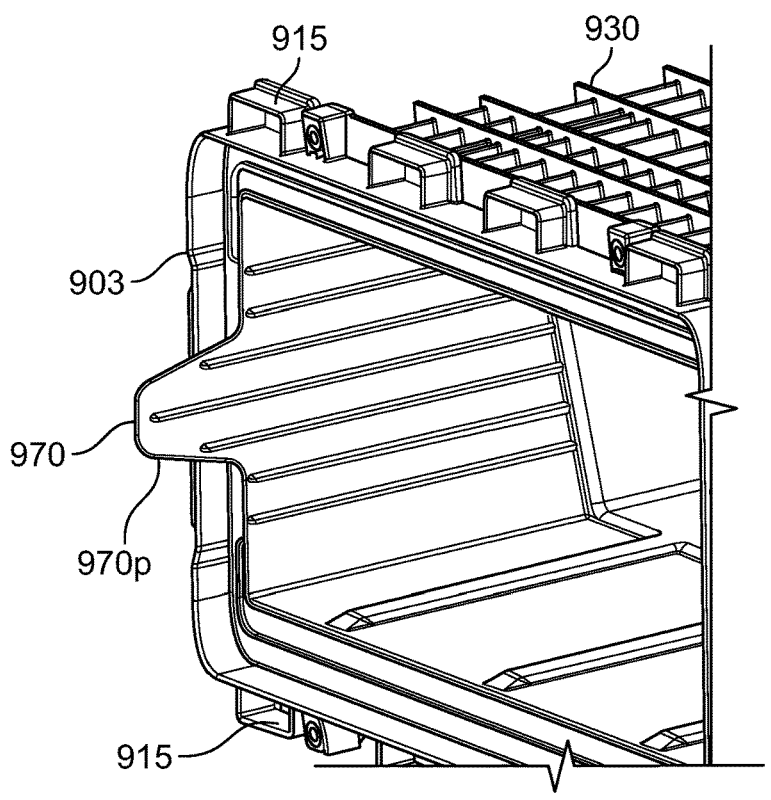
FIG. 60 is an enlarged fragmentary perspective view taken toward an inside portion of the housing component of FIG. 59.

In FIG. 60 a second perspective view shown fragmentary of the housing section 903 is viewable.

Figure 61:
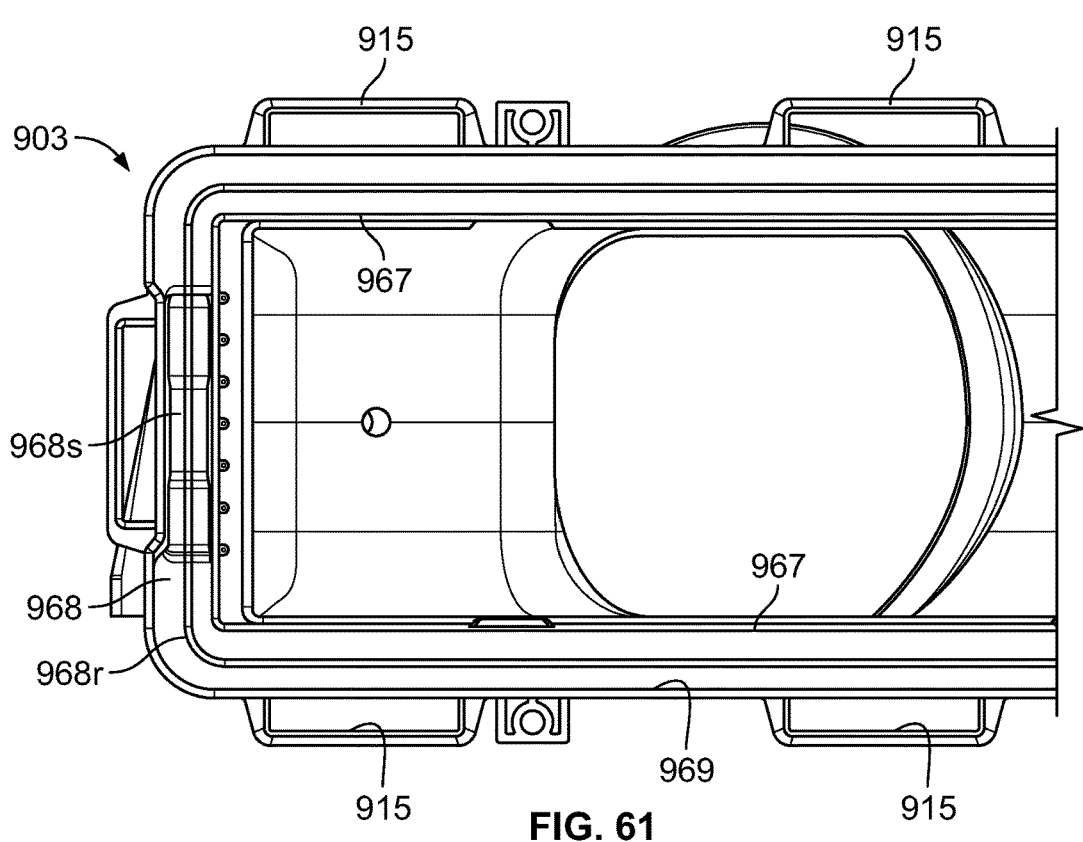
FIG. 61 is an enlarged fragmentary plan view taken toward the housing component of FIG. 60.

In FIG. 61 a plan view of housing section 903 is shown. Here a mating stepped recess section 968s for engagement with the stepped region 1007 is shown. Also seal rib 968r that presses into the seal member in use, is shown, in seal surface 968 between inner and outer rims 967 and 969.

Figure 62:
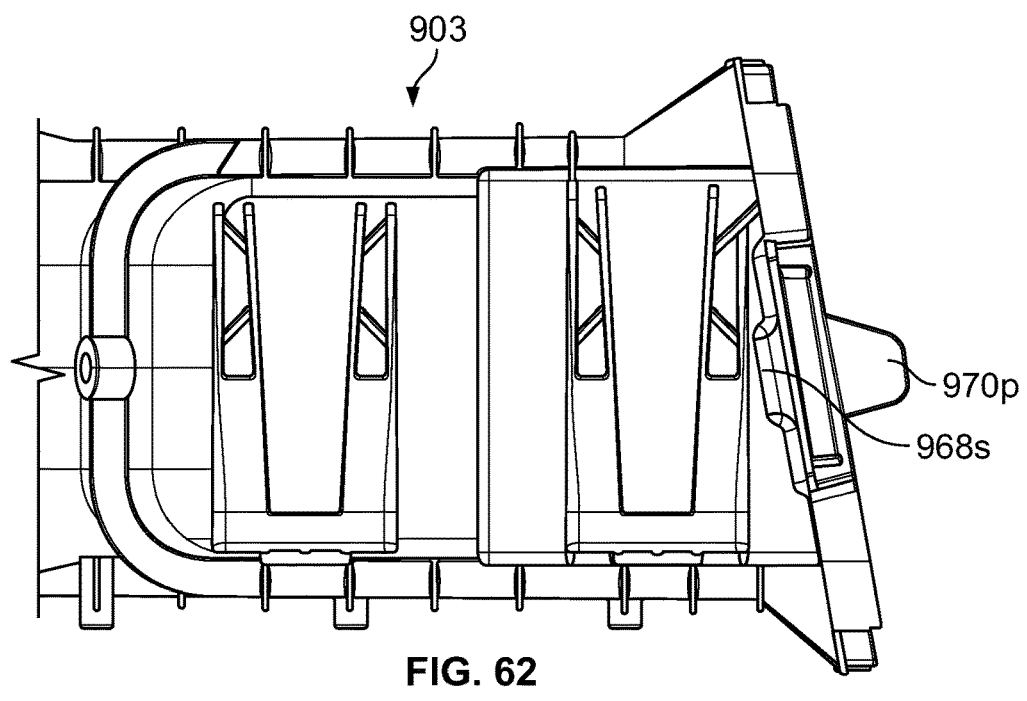
FIG. 62 is a fragmentary outside plan view taken toward a side of the housing component of FIG. 61.

In FIG. 62, an exterior view of the housing section 903 taken toward the stepped region 968s is shown.

Figure 63:
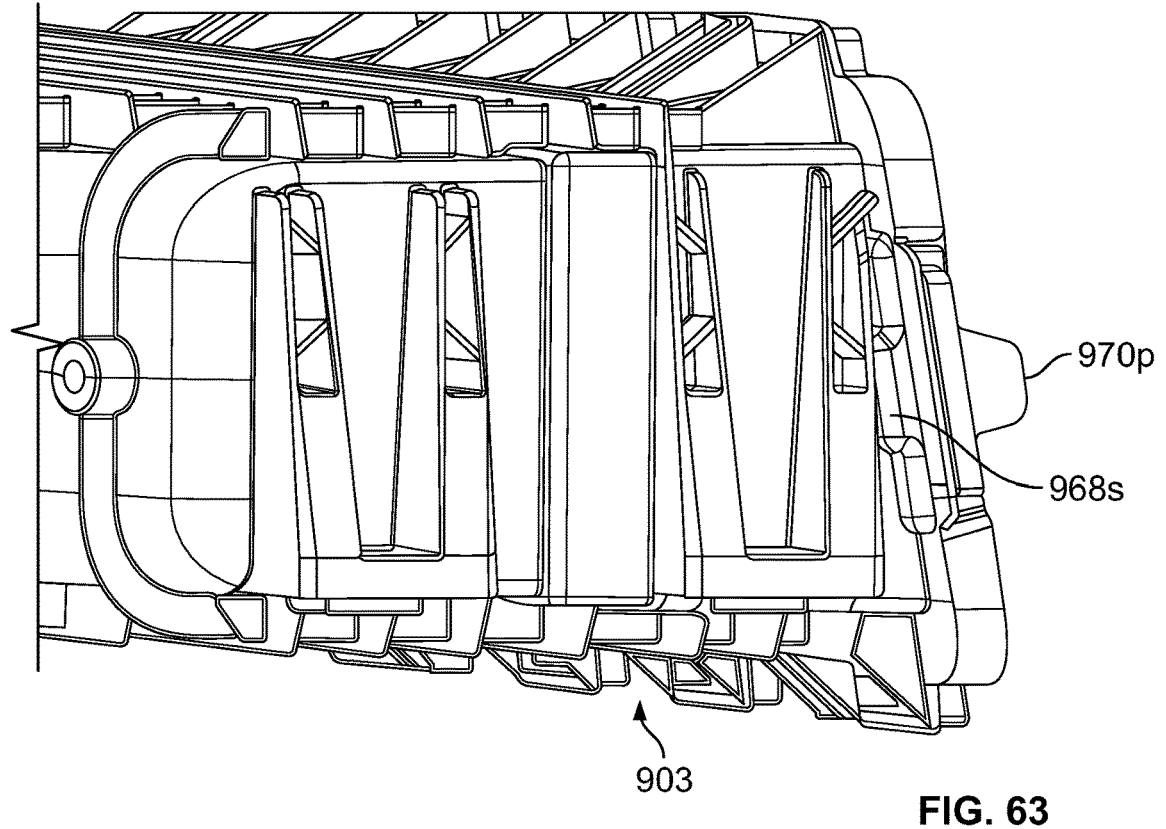
FIG. 63 is a fragmentary perspective view toward a portion of the housing component depicted in FIG. 62.

In FIG. 63 a perspective view of the section of FIG. 62 is shown.

It is noted that the interior of the access cover 904 is not shown. For the particular embodiment depicted, the access cover 904 may be generally the same as access cover 504.

From the above description and inspection of FIGS. 46-63, it can be understood that the principles of the present application can be applied in which a contoured seal region, in accord, for example, with WO 2014/210541 and/or U.S. Ser. No. 62/097,060, incorporated herein by reference, can be applied in an arrangement which is otherwise analogous to FIGS. 13-40. Further it is depicted in alignment or overlap with a portion of the cartridge that also includes a receiving pocket 575r, i.e., a portion of the security, housing closure, inhibition arrangement. Of course it can be located not in such alignment if desired.

Further, while the principles are shown in a connection with a slanted seal in FIGS. 46-63, they can be implemented with alternate seals, including ones that are not slanted but rather extend generally in a plane perpendicular to a flow direction through the cartridge, but for the contoured region 1007.

VI. Some Selected Specific Features and Additional Variations

A. Variations in the Shape, Size, and Location of a Projection Arrangement Analogous to Projection 570, 5'70p; 970, 9′70p as Part of an Internal, Closed, Security Housing Closure Inhibition Arrangement Herein above, in example projection arrangements 570, 970, are described and depicted in various embodiments, as a portion or projection arrangement positioned on the housing body (503, 903, respectively) and projecting toward the access cover (504, 904, respectively). As explained, variations in these arrangements are possible. The particular example arrangements depicted, each included one projection (570p, 970p, respectively). The number and location of such projections can be varied.

Typically, each projection (e.g. 570, 570p, 970, 970p) will have a length of projection toward the other housing section 504, 904 of at least 20 mm, usually at least 30 mm and often at least 40 mm. This will help ensure adequate interference with an improper cartridge, for the intended operation. The maximum length of the projection (570p, 970p) is a matter of choice for the system of concern, once it is adequately long to ensure the desired interaction with an improper cartridge. Typically, the maximum lengths will not greater than 100 mm and often not greater than 80 mm in a variety of systems.

Typically and preferably, the extent of projection of the projection arrangement 570, 970 (i.e., of projections 570p, 970p) is at least 15 mm further than the depth of any receiving groove 566, 966 in an associated cartridge (but for the receiving pocket 575r, 975r). Usually it is at least 25 mm deeper and often at least 35 mm deeper.

Typically, the amount of extension of the projection arrangement 570, 970 (5′70p, 9′70p) is adequately far to extend axially beyond the upstream or opposite seal surface (560u, 960u), so that when a proper cartridge is installed, the projection arrangement extends well past the seal arrangement 560, 960 in extension toward the other housing piece or access cover 504, 904. Preferably, this amount of extension is at least 15 mm, usually at least 25 mm; and, often at least 35 mm. (Analogously, the at least one receiving pocket 575r, 975r preferably extends at least 15 mm, usually at least 25 mm, often at least 35 mm further, toward cartridge end or flow face of the media pack than either seal surface. The end or flow face toward which the receiving pocket extends from the pinch seal, will sometimes be referenced as an "associated" end or flow face.

A variety of shapes for the individual projections 570p, 590p, can be used. A shape having a relatively wide base region in peripheral extension where it attaches to the remainder of the housing, with a narrow tapering in the same dimension toward a free end or tip, is preferred, as it helps insertion occur while the service provider is supporting and locating a cartridge. Typically a base having a width of at least 15 mm, usually at least 25 mm, often at least 35 mm; and, a fee end or tip no greater in width that about 90% of the base; typically no greater than about 80% of the base is preferred. In the example depicted, the projections 570p, 590p, have blunt out tips or free ends, but alternatives are possible.

Typically and preferably the individual projections 570p, 590p are relatively thin in thickness (dimension from radial exterior to radial interior) even in the region of the ribs 571, FIG. 20. A thickness no greater than 10 mm and typically no greater than 5 mm will be usable. Alternatives are possible.

In the example arrangement depicted, the side edges, FIG. 20, each extend at an obtuse angle (the same or different) from the base toward the free end. This is typical, but alternatives are possible.

Typically and preferably, the individual projections 570p, 590p, are oriented to project straight (in the flow direction)

toward the access cover. This facilitates cartridge installation, but alternatives are possible.

It is noted that in the example depicted, the projections 570p, 590p, are located on and are integral with, rims 566 and 966, respectively. This is typical, but alternatives are possible.

In the examples depicted, the projections 570p, 590p, are located in overlap with a shorter dimension of a rectangular cartridge, or the curved end and shorter dimension of the oval cartridge. This is typical, but alternatives are possible. For example, the projection arrangements can be orient aligned with a longer dimension instead of the sides. However, it is desirable to position them along a side that is located near the service provider in use, to help the service provider detect the interference interaction inhibiting closing, if an improper cartridge is being used.

B. Selective Features and Variations in the Portion of the Security Housing Closure, Inhibition Arrangement on the Filter Cartridge Herein above, in the examples of FIGS. 13-40 and 46-63, the member of the security housing closure inhibition arrangement on the filter cartridge, is a receiving pocket or recess arrangement 575r, 975r, respectively. In the example, this pocket 575r, 975r is a deepened portion in engagement with a receiving groove 566, 966 that is somewhat shallow and otherwise extends all the way around the cartridge. This is typical, but alternatives are possible.

Typically, the receiving pockets 575r, 975r are at least 10 mm deeper than an associated trough or recess 566, 966, usually, at least 20 mm deeper. Often, they are at least 200% deeper (3 times as deep), usually at least 400% deeper (5 times as deep) or more.

Typically, each (575r, 975r) extends at least 10 mm toward an associated cartridge end face from the seal member 560, 960, (i.e. from either pinch seal surface) typically at least 20 mm and usually at least 30 mm or more, for example at least 35 mm or even at least 40 mm.

Typically each is at least 20 mm deep, usually at least 25 mm deep.

Typically, the longest dimension of the receiving pockets 575r, 975r at the entrance thereto, is at least 15 mm, usually at least 20 mm, and often greater 25 mm. Typically, it extends at least 10 mm further than each of the opposite surfaces (e.g. surfaces 560d, 560u) of the pinch seal portion, usually at least 20 mm further, often at least 25 mm further.

In the examples depicted, the housing engagement portions 519, 917 comprise molded-in-place material. This is typical, but in some instances portions of these can be formed and preformed sections.

When the housing engagement portions are made as molded in placement arrangements, typically they are molded from the same material as is used for the housing seal arrangement, and are integral therewith. Such material, for example, comprise a polyurethane or other foamed material, molded to an as-molded density of no greater than 0.48 g/cc, typically no greater than 0.35 g/cc; and a hardness, Shore A, of no greater than 30, typically no greater than 20, often within the range of 10-20, inclusive. Alternatives, of course, are possible.

Referring to the figures, exterior recesses 601, 901 are typically at least 3 mm deep in maximum relief from adjacent portion of the housing engagement arrangement, typically at least 7 mm deep, in maximum relief from at least some adjacent portions, sometimes 10 mm deep or more.

When the housing seal arrangement includes a step feature in accord with the depictions of 724 in FIG. 42 and at 1007 in FIG. 50, usually each step individual has a maximum amount of projection relative to an immediately adja-cent portion of the seal surface, of at least 2 mm, often at least 5 mm, usually within the range of 5-20 mm; and, the overall stepped region has a maximum amount of projection, relative to unstepped regions of the same seal surface, of at least 5 mm, usually at least 8 mm, and often within the range of 10-30 mm. Multiple projection regions and space pro-jection regions around the perimeter can be used. These can be located along long sides, curved sides, opposite sides etc., as may be desired.

A contour in a perimeter portion was described for example, in FIG. 42 at 740, and in FIGS. 50 and 1006. These are depicted in overlap with a stepped region, but alterna-tives are possible. One or more contour regions can be used. When they are used, they are generally a maximum relief of at least 2 mm, usually at least 5 mm, relative to non-contoured portions of the outer perimeter of the seal member in which they are positioned.

C. Shape and Size of the Media Pack; Symmetry/Asymme-try in the Cartridge; Other Cartridge Sections The arrangements depicted are generally are non-circular shapes for the media pack. Both rectangular perimeters and oval perimeters are shown. The features characterized herein are particularly desirable, when used with cartridges that have one relatively long width (cross) dimension by com-parison to a shorter dimension taken perpendicular thereto. Typically, the media packs will have a longest width cross-dimension to maximum cross-dimension perpendicular thereto, of at least 1.5, usually at least 2 and often within the range of 2-5.

Often the media pack will be relatively large, with a total width of at least 150 mm, for example at least 300 mm, and sometimes on the order of 400-800 mm. Often the dimen-sion perpendicular will be not greater than 200 mm. Such large, wide, and shallow (perpendicular to width) media packs can be used to fit a variety of equipment. While the features characterized herein can be used with other sized and shaped media packs, they were developed to accommo-date many field issues that are associated with such large media packs.

The features characterized were particular developed for use with relatively deep media packs in extension between the upstream and downstream ends. While the techniques can be used with other types of media packs, it will typically be used with media packs having a length between the opposite flow ends of at least 50 mm, typically at least 80 mm, and often on the order of 90-450 mm.

The cartridge features can be provided in an asymmetric arrangement or a symmetric arrangement as desired. The symmetry or asymmetry can both be rotational with respect to an axis through the media pack in extension between flow ends; or, with respect to a plane through the media pack either: half-way along a longer cross-dimension and perpen-dicular thereto; or, half-way along a shorter cross-dimension and perpendicular thereto. Various features of the housing engagement arrangement can be made symmetrical or asym-metrical with respect to either of these concepts, as may be desired. Asymmetrical ones can be used to ensure that the cartridge can only be installed in a single orientation, if desired. Symmetrical arrangements can be used to allow the cartridge to be installed in more than orientation. Of course, the housing could be modified in general accord with these principles as well.

The cartridge can be provided with a handle arrangement thereon adjacent the inlet side. Also, the cartridge and access cover can be configured for a different engagement to provide sealing pressure.

It is noted that although the housing cannot be used with a cartridge that does not have appropriate features (member) for engagement with the member of the security, housing closure, inhibition, arrangement; the cartridge typically can be properly installed in a housing that does not have a member of the security, housing closure, inhibition arrange-ment, but is otherwise an analogous housing.

D. Variations in Housing Configuration

The housing can be configured with a wide variety of variations from those depicted. For example, the inlets and outlets can be alternately located and configured.

Further, the housing can be configured such that the cartridge is in a recessed portion of a housing section, rather than adjacent and in overlap with an outer edge thereof. When this is done, the mating housing section would typi-cally have a projection that extends into the housing suffi-ciently far, to push the seal arrangement into the desired seal engagement. Such features are shown and described for example, in WO 2014/210541 and/or U.S. Ser. No. 62/097, 060, incorporated herein by reference, and can be used in association with the security housing closure arrangement in accord with the present disclosure.

The housing can be configured with a pre-cleaner as part of the housing, for example, as described in U.S. Ser. No. 62/097,060, incorporated herein by reference.

The size of the housing can be varied greatly, in a variety of applications. However, the features are particularly well configured for use with a housing that a relatively large cartridge therein.

VII. Some Final Comments and Observations

In the following section, text is provided in the form of claims. The claims comprise characterizations indicating a variety of options, features, and feature combinations that can be used in accord with the teachings of the present disclosure. Alternate characterizations of the ones given, but consistent with the descriptions herein above, are possible.

What is claimed:
1. An air filter cartridge comprising:
(a) a media pack having a rectangular outer perimeter and opposite inlet and outlet flow faces;
(i) the media pack rectangular outer perimeter having a first pair of opposite ends and a second pair of opposite sides; and
(ii) a first pair of panels covering the media pack first pair of opposite ends;
(b) a housing engagement member including a seal arrangement having: a seal member extending around the media pack first pair of opposite ends and the media pack second pair of opposite sides, and having a seal surface located on at least one of an upstream side of the seal member or a downstream side of the seal member; a seal support portion; and, a receiving trough between at least a portion of the seal member and the media pack; and,
(c) a receiving member of an air cleaner security, housing closure, inhibition arrangement positioned in the hous-ing engagement member, wherein
the receiving member is a pocket having an opening and a recess, wherein the pocket is located along one of the media pack first pair of opposite ends, the receiving member opening is located radially interi-orly from the seal surface, and the seal surface located radially outwardly from the pocket extends in a straight path.

2. An air filter cartridge according to claim 1 wherein:

(a) the pocket is a closed pocket.

3. An air filter cartridge according to claim 1 wherein:

(a) the receiving member comprises a downstream arrangement that is engaged by a portion on a housing toward a downstream side of the seal arrangement, in use.

4. An air filter cartridge according to claim 1 wherein:

(a) the seal member has an outer perimeter; and, (b) the receiving member is positioned radially inwardly from the outer perimeter of the seal member.

5. An air filter cartridge according to claim 1 wherein:

(a) the receiving trough is continuous in extension around the media.

6. An air filter cartridge according to claim 1 wherein:

(a) the receiving trough is discontinuous in extension around the media.

7. An air filter cartridge according to claim 6 wherein:

(a) the receiving trough does not extend into at least one corner of the rectangular perimeter.

8. An air filter cartridge according to claim 7 wherein:

(a) the trough comprises four straight sections and no corner sections.

9. An air filter cartridge according to claim 1 wherein:

(a) the receiving member has a peripheral length dimension, at the opening, that is at least 15 mm.

10. An air filter cartridge according to claim 1 wherein:

(a) the receiving member has a peripheral length dimension, at the opening, that is at least 20 mm.

11. An air filter cartridge according to claim 1 wherein:

(a) the receiving member opening includes an interior radial recess in the seal member.

12. An air filter cartridge according to claim 1 wherein:

(a) the media pack has a dimension between the opposite flow faces of at least 50 mm.

13. An air filter cartridge according to claim 1 wherein (a) the media pack has a dimension between the opposite flow faces of at least 80 mm.

14. An air filter cartridge according to claim 1 wherein:

(a) the opposite flow faces are planar.

15. An air filter cartridge according to claim 14 wherein:

(a) the opposite flow faces are planar in planes perpendicular to a flow direction between the opposite flow faces.

16. An air filter cartridge according to claim 1 wherein:

(a) the opposite flow faces are rectangular.

17. An air filter cartridge according to claim 1 wherein:

(a) the opposite flow faces have a first, longest, cross-dimension of at least 150 mm.

18. An air filter cartridge according to claim 1 wherein:

(a) the flow faces each have a longer cross-dimension to shorter cross-dimension ratio of at least 1.5.

19. An air filter cartridge according to claim 1 wherein:

(a) the seal member has a portion slanted to a flow direction between the opposite flow faces.

20. An air filter cartridge according to claim 19 wherein:

(a) the seal member extends at a slant angle of at least 2°.

21. An air filter cartridge according to claim 19 wherein:

(a) the seal member extends at a slant angle in extension completely across the second pair of opposite sides, and extends along a path perpendicular to the flow direction in extension between the second pair of opposite sides.

22. An air filter cartridge according to claim 1 wherein:

(a) the seal surface includes a flat, planar, surface.

23. An air filter cartridge according to claim 1 wherein:

(a) the seal member includes a contoured surface.

24. An air filter cartridge according to claim 1 wherein:

(a) the seal member is molded-in-place on a remainder of the filter cartridge.

25. An air filter cartridge according to claim 1 wherein:

(a) the media pack comprises a facing media section secured to a fluted media section.

26. An air filter cartridge according to claim 25 wherein:

(a) the media pack comprises a stack of strips of facing media secured to fluted media.

27. An air filter cartridge according to claim 26 wherein:

(a) the media pack comprises a coiled strip of facing media secured to fluted media.

28. An air filter cartridge according to claim 1 wherein:

(a) the media pack comprises pleated media.

29. An air filter cartridge according to claim 1 wherein:

(a) the first pair of panels are molded-in-place on the media pack first pair of opposite ends.

30. An air filter cartridge according to claim 1 wherein:

(a) the first pair of panels are preformed pieces secured over the media pack first pair of opposite ends.

31. An air filter cartridge according to claim 30 wherein:

(a) the preformed pieces are secured over the media pack first pair of opposite ends by sealant.

32. An air filter cartridge according to claim 1 further comprising:

(a) cover pieces in extension between the first pair of panels over the media pack second pair of opposite sides.

33. An air filter cartridge according to claim 32 wherein:

(a) the cover pieces comprise plastic net.

34. An air filter cartridge according to claim 32 wherein:

(a) the cover pieces comprise plastic sheets.

35. An air filter cartridge according to claim 1 wherein:

(a) the seal member includes the seal surface on the downstream side of the seal member.

36. An air filter cartridge according to claim 1 wherein:

(a) the pocket is located along one of the media pack first pair of opposite ends and spaced centrally between the media pack second pair of opposite sides.

37. An air filter cartridge comprising:

(a) a media pack having a rectangular outer perimeter and opposite inlet and outlet flow faces;

(i) the media pack comprising pleated media;

(ii) the media pack rectangular outer perimeter having a first pair of opposite ends and a second pair of opposite sides; and (iii) a first pair of side panels covering the media pack first pair of opposite ends;

(b) a housing engagement member including: a seal member extending around the media pack first pair of opposite ends and the media pack second pair of opposite sides, and having seal surface located on at least one of an upstream side of the seal member or a downstream side of the seal member;

(c) a receiving member of an air cleaner security, housing closure, inhibition arrangement positioned in the housing engagement member, wherein the receiving member is a pocket having an opening and a recess, wherein the pocket is located along one of the media pack first pair of opposite ends, the receiving member opening is located radially interiorly from the seal surface, and the seal surface located radially outwardly from the pocket extends in a straight path; and, (d) a receiving trough between at least a portion of the seal member and the media pack.

38. An air filter cartridge comprising:

(a) a media pack having an outer perimeter and opposite flow faces; the media pack outer perimeter having a first pair of opposite ends and a second pair of opposite sides;

(b) a housing engagement member including a seal arrangement having: a seal member extending around the media pack first pair of opposite ends and the media pack second pair of opposite sides, and having a seal surface located on at least one of an upstream side of the seal member or a downstream side of the seal member; and, a receiving trough between at least a portion of the axial seal member and the media pack; and, (c) a receiving member of an air cleaner security, housing closure, inhibition arrangement positioned in the housing engagement member, wherein the receiving member comprises a pocket having an opening and a recess, the pocket is located along one of the media pack first pair of opposite ends, the receiving member opening is located radially interiorly from the seal surface, and the seal surface located radially outwardly from the pocket extends in a straight path.

* * * * *